(12) United States Patent
Uchibori et al.

(10) Patent No.: US 8,982,377 B2
(45) Date of Patent: Mar. 17, 2015

(54) IMAGE PROCESSING APPARATUS AND INFORMATION SETTING SYSTEM

(75) Inventors: Hiroki Uchibori, Kanagawa (JP); Kei Nakabayashi, Kanagawa (JP); Takashi Nakamura, Kanagawa (JP); Osamu Kizaki, Saitama (JP); Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 13/602,572

(22) Filed: Sep. 4, 2012

(65) Prior Publication Data

US 2013/0063761 A1 Mar. 14, 2013

(30) Foreign Application Priority Data

Sep. 12, 2011 (JP) .................. 2011-198376

(51) Int. Cl.
*G06K 15/00* (2006.01)
*G06F 3/12* (2006.01)
*H04N 1/00* (2006.01)
*G06F 9/445* (2006.01)
*G06K 1/00* (2006.01)
*G06F 15/00* (2006.01)

(52) U.S. Cl.
CPC .......... *G06F 3/1285* (2013.01); *H04N 1/00127* (2013.01); *G06F 3/1203* (2013.01); *G06F 3/1231* (2013.01); *G06F 9/445* (2013.01)

USPC ............. 358/1.14; 358/1.9; 358/1.15

(58) Field of Classification Search
USPC ............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

2004/0210835 A1   10/2004  Kurumatani
2012/0081731 A1*  4/2012   Suzuki .................. 358/1.13
2012/0268783 A1*  10/2012  Nakahara .............. 358/1.15

FOREIGN PATENT DOCUMENTS

JP    2004-326141    11/2004
JP    2008-072318    3/2008

* cited by examiner

*Primary Examiner* — Thierry L Pham
(74) *Attorney, Agent, or Firm* — IPUSA, PLLC

(57) ABSTRACT

An image processing apparatus includes a storing unit that stores setting information for operating the image processing apparatus; and an updating control unit that sends a request for obtaining predetermined differentiated setting information, which is a part of a set of setting information stored in a data processing apparatus in a differentiated manner in accordance with a predetermined differentiating criterion, to the data processing apparatus via a network, obtains the predetermined differentiated setting information from the data processing apparatus via the network and controls to update the setting information stored in the storing unit by the obtained predetermined differentiated setting information.

15 Claims, 48 Drawing Sheets

FIG.9

PREFERENCE INFORMATION UPDATED

SETTING VALUE CHANGED BY USER WITHOUT RIGHTS IS UPDATED.

FIG.15

PREFERENCE INFORMATION SETTING ERROR

! : FAILURE IN OBTAINING PREFERENCE INFORMATION (HEADER INFORMATION).
REASON: PREFERENCE INFORMATION NOT FOUND.

FIG.16

UNRELATED TO APPLICATIONS (628)

| SETTING ITEM | SETTING VALUE |
|---|---|
| TIMER | |
| AUTO OFF TIME | 30m |
| ... | ... |
| NETWORK | |
| EFFECTIVE PROTOCOL | HTTP,FTP |
| ... | ... |
| AUTHENTICATION | |
| USER | YES |
| ... | ... |
| OTHERS | |
| ... | ... |

COPYING FUNCTION (631)

| SETTING ITEM | SETTING VALUE |
|---|---|
| COLOR/MONOCHROME | COLOR |
| ... | ... |
| SORT | NO |
| ... | ... |

SCANNER FUNCTION (632)

| SETTING ITEM | SETTING VALUE |
|---|---|
| COLOR/MONOCHROME | MONOCHROME |
| ... | ... |
| RESOLUTION | 300dpi |
| ... | ... |
| RESTRICTION OF SENDING MAIL | NO |
| ... | ... |

PRINTER FUNCTION (633)

| SETTING ITEM | SETTING VALUE |
|---|---|
| COLOR/MONOCHROME | COLOR |
| ... | ... |
| JOB SPLITTING | YES |
| ... | ... |
| PAGE SIZE | A4 |
| ... | ... |

FACSIMILE FUNCTION (634)

| SETTING ITEM | SETTING VALUE |
|---|---|
| SENDING | |
| COMPRESSION | GREY SCALE |
| ... | ... |
| READING | |
| PREFERRED IMAGE QUALITY | NORMAL |
| ... | ... |
| RECEIVING | |
| CALLING TIME | 10 |
| ... | ... |

FIG.20

PREFERENCE INFORMATION SETTING ERROR

!
FAILURE IN SETTING PREFERENCE INFORMATION (PRINTER).
REASON: PREFERENCE INFORMATION NOT FOUND.

FIG.21

UNRELATED TO APPLICATIONS FOR A — 626, 628a

| SETTING ITEM | SETTING VALUE |
|---|---|
| TIMER | |
| AUTO OFF TIME | 30m |
| ... | ... |
| NETWORK | |
| EFFECTIVE PROTOCOL | HTTP,FTP |
| ... | ... |
| AUTHENTICATION | |
| USER | YES |
| ... | ... |
| LOG | |
| LOG TRANSFER | YES |
| ACCESS LOG | YES |
| JOB LOG | YES |
| OTHERS | |
| ... | ... |

UNRELATED TO APPLICATIONS FOR B — 628b

| SETTING ITEM | SETTING VALUE |
|---|---|
| TIMER | |
| AUTO OFF TIME | 30m |
| ... | ... |
| NETWORK | |
| EFFECTIVE PROTOCOL | HTTP,FTP |
| ... | ... |
| AUTHENTICATION | |
| USER | YES |
| ... | ... |
| LOG | |
| LOG TRANSFER | YES |
| ACCESS LOG | YES |
| JOB LOG | YES |
| ECO LOG | YES |
| OTHERS | |
| ... | ... |

COPYING FUNCTION FOR A  631a

| SETTING ITEM | SETTING VALUE |
|---|---|
| COLOR/MONOCHROME | COLOR |
| ... | ... |
| ONE-SIDE/BOTH SIDES | BOTH SIDES |
| ... | ... |
| SORT | NO |
| PUNCH | NO |
| STAPLE | NO |
| ... | ... |

COPYING FUNCTION FOR B  631b

| SETTING ITEM | SETTING VALUE |
|---|---|
| COLOR/MONOCHROME | COLOR |
| ... | ... |
| SORT | NO |
| ... | ... |

FIG.24

| 1 | UNRELATED TO APPLICATIONS FOR A |
|---|---|
| 2 | UNRELATED TO APPLICATIONS FOR B |
| 3 | COPYING FUNCTION FOR A |
| 4 | COPYING FUNCTION FOR B |
| 5 | PRINTER FUNCTION |
| 6 | SCANNER FUNCTION |
| 7 | FACSIMILE FUNCTION |

| SETTING ITEM | SETTING VALUE |
|---|---|
| OPERATIONAL RESTRICTION | |
| SENDER UTILIZE RESTRICTION | YES |
| ... | ... |

642

| SETTING ITEM | SETTING VALUE |
|---|---|
| ENCRYPTION | |
| DRIVER CRYPTOGRAPHIC KEY | aaaaa |
| ... | ... |

644

| SETTING ITEM | SETTING VALUE |
|---|---|
| PASSWORD | |
| COMPLEXITY | 1 |
| ... | ... |

646

| SETTING ITEM | SETTING VALUE |
|---|---|
| LOG | |
| JOB LOG | YES |
| ACCESS LOG | YES |

648

| SETTING ITEM | SETTING VALUE |
|---|---|
| AUTHENTICATION | |
| USER | YES |
| ... | ... |

650

641

| SETTING ITEM | SETTING VALUE |
|---|---|
| ... | ... |
| ... | ... |

PREFERENCE INFORMATION SETTING ERROR

!
FAILURE IN SETTING PREFERENCE INFORMATION (SECURITY).
REASON: PREFERENCE INFORMATION NOT FOUND.

FIG.33

| SETTING ITEM | SETTING VALUE |
|---|---|
| TIME SETTING ||
| SUMMER TIME | EFFECTIVE |
| OFFSET AT STANDARD TIME | 10h |
| START MONTH | Sept. |
| START DATE | 1st |
| ... | ... |
| LOG SETTING ||
| JOB LOG | YES |
| ACCESS LOG | YES |
| ... | ... |

| SETTING ITEM | SETTING VALUE |
|---|---|
| ... | ... |
| ... | ... |

FIG.38

PREFERENCE INFORMATION SETTING ERROR

-: FAILURE IN SETTING PREFERENCE INFORMATION (NOT REQUIRING REBOOT).
REASON: PREFERENCE INFORMATION NOT FOUND.

FIG.40

PREFERENCE INFORMATION SETTING ERROR

-:
FAILURE IN SETTING PREFERENCE INFORMATION (REQUIRING REBOOT).
REASON: PREFERENCE INFORMATION NOT FOUND.

FIG.42

PREFERENCE INFORMATION SETTING ERROR

! FAILURE IN SETTING PREFERENCE INFORMATION (REQUIRING REBOOT).
REASON: REBOOT REJECTED.

PLEASE REBOOT MANUALLY.

FIG.43

| SETTING ITEM | SETTING VALUE |
|---|---|
| AUTO-LOG OUT | ON |
| BUZZER SOUND | ON |
| ... | ... |
| ... | ... |

| SETTING ITEM | SETTING VALUE |
|---|---|
| IP ADDRESS DISPLAY SETTING | NO |
| USER AUTHENTICATION SETTING | YES |
| ... | ... |
| ... | ... |

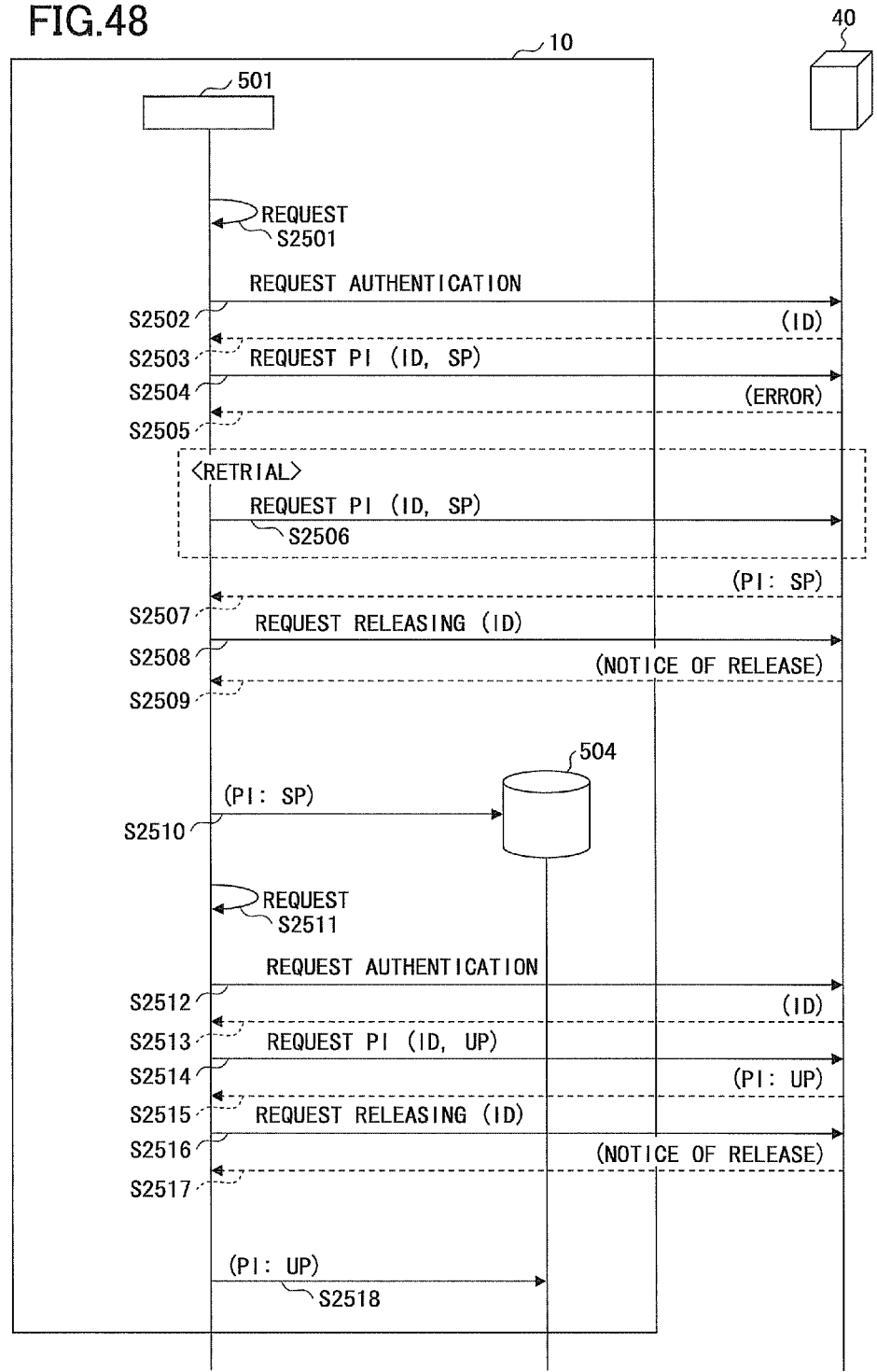

IMAGE PROCESSING APPARATUS AND INFORMATION SETTING SYSTEM

BACKGROUND OF THE INVENTION

1. Field of the Invention

The present invention relates to an image processing apparatus and an information setting system which updates setting information.

2. Description of the Related Art

Recently, as functions usable in an image processing apparatus have been increased, setting items for utilizing the functions are also increased. With the increase of the setting items, it is troublesome for an administrator or the like to set setting information in the image processing apparatus when it is newly introduced or an application of which is updated.

For the above problem, a technique in which it is unnecessary to set setting information for each of image processing apparatuses is known. Patent Document 1 discloses a technique in which a server stores setting information for each of image processing apparatuses and each of the image processing apparatuses obtains the setting information for the respective image processing apparatus from the server to resistor the obtained setting information.

However, according to the technique disclosed in Patent Document 1, as the server stores the setting information for each of the image processing apparatuses, when the number of image processing apparatuses increases, it becomes hard to manage all of the setting information. Further, when setting all of apparatuses connected to a network at once, it is necessary to prepare setting information applicable to all of the apparatuses so that it becomes difficult to prepare such setting information.

Further, when setting the setting information for all of the image processing apparatuses at once, a Push-type method of setting by a management tool using WebService/MIB (Management Information Base) in which the setting information is sent and set in all of the image processing apparatuses. However, for the Push-type method of setting, the following problems exist. When the number of image processing apparatuses is large, this process consumes time. Further, when there is an image processing apparatus switch of which is not on, the setting information cannot be set.

PATENT DOCUMENT

[Patent Document 1] Japanese Laid-open Patent Publication No. 2008-72318

SUMMARY OF THE INVENTION

The present invention is made in light of the above problems, and provides an image processing apparatus and an information setting system capable of appropriately setting or updating setting information.

According to an embodiment, there is provided an image processing apparatus including a storing unit that stores setting information for operating the image processing apparatus; and an updating control unit that sends a request for obtaining predetermined differentiated setting information, which is a part of a set of setting information stored in a data processing apparatus in a differentiated manner in accordance with a predetermined differentiating criterion, to the data processing apparatus via a network, obtains the predetermined differentiated setting information from the data processing apparatus via the network and controls to update the setting information stored in the storing unit by the obtained predetermined differentiated setting information.

According to another embodiment, there is provided an information setting system including an image processing apparatus; and a data processing apparatus connected to the image processing apparatus via a network, wherein the data processing apparatus includes a first storing unit that stores a set of setting information in a differentiated manner in accordance with a predetermined differentiating criterion, and the image processing apparatus includes a second storing unit that stores setting information for operating the image processing apparatus; and an updating control unit that sends a request for obtaining predetermined differentiated setting information, which is a part of the set of setting information stored in the data processing apparatus to the data processing apparatus via the network, obtains the predetermined differentiated setting information from the data processing apparatus via the network and controls to update the setting information stored in the storing unit by the obtained predetermined differentiated setting information.

According to another embodiment, there is provided a non-transitory computer-readable recording medium having recorded thereon a program that causes a computer including a storing unit that stores setting information for operating an image processing apparatus to execute an image processing method including, sending a request for obtaining predetermined differentiated setting information, which is a part of a set of setting information stored in a data processing apparatus in a differentiated manner in accordance with a predetermined differentiating criterion, to the data processing apparatus via a network; obtaining the predetermined differentiated setting information from the data processing apparatus via the network; and controlling to update the setting information stored in the storing unit by the obtained predetermined differentiated setting information.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 9 is a view showing an example of a display notifying that the preference information is updated;

FIG. 15 is a view showing an example of a screen indicating that an error occurs in updating;

FIG. 16 is a view showing an example of the preference information of an embodiment;

FIG. 20 is a view showing an example of a screen indicating that an error occurs in updating;

FIG. 21 is a view showing another example of the preference information of an embodiment;

FIG. 22 is a view showing another example of the preference information of an embodiment;

FIG. 24 is a view showing an example of a list of differentiated preference information;

FIG. 26 is a view showing an example of the preference information of an embodiment;

FIG. 32 is a view showing an example of a screen indicating that an error occurs in updating;

FIG. 33 is a view showing an example of the preference information of an embodiment;

FIG. 38 is a view showing an example of a screen indicating that an error occurs in updating;

FIG. 40 is a view showing an example of a screen indicating that an error occurs in updating;

FIG. 42 is a view showing an example of a screen indicating that an error occurs in updating;

FIG. 43 is a view showing an example of the preference information of an embodiment;

FIG. 48 is a sequence diagram showing another example of the operation of updating the preference information of an embodiment.

DETAILED DESCRIPTION OF THE PREFERRED EMBODIMENTS

Figure 1:
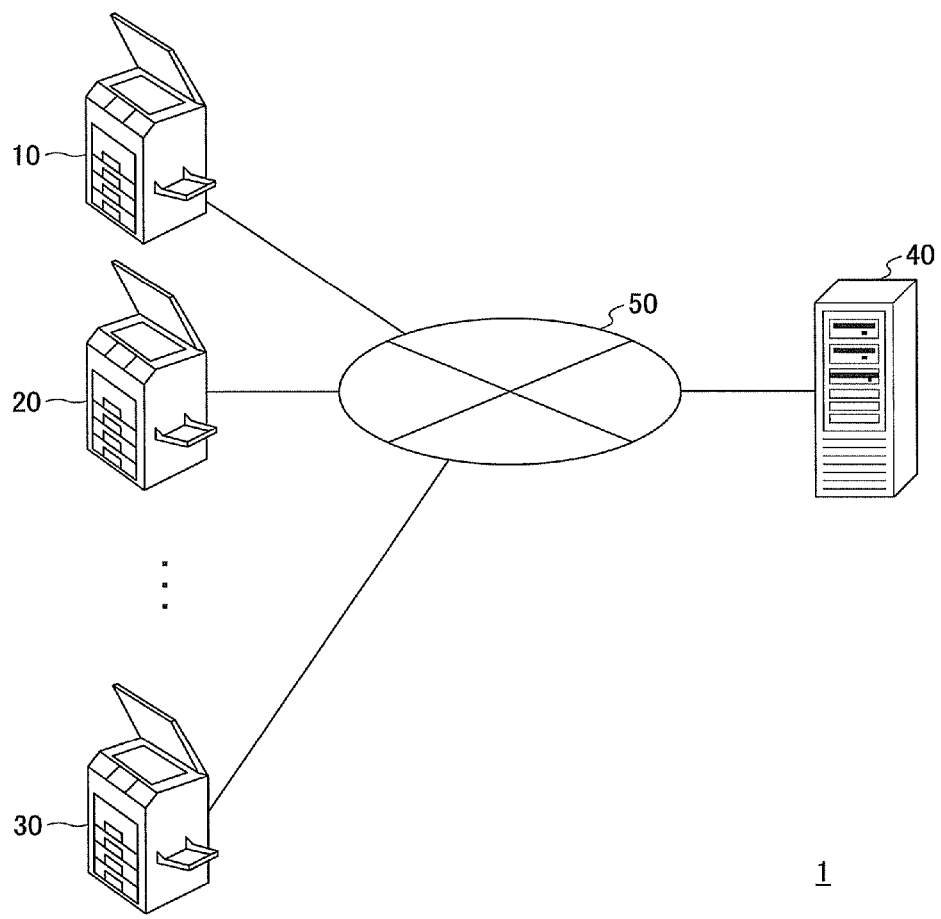
FIG. 1 is a block diagram showing an example of a structure of an information setting system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment (System)

FIG. 1 is a block diagram showing an example of a structure of an information setting system of a first embodiment. The information setting system 1 includes plural image processing apparatuses 10, 20 and 30 and a data processing apparatus 40 which are connected via a network 50. Each of the image processing apparatuses 10, 20 and 30 is capable of communicating with the data processing apparatus 40. The image processing apparatuses 10, 20 and 30 are a Multifunction Peripheral (MFP) or a printer, for example.

The structure and function of the image processing apparatuses 20 and 30 are the same as those of the image processing apparatus 10 and therefore, only the structure and function of the image processing apparatus 10 are explained in the following.

In this embodiment, plural functions such as a copying function, a scanner function, a printer function, a facsimile function or the like are mounted on the image processing apparatus 10. Hereinafter, these functions are referred to as "applications" as well.

The image processing apparatus 10 sends a request for obtaining setting information, which is necessary for operating the image processing apparatus 10, to the data processing apparatus 40. Hereinafter, the setting information is referred to as "preference information" as well. The preference information includes plural setting items and corresponding setting values. The setting items include setting items for each of the applications mounted on the image processing apparatus 10. The image processing apparatus 10 sets or updates the setting values of the preference information stored in the image processing apparatus 10 by the setting values of the preference information obtained from the data processing apparatus 40.

The data processing apparatus 40 stores the preference information to be commonly set in the image processing apparatuses 10, 20 and 30 which are connected to the data processing apparatus 40 via the network 50. When the data processing apparatus 40 receives the request for obtaining the preference information (setting information) from the image processing apparatus 10, the data processing apparatus 40 sends the preference information to the image processing apparatus 10. The data processing apparatus 40 functions as a server including a storing unit. In this embodiment, the data processing apparatus 40 stores a set of preference information in a differentiated manner in accordance a predetermined differentiating criterion determined based on a purpose.

Thus, in this embodiment, the preference information is set or updated (hereinafter simply referred to as updated as well) by a PULL-type operation in the image processing apparatus 10 (and in the image processing apparatuses 20 and 30 as well).

(Hardware Structure)

Figure 2:
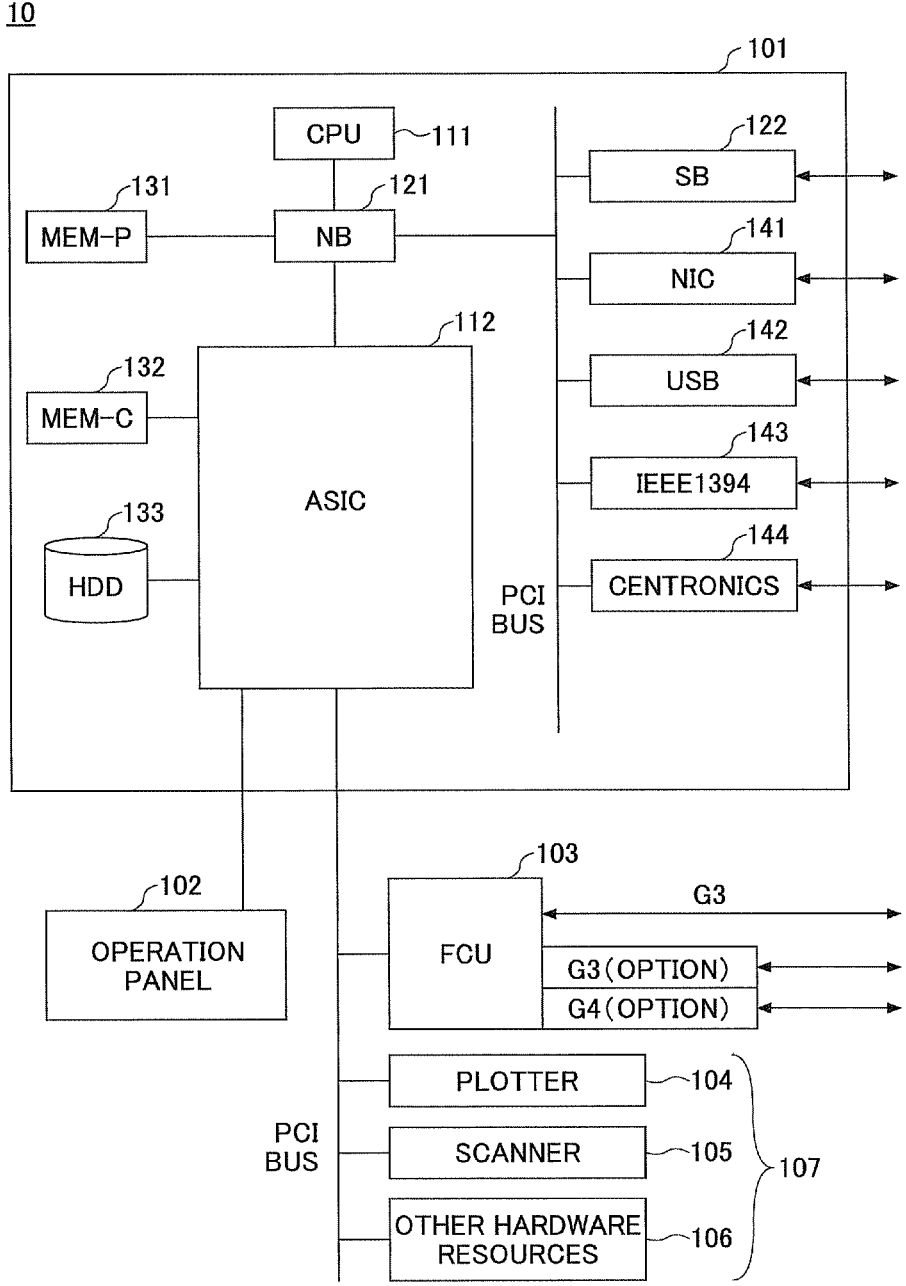
FIG. 2 is a block diagram showing an example of a hardware structure of an image processing apparatus of an embodiment.

FIG. 2 is a block diagram showing an example of a hardware structure of the image processing apparatus 10 of the embodiment. The image processing apparatus 10 includes a controller 101, an operation panel 102, a facsimile control unit (FCU) 103 and an engine unit 107. The engine unit 107 includes a plotter 104, a scanner 105 and other hardware resources 106 as hardware. These components are capable of communicating with each other via a PCI BUS.

The controller 101 includes a CPU 111, an application-specific integrated circuit (ASIC) 112, a north bridge (NB) 121, a south bridge (SB) 122, MEM-P 131, MEM-C 132, a hard disk drive (HDD) 133, a network interface controller (NIC) 141, a USB device (USB) 142, an IEEE1394 device (IEEE1394) 143 and a Centronics device (CENTRONICS) 144.

The CPU 111 is an IC for performing various data processing. The ASIC 112 is an IC for performing various image data processing. The NB 121 is a north bridge of the controller 101. The SB 122 is a south bridge of the controller 101. The MEM-P 131 is a system memory of the image processing apparatus 10. The MEM-C 132 is a local memory of the image processing apparatus 10. The HDD 133 is storage of the image processing apparatus 10.

The NIC 141 is a controller for a network communication based on a MAC address. The USB device 142 functions to provide a connector terminal of Universal Serial Bus. The IEEE 1394 device 143 functions to provide a connector terminal of IEEE 1394. The Centronics device 144 functions to provide a connector terminal of Centronics.

The operation panel 102 is hardware for an operator to input information to the image processing apparatus 10 and to obtain output from the image processing apparatus 10.

The FCU 103 sends and receives facsimile data generally in accordance with G3, and stores received facsimile data. The FCU 103 may optionally have functions of G3 type facsimile and G4 type facsimile. The plotter 104 prints image data. The scanner 105 reads a document to generate document data.

Figure 3:
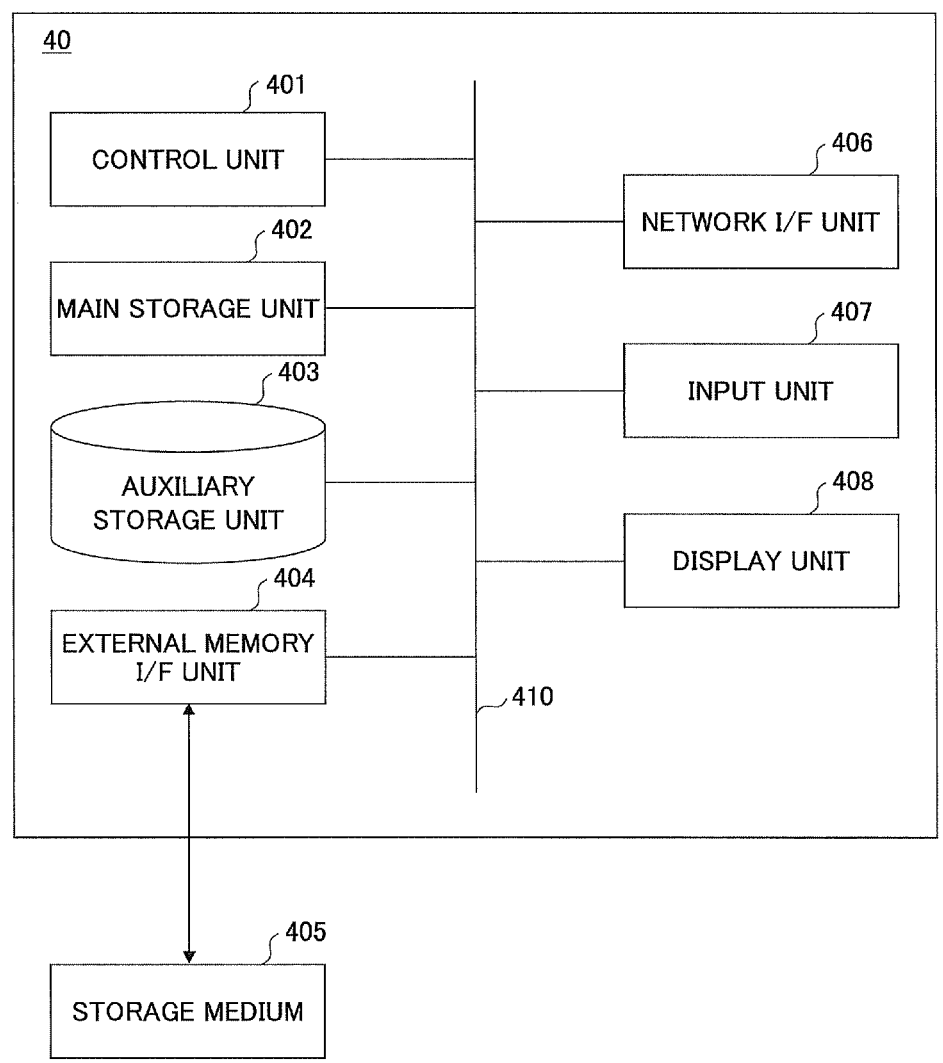
FIG. 3 is a block diagram showing an example of a hardware structure of a data processing apparatus of an embodiment.

FIG. 3 is a block diagram showing an example of a hardware structure of the data processing apparatus 40 of the first embodiment. The data processing apparatus 40 includes a control unit 401, a main storage unit 402, an auxiliary storage unit 403, an external memory interface (I/F) unit 404, a network interface (I/F) unit 406, an input unit 407 and a display unit 408. These components are capable of communicating with each other via a bus 410.

The control unit 401 may be a CPU that controls the entirety of the data processing apparatus 40, and performs various calculations and processing. The control unit 401 is an arithmetic unit that executes programs stored in the main storage unit 402, receives data from the input unit 407 and storing units such as the main storage unit 402, the auxiliary storage unit 403 or the like, and outputs data to output unit such as the display unit 408 or the like.

The main storage unit 402 may be a Read-Only Memory (ROM), a Random Access Memory (RAM) or the like. The main storage unit 402 stores or temporarily stores programs or data performed by the control unit 401 such as an operating system (OS), which is basic software, or application software.

The auxiliary storage unit 403 may be a Hard Disk Drive (HDD) or the like. The auxiliary storage unit 403 stores data related to the application software or the like.

The external memory I/F unit 404 is an interface between the data processing apparatus 40 and a storage medium 405 (a flash memory, an SD card or the like, for example) which is connected to the data processing apparatus 40 via a data transmission path such as a Universal Serial Bus (USB) or the like.

Further, a predetermined program may be stored in the storage medium 405. Then, the program stored in the storage medium 405 may be installed in the data processing apparatus 40 via the external memory I/F unit 404. Subsequently, the installed program becomes capable of being performed by the data processing apparatus 40.

The network I/F unit 406 is an interface for connecting the data processing apparatus 40 to the network 50 (see FIG. 1). The network 50 may include data transmission paths composed of a Local Area Network (LAN), a Wide Area Network (WAN) or the like each including a wire network and/or a wireless network.

The input unit 407 includes a cursor pad, a keyboard including various keys such as keys for inputting numbers or characters, functional keys or the like, a mouse or a touchpad for selecting keys shown as an image on the display unit 408, or the like. The input unit 407 is a user interface for an operator to input instructions or data to the data processing apparatus 40.

The display unit 408 may includes a cathode-ray tube (CRT), a liquid crystal display (LCD) or the like. The display unit 408 displays display data input from the control unit 401.

The data processing apparatus 40 may not necessarily include the input unit 407 and the display unit 408.

(Functional Structure)

(Image Processing Apparatus 10)

Figure 4:
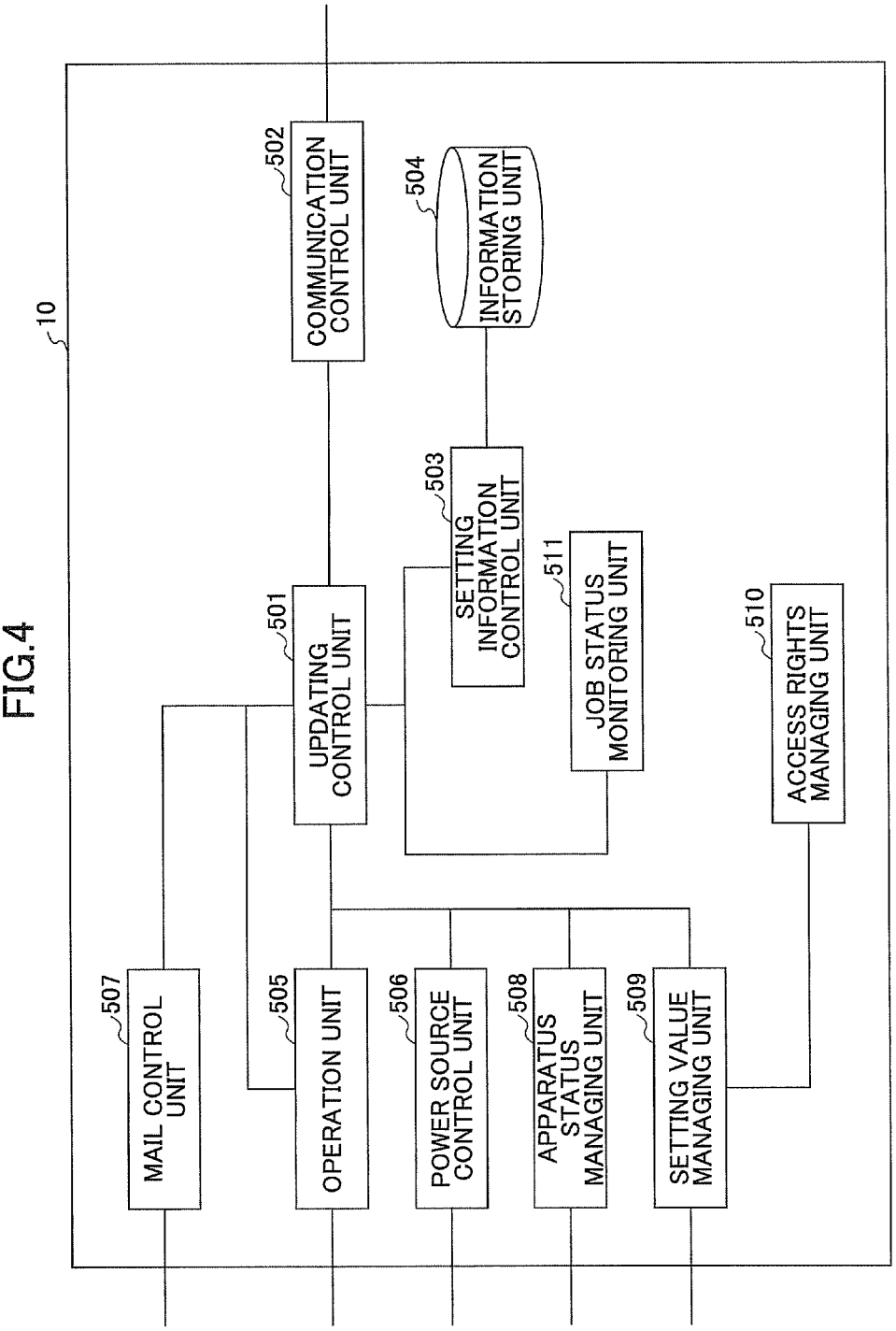
FIG. 4 is a block diagram showing an example of a functional structure of the image processing apparatus of an embodiment.

FIG. 4 is a block diagram showing an example of a functional structure of the image processing apparatus 10 of the embodiment. The image processing apparatus 10 includes an updating control unit 501, a communication control unit 502, a setting information control unit 503, an information storing unit 504, an operation unit 505, a power source control unit 506, a mail control unit 507, an apparatus status managing unit 508, a setting value managing unit 509, an access rights managing unit 510, and a job status monitoring unit 511.

The operation unit 505 is actualized by the operation panel 102, for example. The information storing unit 504 is actualized by the HDD 133, for example. The communication control unit 502 is actualized by the NIC 141 or the like, for example. Other components of the image processing apparatus 10, such as the updating control unit 501, the setting information control unit 503, the power source control unit 506, the mail control unit 507, the apparatus status managing unit 508, the setting value managing unit 509, the access rights managing unit 510, and the job status monitoring unit 511, may be actualized by the CPU 111, for example. Furthermore, the components of the image processing apparatus 10 other than the information storing unit 504 may be mounted as a module.

The updating control unit 501 detects a predetermined trigger and controls an operation of setting and updating the preference information. The predetermined trigger may be an operation by an operator, timing when the power source of the image processing apparatus 10 is switched on, regularly predetermined timing, changing of the preference information by an operator or the like, an occurrence of an error in the image processing apparatus 10 or the like.

The function of the updating control unit 501 will be explained later in detail.

The communication control unit 502 controls a communication with external apparatuses such as the data processing apparatus 40 which are connected via the network 50. The communication control unit 502 sends the request for obtaining the preference information to the data processing apparatus 40 based on an instruction from the updating control unit 501 and receives the preference information from the data processing apparatus 40.

The communication control unit 502 may send authentication information (apparatus identification data (ID), a user account and a password, or the like) to the data processing apparatus 40 before sending the request for obtaining the preference information.

The setting information control unit 503 controls an operation of updating the preference information in the image processing apparatus 10. The setting information control unit 503 and the updating control unit 501 may be configured as a single component.

The information storing unit 504 stores information to be set for the image processing apparatus 10 such as the preference information.

The operation unit 505 receives an operation by the operator and provides an image display to the operator. When the operator instructs to update the preference information, the operation unit 505 notifies the fact to the updating control unit 501.

The power supply control unit 506 controls switching on and off of the power source.

The mail control unit 507 controls an operation of sending a mail to an administrator or the like. The mail control unit 507 sends a mail indicating that an error occurs in updating the preference information or a reason of the error to a registered address, for example.

The apparatus status managing unit 508 manages the status of the image processing apparatus 10 and notifies an error or the like to other components.

The setting value managing unit 509 changes setting values of the preference information stored in the information storing unit 504 upon receiving an instruction from the operator. The operator operates the image processing apparatus 10 using the operation unit 505.

The access rights managing unit 510 confirms rights of the operator who is accessing or operating the image processing apparatus 10.

The job status monitoring unit 511 notifies a fact whether a certain job is being performed in the data processing apparatus 10 or the status of the job to other components.

With the above structure, based on the predetermined trigger, the image processing apparatus 10 can send the request for obtaining the preference information to the data processing apparatus 40 and update the setting values of the preference information stored in the information storing unit 504 by the preference information obtained from the data processing device 40. As described above, the image processing apparatuses 20 and 30 have the same structure and function as those of the image processing apparatus 10.

(Data Processing Apparatus 40)

Figure 5:
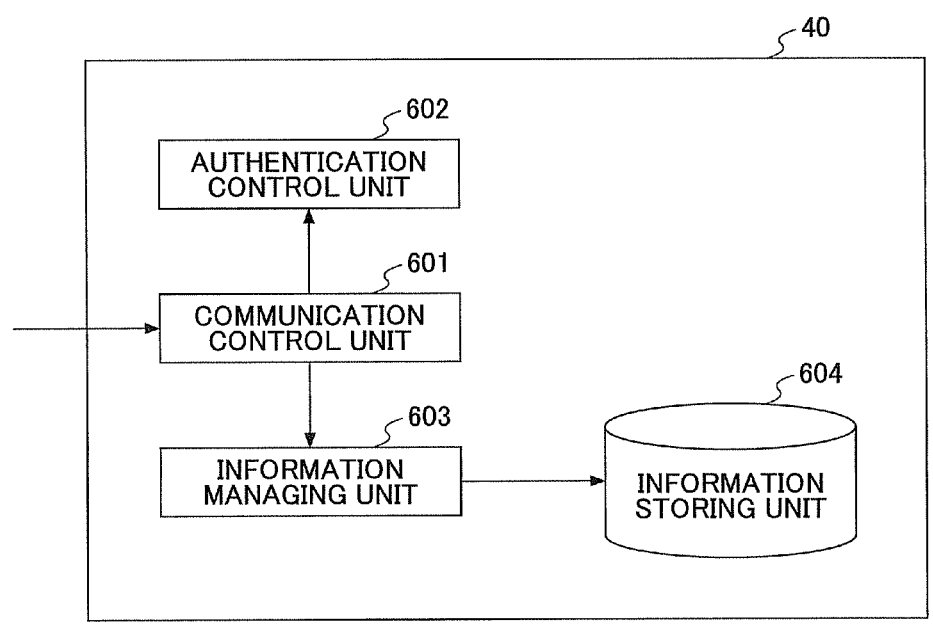
FIG. 5 is a block diagram showing an example of a functional structure of the data processing apparatus of an embodiment.

FIG. 5 is a block diagram showing an example of a functional structure of the data processing apparatus 40 of the embodiment.

The data processing apparatus 40 includes a communication control unit 601, an authentication control unit 602, an information managing unit 603 and an information storing unit 604.

The information storing unit 604 is actualized by the auxiliary storing unit 403, for example. The communication control unit 601, the authentication control unit 602 and the information managing unit 603 may be actualized by the control unit 401 and the main storage unit 402 as a memory work area, for example. Furthermore, the components other than the information storing unit 604 may be mounted as a module.

The communication control unit 601 controls a communication with the image processing apparatus 10 (and the image processing apparatuses 20 and 30) which is connected via the network 50. The communication control unit 601 receives the request for obtaining the preference information or the authentication information from the image processing apparatus 10. Further, the communication control unit 601 sends the requested preference information to the image processing apparatus 10.

When the communication control unit 601 receives the authentication information, the authentication control unit 602 performs an authentication process using the authentication information. The authentication process may include, for example, verifying the obtained apparatus ID, verifying the obtained user account and the password, or the like. The communication control unit 601 sends the result of the authentication process to the image processing apparatus 10.

When the communication control unit 601 receives the request for obtaining the preference information, the information managing unit 603 reads the preference information from the information storing unit 604.

The information storing unit 604 stores a set of preference information. In this embodiment, the set of preference information stored in the information storing unit 604 is prepared to be commonly updated in plural image processing apparatuses which are connected to the data processing apparatus 40 via the network 50. Further, the setting items of the set of preference information are stored in a differentiated manner in accordance with a first predetermined differentiating criterion such that a part of the set of preference information can be separately and independently sent to the image processing apparatus 10. Here, the first predetermined differentiating criterion is to differentiate the setting items of the set of preference information to confirmation data including data for confirming up-to-date of the set of preference information, which may have a small volume, and the rest of the set of preference information, which may have a larger volume.

Figure 6:
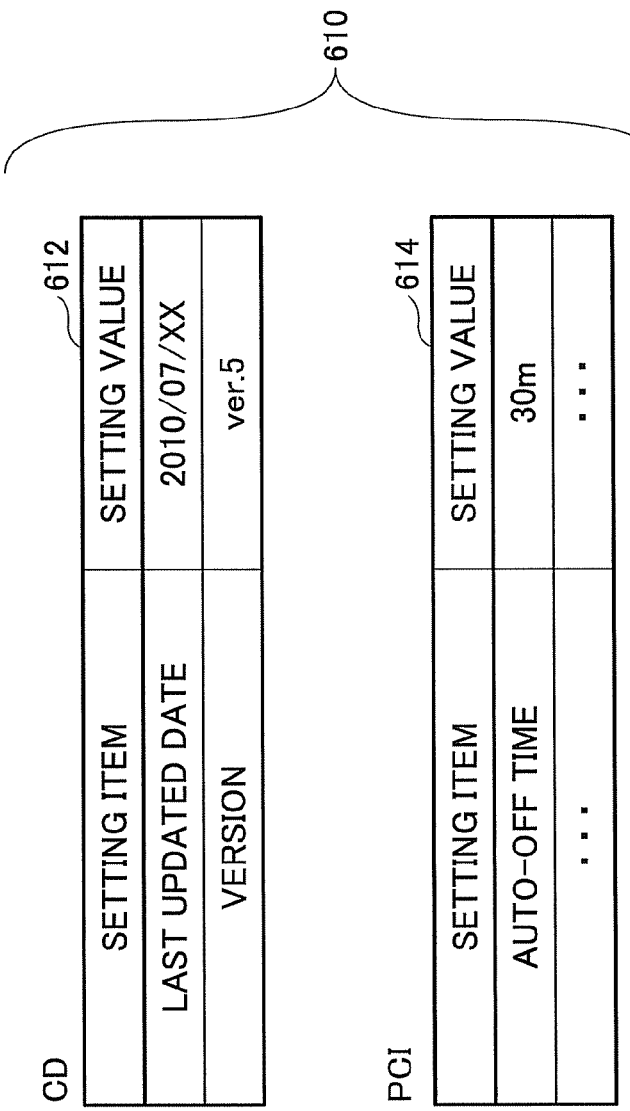
FIG. 6 is a view showing an example of preference information of an embodiment.

FIG. 6 is a view showing an example of the preference information stored in the information storing unit 604 of the embodiment.

In this embodiment, a set of preference information 610 is differentiated into confirmation data 612 and preference content information 614 other than the confirmation data 612. The confirmation data 612 includes data for confirming up-to-date of the set of preference information 610. The confirmation data 612 and the preference content information 614 are corresponded with each other, for example by identification data of the set of preference information 610 such as an ID number or the like.

The confirmation data 612 includes updated date (a timestamp) which indicates when the set of preference information 610 is last updated and preference information version updating date the version of the set of preference information 610. The preference content information 614 includes setting items such as an auto-off time and corresponding setting values for operating the image processing apparatus 10 or the like.

In FIG. 6, an example of setting values for each of the setting items of the confirmation data 612 and the preference content information 614 is shown.

The setting values of the image processing apparatus 10 are updated by the setting values of the respective setting items of the preference content information 614 when the preference content information 614 is sent to the image processing apparatus 10. In such a case, the image processing apparatus 10 is operated to perform the functions of the image processing apparatus 10 in accordance with the setting values of the preference content information 614.

When the set of preference information 610 stored in the information storing unit 604 is updated, the data processing apparatus 40 may send an update massage to the image processing apparatuses 10, 20 and 30 connected to the network 50 by the communication control unit 601.

With the structure of the data processing apparatus 40, it is possible for each of the image processing apparatuses to confirm whether to update the preference information based on the confirmation data 612, before downloading the preference content information 614, which may have a far larger volume than that of the confirmation data 612. Thus, each of the image processing apparatuses can flexibly and independently download and update the entirety of the set of preference information 610.

With this structure, the image processing apparatus 10 can first obtain predetermined differentiated preference information, the confirmation data 612 in this embodiment, which is a part of the set preference information 610 from the data processing apparatus 40 instead of obtaining the entirety of the set preference information 610. Then, the rest of the differentiated preference information, the preference content information 614 in this embodiment, is obtained only when it is determined to be necessary based on the obtained predetermined differentiated preference information. Thus, a time necessary for downloading data can be shortened and the amount of data can also be reduced.

Further, management of the preference information by an administrator or the like can be simplified.
(Operation)

The operation of the information setting system 1 of the embodiment is explained. First, an operation of updating the preference information is explained.
(Basic Operation of Updating Preference Information)

Figure 7:
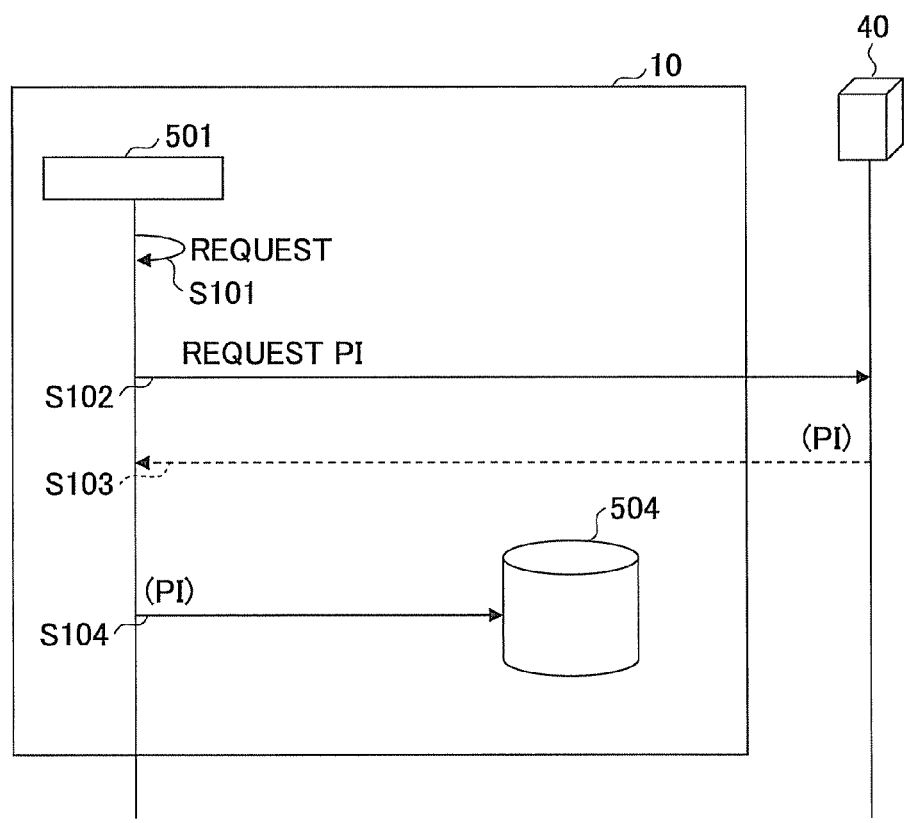
FIG. 7 is a sequence diagram showing an example of an operation of updating the preference information of an embodiment.

FIG. 7 is a sequence diagram showing an example of the operation of updating the preference information of the embodiment.

In step S101, the updating control unit 501 of the image processing apparatuses 10 detects a request for obtaining predetermined preference information based on a predetermined trigger.

Then, in step S102, the updating control unit 501 sends the request for obtaining the predetermined preference information to the data processing apparatus 40.

In step S103, when the data processing apparatus 40 receives the request for obtaining the predetermined differentiated reference information from the image processing apparatus 10, the data processing apparatus 40 reads out the corresponding predetermined preference information and sends it to the image processing apparatus 10.

In step S104, the updating control unit 501 of the image processing apparatus 10 updates the preference information stored in the information storing unit 504 by the obtained preference information.

In this embodiment, the function of the setting information control unit 503 may be included in the updating control unit 501. Similarly, for the following sequence diagrams, it is assumed that the function of the setting information control unit 503 is included in the updating control unit 501. However, alternatively, the setting information control unit 503 may be provided separately from the updating control unit 501. In such a case, the updating control unit 501 may request the setting information control unit 503 to update the preference information in the information, storing unit 504. Then, upon receiving the request, the setting information control unit 503 may update the preference information stored in the information storing unit 504 by the obtained preference information.

In this embodiment, each of the image processing apparatuses 10, 20 and 30 connected to the data processing apparatus 40 via the network 50 performs the operation shown in FIG. 7. Thus, the preference information is sent to the each of the image processing apparatuses 10, 20 and 30 based on the request sent by each of the image processing apparatuses 10, 20 and 30. Therefore, the predetermined preference information can be commonly updated in each of the image processing apparatuses 10, 20 and 30 without overloading the communication path at the same time.
(Operation of Updating Preference Information)

Figure 10:
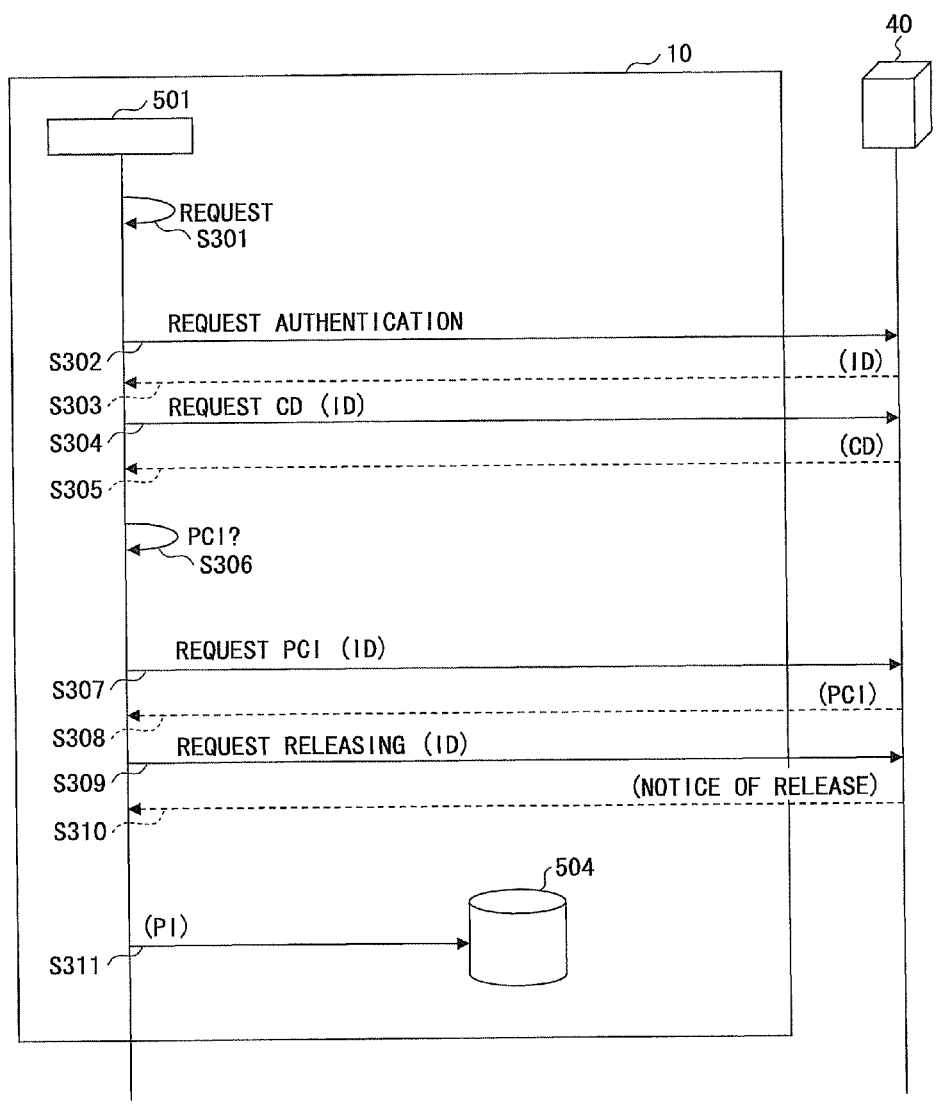
FIG. 10 is a sequence diagram showing an example of an operation of updating the preference information of an embodiment.

FIG. 10 is a sequence diagram showing an example of the operation of updating the preference information of the embodiment.

Here, the preference information is expressed as "PI", the confirmation data is expressed as "PCI", and the preference content information is expressed as "PCI" in the drawings.

In step S301, similar to step S101 shown in FIG. 7, the updating control unit 501 of the image processing apparatuses 10 detects a request for obtaining predetermined differentiated preference information, the confirmation data 612 in this case, based on a predetermined trigger.

As described above, the predetermined trigger may be an operation by an operator, timing when the power source of the image processing apparatus 10 is switched on, regularly predetermined timing, changing of the preference information by an operator or the like, an occurrence of error in the image processing apparatus 10 or the like.

For the example shown in FIG. 10, when the image processing apparatus 10 sends the request for obtaining the preference information, an authentication process is performed.

In step S302, the updating control unit 501 sends a request for the authentication process with authentication information to the data processing apparatus 40 via the communication control unit 502. The authentication information may be apparatus ID, a user account and a password, or the like.

In step S303, the authentication control unit 602 of the data processing apparatus 40 performs the authentication process based on the received authentication information. For example, the data processing apparatus 40 may previously store apparatus IDs of the image processing apparatuses or sets of user accounts and passwords corresponding to the user accounts, respectively, of users, for which the differentiated preference information stored in the information storing unit 604 are allowed to be provided. Then, the authentication control unit 602 of the data processing apparatus 40 compares the received authentication information with the previously stored authentication information and determines that the authentication is successful when the authentication information match, for example.

In step S303, when the authentication is successful, the data processing apparatus 40 issues authenticated ID and sends in to the image processing apparatus 10. Further, when the authentication is successful, the data processing apparatus 40 may temporarily store the authenticated ID.

In step S304, when the updating control unit 501 receives the authenticated ID from the data processing apparatus 40, the updating control unit 501 sends the request for obtaining the confirmation data 612 in this case, via the communication control unit 502 to the data processing apparatus 40. At this time, the request includes the authenticated ID as well.

In step S305, when the data processing apparatus 40 receives the request for obtaining the confirmation data 612, the information managing unit 603 reads the confirmation data 612 from the information storing unit 604 and sends it to the image processing apparatus 10 via the communication control unit 601. Thus, the image processing apparatus 10 obtains the confirmation data 612.

In step S306, the updating control unit 501 determines whether it is necessary to update the preference information based on the confirmation data 612. This process will be explained later in detail with reference to FIG. 11.

For the example shown in FIG. 10, it is assumed that the updating control unit 501 determines to update the preference information based on the confirmation data 612.

In such a case, in step S307, the updating control unit 501 sends the request for obtaining the predetermined differentiated preference information, the preference content information 614 in this case, to the data processing apparatus 40 via the communication control unit 502. At this time, the request includes the authenticated ID as well.

In step S308, when the data processing apparatus 40 receives the request for obtaining the preference content information 614, the information managing unit 603 reads the preference content information 614 from the information storing unit 604, and sends it to the image processing apparatus 10 via the communication control unit 601. Thus, the image processing apparatus 10 obtains the preference content information 614.

In step S309, the updating control unit 501 sends a request for releasing the authentication including the authenticated ID to the data processing apparatus 40.

In step S310, when the data processing apparatus 40 receives the request for releasing the authentication, the data processing apparatus 40 deletes the temporarily stored authenticated ID and releases the authentication. Then, the data processing apparatus 40 sends a notice of release to the image processing apparatus 10.

In step S311, similar to step S104 shown in FIG. 7, the updating control unit 501 updates the preference information stored in the information storing unit 504 by the obtained preference information composed of the confirmation data 612 and the preference content information 614. Thus, in this case, it means that the set of preference information 610 is set in the information storing unit 504.

(Determining Whether it is Necessary to Update Preference Information)

Figure 11:
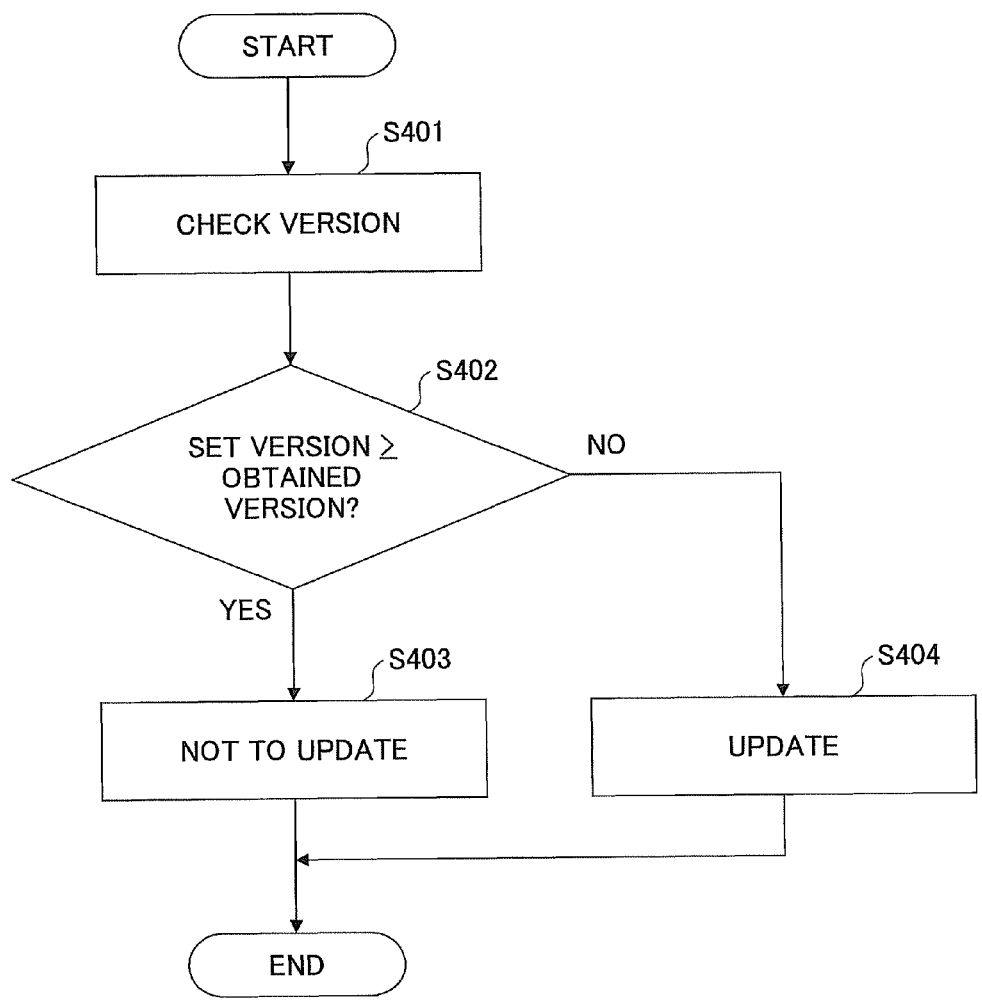
FIG. 11 is a flowchart showing an example of an operation of determining whether it is necessary to update the preference information of an embodiment.

FIG. 11 is a flowchart showing an example of the operation of determining whether it is necessary to update the preference information of the embodiment. For the example shown in FIG. 11, whether it is necessary to update the preference information is determined based on the preference information version included in the confirmation data 612.

In step S401, the updating control unit 501 checks the preference information version (simply referred to as a "set preference information version" hereinafter) of the preference information stored in the information storing unit 504 and the obtained preference information version.

In step S402, the updating control unit 501 determined whether the set preference information version is newer than or equal to the obtained preference information version. When the set preference information version is newer than or equal to the obtained preference information version (YES in step S402), it is determined not to update the preference content information (step S403). When the set preference information version is older than the obtained preference information version (NO in step S402), it is determined to update the preference content information (step S404).

Examples for cases when the set preference information version is newer than the obtained preference information version (YES in step S402) are as follows.

A case when a wrong set of preference information is stored in the data processing apparatus 40, a case where the image processing apparatus 10 including preference information of a version newer than that stored in the data processing apparatus 40 is newly connected to the network 50, a case where preference information of a version newer than that stored in the data processing apparatus 40 is independently installed in the image processing apparatus 10 without using the processing apparatus 40, or the like.

In step S403, the updating control unit 501 determines to end the operation of obtaining the preference content information 614.

In step S404, the updating control unit 501 determines to obtain the preference content information 614. After step S404, the processes from step S307 shown in FIG. 10 are performed.

With this structure, the preference content information 614 is downloaded from the data processing apparatus 40 only when it is determined to be necessary. Thus, an unnecessary download can be prevented so that a time during which the image processing apparatus 10 cannot be used because of the operation of updating the preference information can be shortened.

(Operation When it is Unnecessary to Update)

Figure 12:
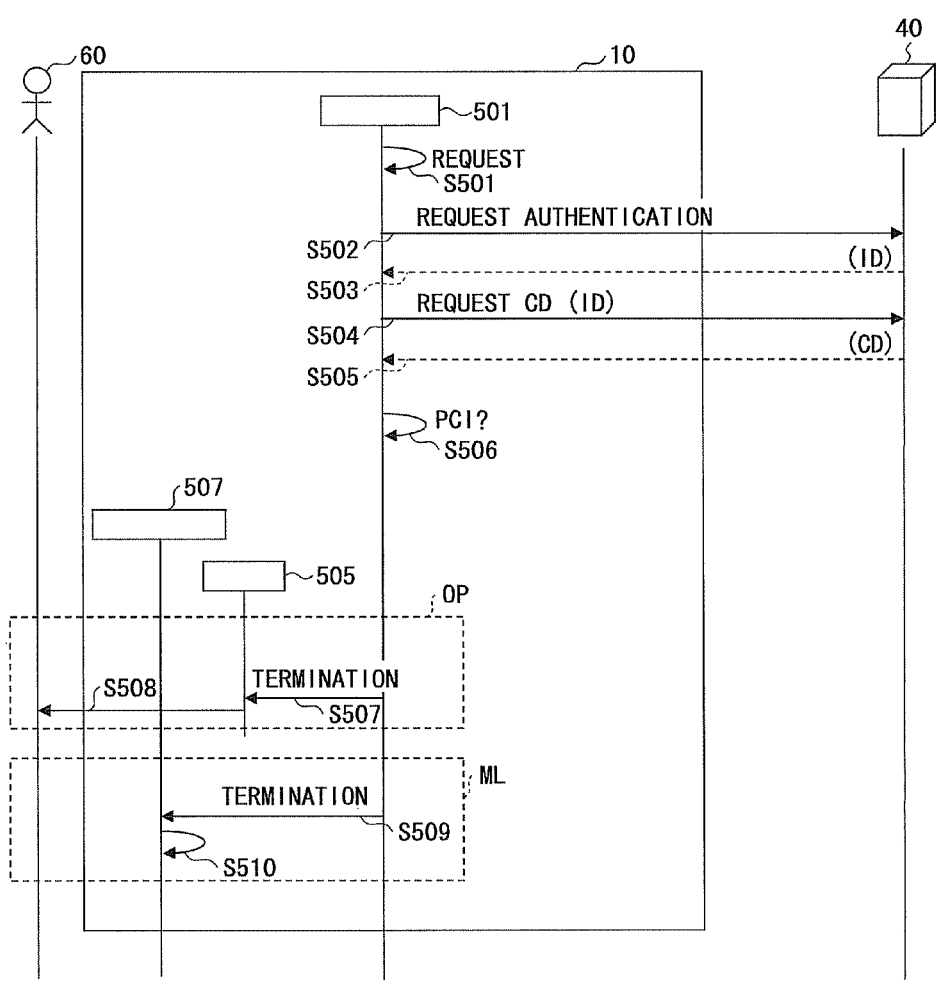
FIG. 12 is a sequence diagram showing an example of an operation of updating the preference information of an embodiment.

FIG. 12 is a sequence diagram showing an example of the operation of canceling updating the preference information of the embodiment.

Steps S501 to S506 shown in FIG. 12 are the same as steps S301 to S306 shown in FIG. 10, respectively, and the explanation is not repeated.

In this example, contrary to the case shown in FIG. 10, it is assumed that the updating control unit 501 determines not to update the preference information based on the confirmation data 612 in step S506 (corresponding to step S306 in FIG. 10).

In such a case, in step S507, the updating control unit 501 outputs a notice of termination of the operation of updating the reference information to the operation unit 505.

In step S508, upon receiving the notice of termination, the operation unit 505 displays a screen indicating that the operation of updating the preference information is canceled.

Figure 13:
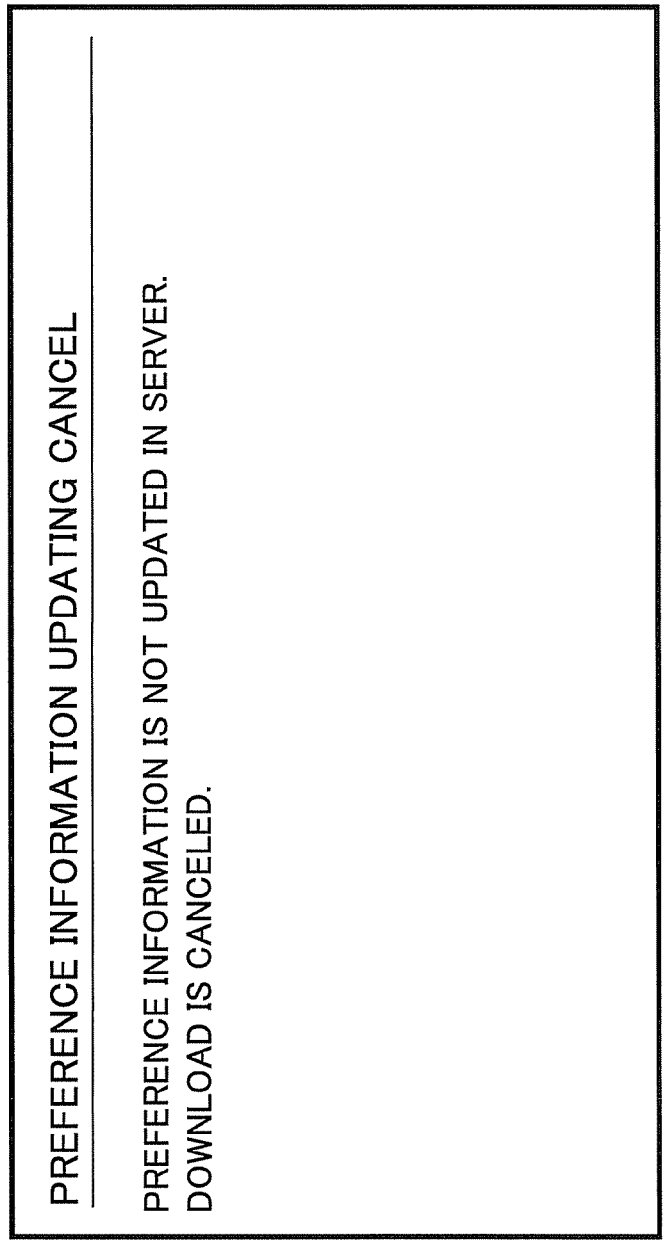
FIG. 13 is a view showing an example of a screen indicating that an operation of updating the preference information is canceled.

FIG. 13 is a view showing an example of the screen indicating that the operation of updating the preference information is canceled. As shown in FIG. 13, in the screen, a fact that the preference information in the server (the data processing apparatus 40) is not updated and a fact that the operation of updating the preference information is canceled are displayed, for example.

Referring back to FIG. 12, in step S509, the updating control unit 501 also outputs the notice of termination to the mail control unit 507.

In step S510, upon receiving the notice of termination, the mail control unit 507 sends a mail including a message indicating that the operation of updating the preference information is canceled to an administrator 60. The content of the mail may be similar to that displayed on the operation panel 102 as shown in FIG. 13. The mail control unit 507 may previously store a mail address of the administrator 60.

Steps S507 to S508 are processes for the operation panel 102 (expressed as "OP" in the drawings), and steps S509 to S510 are processes for the mail control unit 507 (expressed as "ML" in the drawings, where both processes may be performed or only one of the processes may be performed.

With this structure, the administrator 60 can recognize that the reason of cancellation is that it is unnecessary to update the preference information, not an occurrence of an error.

(Operation When Error Occurs)

Figure 14:
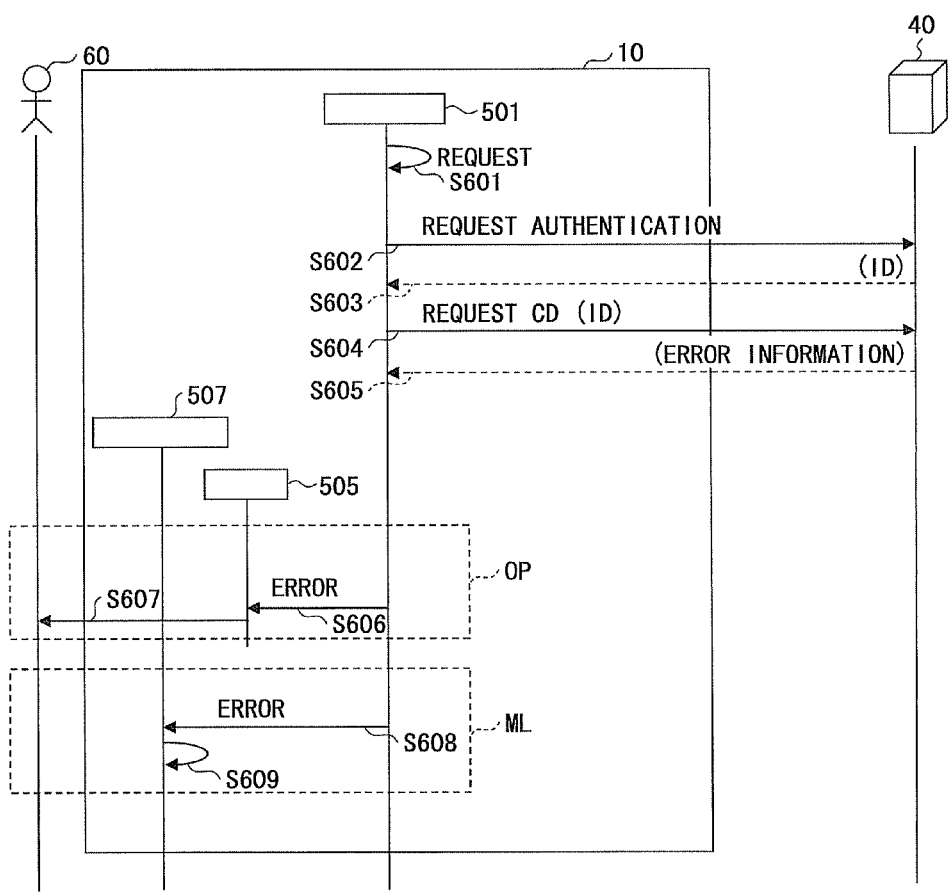
FIG. 14 is a sequence diagram showing an example of the operation of an embodiment when an error occurs in updating the preference information.

FIG. 14 is a sequence diagram showing an example of the operation of the embodiment when an error occurs in updating the preference information.

Steps S601 to S604 shown in FIG. 14 are the same as steps S301 to S304 shown in FIG. 10, respectively, and the explanation is not repeated.

It is assumed that an error occurs at the data processing apparatus 40 such as the predetermined set of preference information is not stored in the data processing apparatus 40 or the like.

In such a case, in step S605, the data processing apparatus 40 sends error information to the image processing apparatus 10. The error information may include a reason of the error such as the confirmation data 612 of the predetermined set of preference information is not stored in the data processing apparatus 40 or the like.

In step S606, the updating control unit 501 outputs a notice of error in updating to the operation unit 505. At this time, the updating control unit 501 outputs a status of the setting error and the error information.

In step S607, upon receiving the status of an error, the operation unit 505 displays a screen indicating that the error occurs in updating.

FIG. 15 is a view showing an example of the screen indicating that the error occurs in updating. As shown in FIG. 15, in the screen, a fact that the operation of updating the preference information has not successful and the reason of the error are displayed, for example. The reason of the error is displayed based on the error information. FIG. 15 shows an example when the predetermined preference information is not stored in the data processing apparatus 40.

Referring back to FIG. 14, in step S608, the updating control unit 501 also outputs the notice of the error to the mail control unit 507.

In step S609, upon receiving the notice of the error, the mail control unit 507 sends a mail including a message indicating that the error occurs in updating to the administrator 60. The content of the mail may be similar to that displayed on the operation panel 102 as shown in FIG. 15. The mail control unit 507 may previously store a mail address of the administrator 60.

Steps S606 to S607 are processes for the operation panel 102, and steps S608 to S609 are processes for the mail control unit 507, where both processes may be performed or only one of the processes may be performed.

With this structure, the fact that updating the preference information is not successful and the reason of the error can be notified to the administrator 60.

As described above, according to the first embodiment, by differentiating the setting items of the set of preference information 610 stored in the information storing unit 604 of the data processing apparatus 40 into the confirmation data 612 and the preference content information 614, whether it is necessary to update the preference information stored in the image processing apparatus 10 can be previously determined before downloading the preference content information 614. Thus, an unnecessary download can be prevented when the preference information stored in the image processing apparatus 10 is already updated by the set of preference information 614 stored in the data processing apparatus 40 or the like.

Second Embodiment

The information setting system 1 of the second embodiment is explained. In this embodiment, the setting items of the set of preference information are stored in the data processing apparatus 40 in a differentiated manner in accordance with a second predetermined differentiating criterion. The second predetermined differentiating criterion is to differentiate the setting items of the set of preference information in accordance with applications of the image processing apparatuses. Here, the "application" means a function of the image processing apparatuses such as a copying function, a scanner function, a printer function, a facsimile function or the like.

The set of preference information is differentiated into preference information specific to applications and preference information non-specific to applications, based on whether being related and specific to applications. Further, the preference information specific to applications is further differentiated into plural data sets for each of the applications.

(Hardware Structure)

The system structure of the information setting system 1 and the hardware structures of each of the apparatuses 10 and 40 (20 and 30) are the same as those explained in the first embodiment. Thus, the same numerals are provided and the explanation is not repeated.

(Functional Structure)

The functional structures of each of the apparatuses 10 and 40 (20 and 30) are the same as those explained in the first embodiment. Thus, the same numerals are provided and the explanation is not repeated.

The information storing unit 604 of the data processing apparatus 40 stores the setting items of the set of preference information in a differentiated manner. In this embodiment, as described above, the set of preference information is differentiated into the preference information specific to applications and the preference information which is not specific to the applications (which will be referred to as "preference information non-specific to applications" hereinafter).

FIG. 16 is a view showing an example of a set of preference information 626 stored in the information storing unit 604 of the embodiment.

The set of preference information 626 is differentiated into preference information non-specific to applications 628 and preference information specific to applications 630.

In this example, the preference information specific to applications 630 is further differentiated into plural data sets of preference information specific to applications for each of the applications. Thus, the set of preference information 626 is further differentiated into preference information for copying function 631, preference information for scanner function 632, preference information for printer function 633, and preference information for facsimile function 634.

In other words, the preference information non-specific to applications 628 may commonly affect all the applications, but each of the preference information for copying function 631, the preference information for scanner function 632, the preference information for printer function 633, and preference information for facsimile function 634 may not affect all other applications.

The preference information non-specific to applications 628 includes setting values for setting items which are unrelated to the applications for items such as timer, network, authentication or the like.

The preference information for copying function 631 includes setting values for setting items of the copying function such as color/monochrome, sort or the like.

The preference information for scanner function 632 includes setting values for setting items of the scanner function such as color/monochrome, resolution, restriction of sending mail or the like.

The preference information for printer function 633 includes setting values for setting items of the printer function such as color/monochrome, job splitting, page size or the like.

The preference information for facsimile function 634 includes setting values for setting items of the facsimile function for items such as sending, reading and receiving.

With this structure, the image processing apparatus 10 is capable of downloading the preference information for each of the applications which are included in the image processing apparatus 10. Further, as it is possible to download the preference information for each of the applications, excess download of the preference information can be reduced. Further, the preference information non-specific to applications may be commonly set for all of the image processing apparatuses and the preference information for each of the applications may be separately set for each of the image processing apparatuses, for example.

(Operation)

The operation of the information setting system 1 of the embodiment is explained.

(Operation of Updating Preference Information (1))

Figure 17:
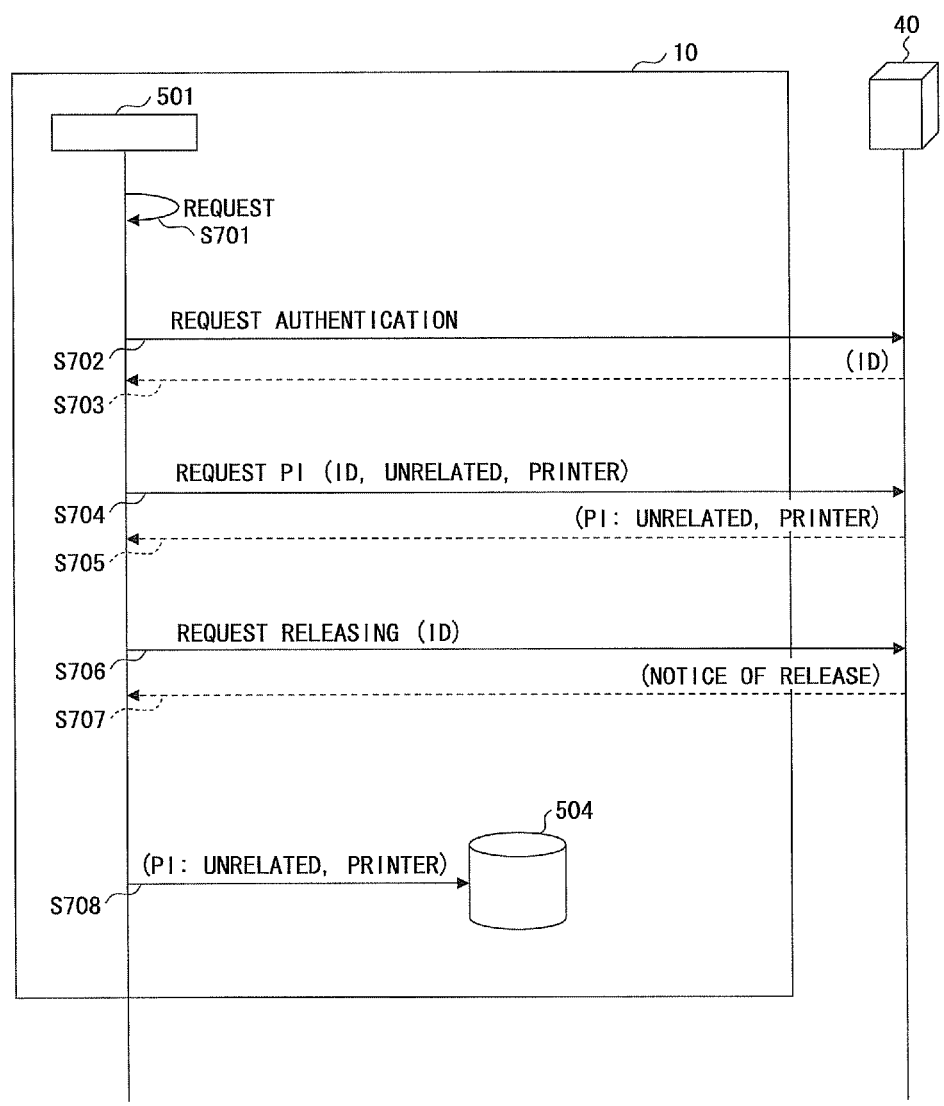
FIG. 17 is a sequence diagram showing an example of an operation of updating the preference information of an embodiment.

FIG. 17 is a sequence diagram showing an example of the operation of updating the preference information of the embodiment.

Steps S701 to S703 shown in FIG. 17 are the same as steps S301 to S303 shown in FIG. 10, respectively, and the explanation is not repeated.

In step S704, the updating control unit 501 sends the request for obtaining a certain part of the set of preference information 626 to the data processing apparatus 40 via the communication control unit 502.

In this case, it is assumed that the image processing apparatus 10 only includes the printer function. Thus, the updating control unit 501 forms the request to include information indicating which part of the set of preference information 626 is to be obtained based on the applications included in the image processing apparatus 10.

Thus, in this case, the request includes the authenticated ID obtained in step S703, and a request for obtaining the preference information non-specific to applications 628 and the preference information for printer function 633.

In step S705, when the data processing apparatus 40 receives the request for obtaining the part of the set of preference information 626, the information managing unit 603 reads the respective part of the set of preference information 626 from the information storing unit 604 and sends them to the image processing apparatus 10. In this case, the image processing apparatus 10 obtains (downloads) the preference information non-specific to applications 628 and the preference information for printer function 633.

Steps S706 and S707 shown in FIG. 17 are the same as steps S309 and S310 shown in FIG. 10, respectively, and the explanation is not repeated.

In step S708, the updating control unit 501 updates the preference information stored in the information storing unit 504 by the obtained part of the set of preference information 626.

With this structure, it is unnecessary for the image processing apparatus 10 to download preference information for application which is not mounted on (or installed in) the image processing apparatus 10 so that period necessary for downloading the preference information can be shortened. Further, it is unnecessary for the data processing apparatus 40 to prepare plural sets of preference information for plural image processing apparatus on which applications mounted (or installed) are different. Further, the updating control unit 501 of the image processing apparatus 10 may determine order for downloading each of the preference information for application based on whether the applications are being performed, frequency of usage of the applications, or the like, and may the request for obtaining the respective preference information for the application in order to the data processing apparatus 40.

(Operation for Case Where Job is Being Performed When Updating)

Figure 18:
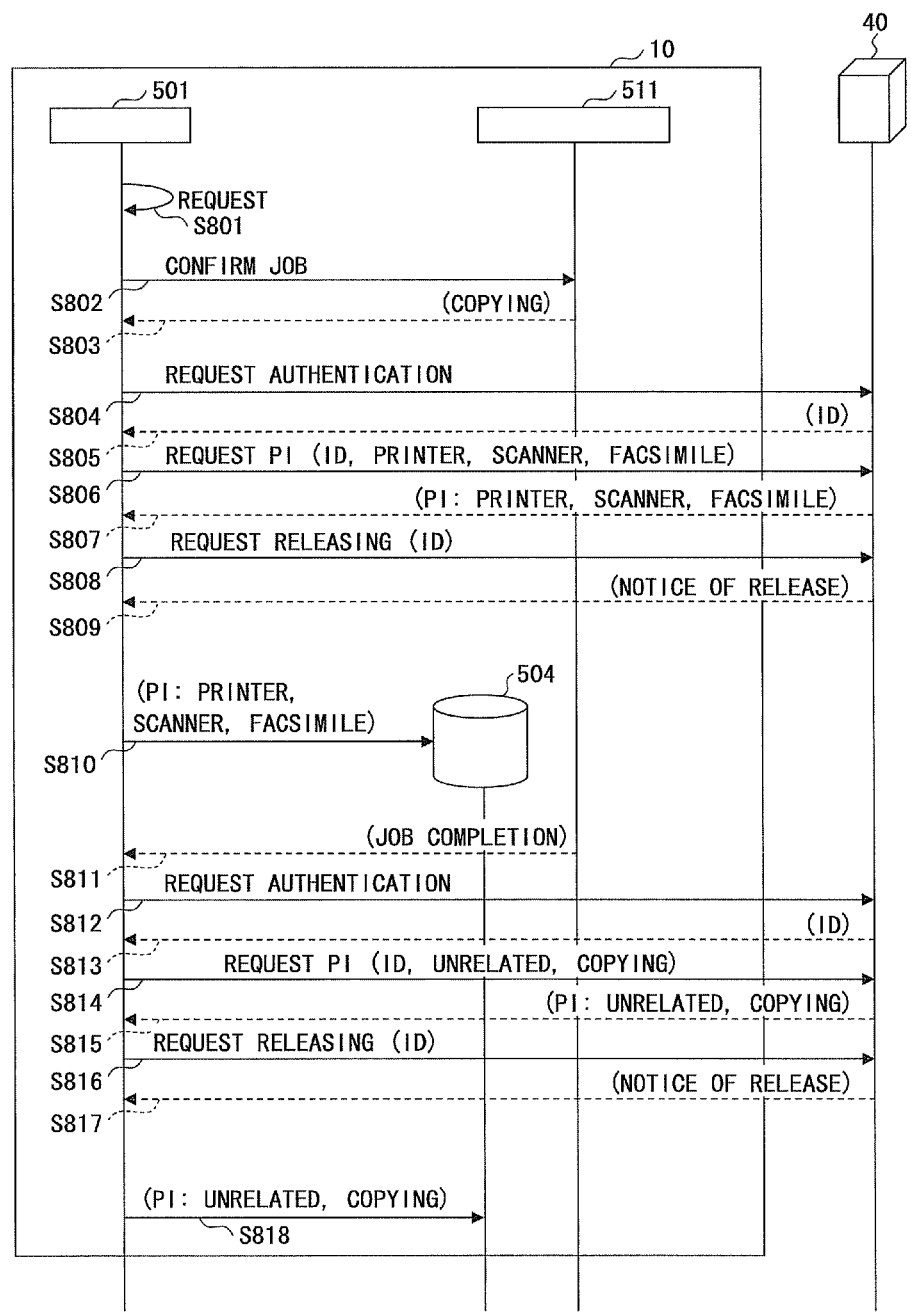
FIG. 18 is a sequence diagram showing an example of an operation of updating the preference information of an embodiment for a case where a job is being performed when updating.

FIG. 18 is a sequence diagram showing an example of the operation of updating the preference information of the embodiment for a case where a job is being performed when updating.

In this case, when a job of an application is being performed, the preference information for the application is downloaded after the job is completed. Further, as the non-specific to applications may affect the application the job of which is being performed, the non-specific to applications is also downloaded after the job is completed.

In step S801, the updating control unit 501 detects a request for obtaining a certain part of the set of preference information 626 based on a predetermined trigger.

In this case, it is assumed that the image processing apparatus 10 includes the copying function, the scanner function, the printer function, and facsimile function. Thus, the preference information non-specific to applications 628, the preference information for copying function 631, the preference information for scanner function 632, the preference information for printer function 633, and preference information for facsimile function 634 are to be downloaded from the data processing apparatus 40.

In step S802, the updating control unit 501 confirms to the job status monitoring unit 511 whether a job of each of the applications is being performed.

In step S803, it is assumed that the job status monitoring unit 511 detects a job of an application, the copying function in this case, is being performed. Then, the job status monitoring unit 511 notifies the fact to the updating control unit 501. With this operation, the first preference information for copying function 631 and the preference information non-specific to applications 628 are set to be downloaded after the job of the copying function is finished.

Steps S804 and S805 shown in FIG. 18 are the same as steps S304 and S305 shown in FIG. 10, respectively, and the explanation is not repeated.

In step S806, the updating control unit 501 sends the request for obtaining a certain part of the set of preference information 626 to the data processing apparatus 40 via the communication control unit 502.

In this case, the request includes the authenticated ID obtained in step S805, and a request for obtaining the preference information for scanner function 632, the preference information for printer function 633, and the preference information for facsimile function 634, without the preference information for copying function 631, the job of which is being performed, and the preference information non-specific to applications 628.

In step S807, when the data processing apparatus 40 receives the request for obtaining the part of the set of preference information 626, the information managing unit 603 reads the respective part of the set of preference information 626 from the information storing unit 604 and sends them to the image processing apparatus 10. In this case, the image processing apparatus 10 obtains (downloads) the preference information for scanner function 632, the preference information for printer function 633, and the preference information for facsimile function 634.

Steps S808 and S809 shown in FIG. 18 are the same as steps S309 and S310 shown in FIG. 10, respectively, and the explanation is not repeated.

In step S810, the updating control unit 501 updates the preference information stored in the information storing unit 504 by the obtained part of the set of preference information 626. Here, the preference information for the scanner function, the preference information for the printer function and the preference information for the facsimile function are updated.

In step S811, when the job status monitoring unit 511 detects that the job of the application, the copying function in this case, which is previously detected to be being performed is completed, the job status monitoring unit 511 notifies the fact to the updating control unit 501.

Steps S812 and S813 shown in FIG. 18 are the same as steps S304 and S305 shown in FIG. 10, respectively, and the explanation is not repeated.

In step S814, the updating control unit 501 sends the request for obtaining a certain part of the set of preference information 626 to the data processing apparatus 40 via the communication control unit 502. At this time, the request includes the authenticated ID obtained in step S813, and a request for obtaining the preference information non-specific to applications 628 and the preference information for copying function 631.

In step S815, when the data processing apparatus 40 receives the request for obtaining the part of the set of preference information 626, the information managing unit 603 reads the respective part of the set of preference information 626 from the information storing unit 604 and sends them to the image processing apparatus 10. In this case, the image processing apparatus 10 obtains (downloads) the preference information non-specific to applications 628 and the preference information for copying function 631.

Steps S816 and S817 shown in FIG. 18 are the same as steps S309 and S310 shown in FIG. 10, respectively, and the explanation is not repeated.

In step S818, the updating control unit 501 updates the preference information stored in the information storing unit 504 by the obtained part of the set of preference information 626. Here, the preference information non-specific to applications and the preference information for copying function are updated.

With this structure, the preference information for the application the job of which is not being performed can be updated even when the job of another application is being performed. Further, as the preference information non-specific to applications may affect the applications of the image processing apparatus 10, the preference information non-specific to applications is configured to be updated after the job of the application is completed.

Here, the operation shown in FIG. 18 is a job priority mode in which the operation of updating the preference information for the application, the job of which is being performed, is started after the job is completed.

Alternatively, the operation may be performed in an updating priority mode in which the operation of updating the preference information for the application, the job of which is being performed, is started while the job of is temporarily interrupted, and then, the job of the application is restarted after the operation of updating is completed. As for the sequence shown in FIG. 18, if it is the updating priority mode, the job of the copying function is interrupted after step S803, the preference information for all of the applications are downloaded and updated, and then, the job of the copying function is restarted.

(Operation When Error Occurs)

Figure 19:
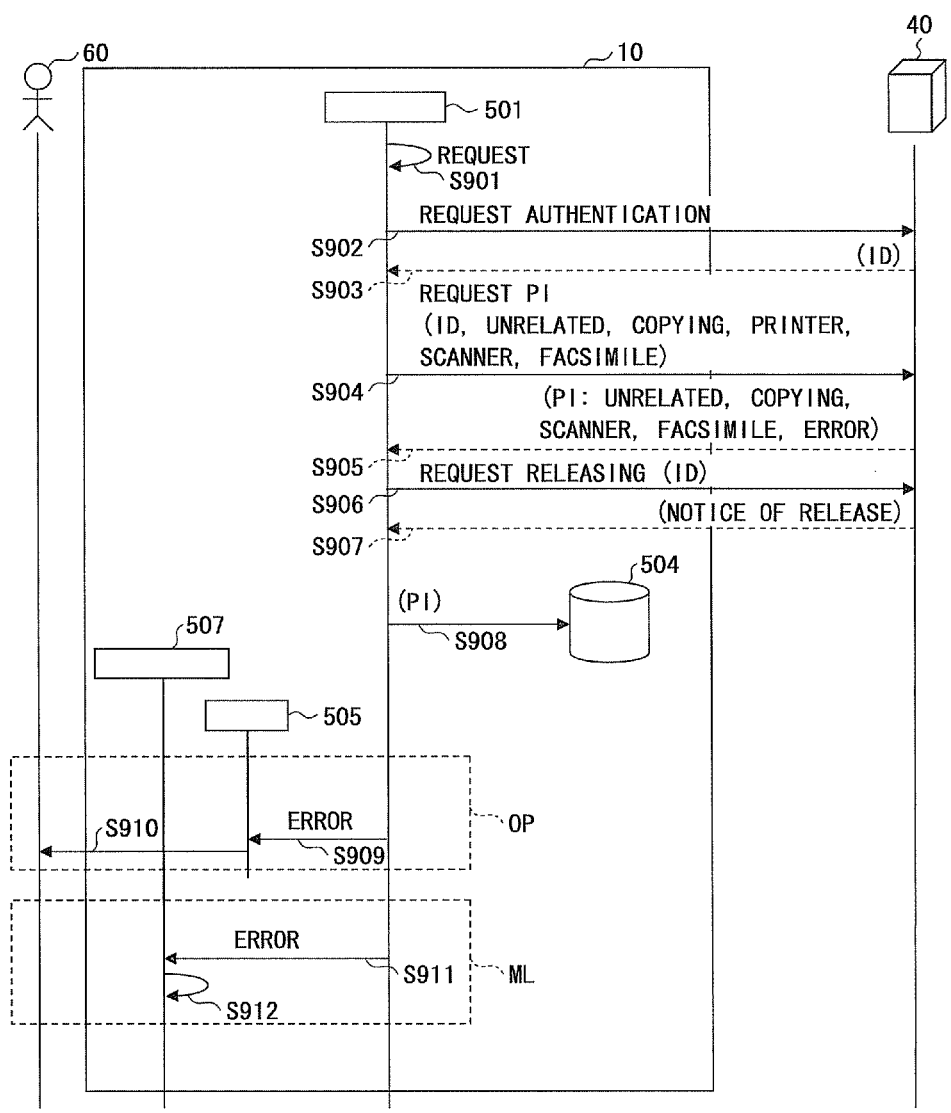
FIG. 19 is a sequence diagram showing an example of the operation of an embodiment when an error occurs in updating the preference information.

FIG. 19 a sequence diagram showing an example of the operation of the embodiment when an error occurs in updating the preference information.

Steps S901 to S903 shown in FIG. 19 are the same as steps S301 to S303 shown in FIG. 10, respectively, and the explanation is not repeated.

In S904, the updating control unit 501 sends the request for obtaining a certain part of the set of preference information 626 to the data processing apparatus 40 via the communication control unit 502.

Here, at this time, it is assumed that the image processing apparatus 10 includes the copying function, the scanner function, the printer function, and facsimile function. Thus, the request includes the authenticated ID obtained in step S903, and a request for obtaining the preference information non-specific to applications 628, the preference information for copying function 631, the preference information for scanner function 632, the preference information for printer function 633, and the preference information for facsimile function 634.

In step S905, when the data processing apparatus 40 receives the request for obtaining the part of the set of preference information 626, the information managing unit 603 reads the respective part of the set of preference information 626 from the information storing unit 604 and sends them to the image processing apparatus 10.

Here, it is assumed that the preference information for printer function 633 is not stored in the information storing unit 604. Thus, in step S905, error information indicating that it is impossible to send the preference information for printer function 633 is sent instead of the preference information for printer function 633.

Therefore, in this case, the image processing apparatus 10 obtains (downloads) the preference information non-specific to applications 628, the preference information for copying function 631, the preference information for scanner function 632, the preference information for facsimile function 634, and the error information.

Steps S906 and S907 shown in FIG. 19 are the same as steps S309 and S310 shown in FIG. 10, respectively, and the explanation is not repeated.

In step S908, the updating control unit 501 updates the preference information stored in the information storing unit 504 by the obtained part of the set of preference information 626. Here, the preference information non-specific to applications, the preference information for copying function, the preference information for scanner function, and the preference information for facsimile function are updated.

In step S909, the updating control unit 501 outputs a notice of error in updating to the operation unit 505. At this time, the updating control unit 501 outputs a status of the setting error and the error information.

In step S910, upon receiving the notice of error, the operation unit 505 displays a screen indicating that the error occurs in updating.

FIG. 20 is a view showing an example of the screen indicating that an error occurs in updating. As shown in FIG. 20, in the screen, the status that updating of preference information is not successful and the reason of the error are displayed, for example. The reason of the error is displayed based on the error information. FIG. 20 shows an example when the preference information for printer function 633 is not stored in the data processing apparatus 40.

Referring back to FIG. 19, in step S911, the updating control unit 501 also outputs the notice of error in updating to the mail control unit 507.

In step S912, upon receiving the notice of error, the mail control unit 507 sends a mail including a message indicating that the error occurs in updating to the administrator 60. The content of the mail may be similar to that displayed on the operation panel 102 as shown in FIG. 20. The mail control unit 507 may previously store a mail address of the administrator 60.

Steps S909 to S910 are processes for the operation panel 102, and steps S911 to S912 are processes for the mail control unit 507, where both processes may be performed or only one of the processes may be performed.

With the above structure, even when an error occurs in updating the preference information for a certain application, the preference information for other applications and the preference information non-specific to applications 628 can be appropriately updated. Further, as the updating control unit 501 specifies the application for which the error occurs in updating in the notification of the error, the administrator 60 can easily recognize the application for which the preference information is not updated.

(Operation of Updating Preference Information (2))

Another example of the preference information of the embodiment is explained.

In this example, the set of preference information 626 includes plural kinds of data sets corresponding to the kinds of apparatuses or the like, for each of or some of the differentiated preference information (which will be referred to as "second kind of differentiated preference information" as well herein after) differentiated in accordance with the second predetermined differentiating criterion.

FIG. 21 is a view partially showing another example of the set of preference information 626 of the embodiment. In this case, the preference information 626 includes plural kinds of data sets corresponding to the kinds of apparatuses, for the preference information non-specific to applications. Here, the set of preference information 626 is configured to include first preference information non-specific to applications 628a for apparatus kind A and second preference information non-specific to applications 628b for apparatus kind B instead of the preference information non-specific to applications 628 shown in FIG. 16.

For the example shown in FIG. 21, a function called "eco log" is added to the apparatus kind B, which is not included in the apparatus kind A. Thus, the second preference information non-specific to applications 628b includes a setting item called "eco log", which is not included in the first preference information non-specific to applications 628a, and a setting value for "eco log".

FIG. 22 is a view partially showing another example of the set of preference information 626 of the embodiment. In this case, the preference information 626 includes plural kinds of data sets corresponding to the kinds of apparatuses, for the preference information for copying function. Here, the set of preference information 626 is configured to include first preference information for copying function 631a for apparatus kind A and second preference information for copying function 631b for apparatus kind B instead of the preference information for copying function 631 shown in FIG. 16.

For the example shown in FIG. 22, functions such as duplex copying (one-side/both sides), punch and staple, which are included for the apparatus kind A, are not included for the apparatus kind B.

As shown in FIG. 21 or FIG. 22, by preparing the plural kinds of data sets corresponding to the kinds of apparatuses or the like for each of or some of the second kind of differentiated preference information, the kind of data sets appropriate for the image processing apparatus 10 can be downloaded.

Figure 23:
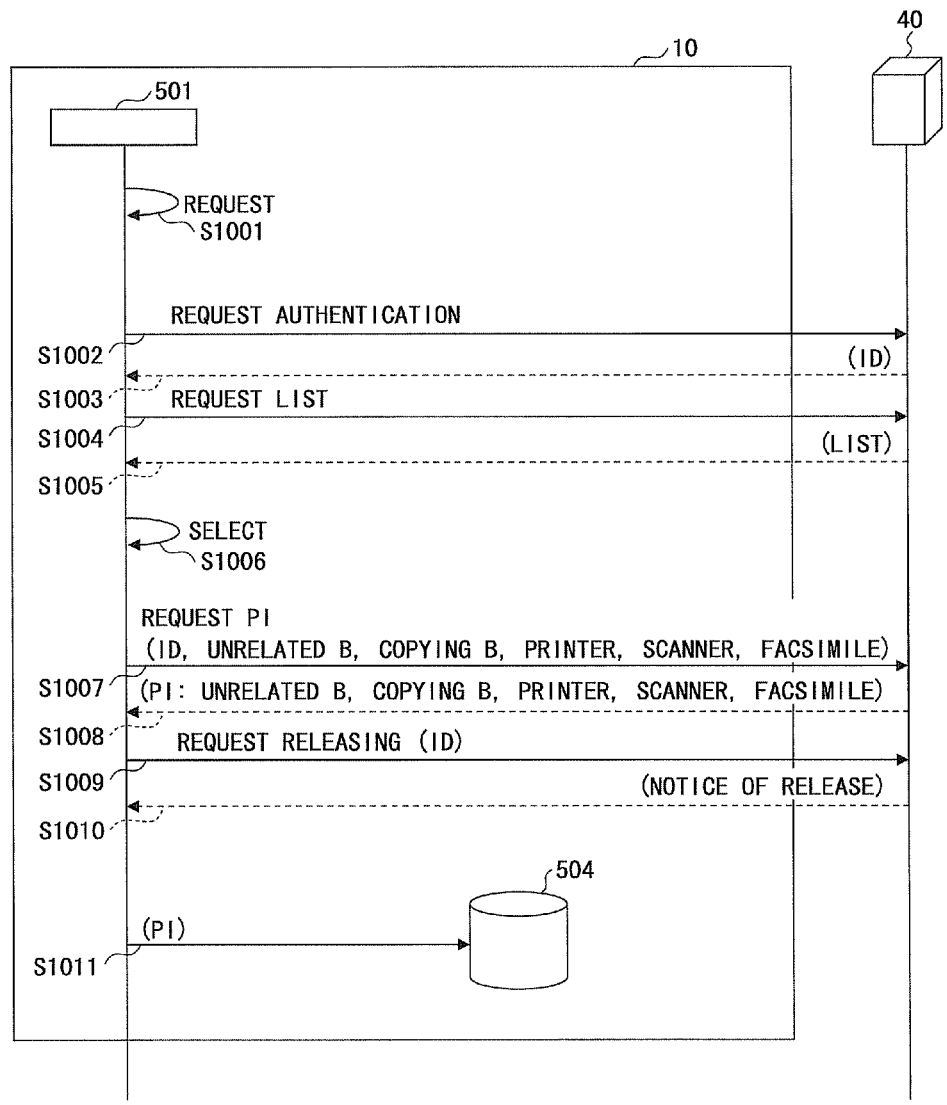
FIG. 23 is a sequence diagram showing another example of the operation of updating the preference information of an embodiment.

FIG. 23 is a sequence diagram showing another example of the operation of updating the preference information of the embodiment. In this case, the set of preference information 626 stored in the data processing apparatus 40 includes plural kinds of data sets for the preference information non-specific to applications and the preference information for copying function as shown in FIG. 21 and FIG. 22.

Steps S1001 to S1003 shown in FIG. 23 are the same as steps S301 to S303 shown in FIG. 10, respectively, and the explanation is not repeated.

In step S1004, the updating control unit 501 sends a request for obtaining a list of the second kind of differentiated preference information to the data processing apparatus 40 via the communication control unit 502.

In step S1005, the data processing apparatus 40 sends the list to the image processing apparatus 10. The list may be stored in the information storing unit 604, for example. The list of the second kind of differentiated preference information shows all of the second kind of differentiated preference information stored in the data processing apparatus 40.

FIG. 24 is a view showing an example of a list 636 of the second kind of differentiated preference information. For the example shown in FIG. 24, plural kinds of data sets for the preference information non-specific to applications and the preference information for copying function are shown.

Although not shown in the drawings, the list 636 may include preference identification data and information indicating the appropriate kind of apparatus such as the apparatus kind name, the apparatus ID or the like, for each of the differentiated preference information.

Referring back to FIG. 23, in step S1006, the updating control unit 501 selects second kind of differentiated preference information necessary to be updated from the list based on the information of the list and the information indicating the kind of apparatus of the image processing apparatus 10 such as the apparatus kind name, the apparatus ID or the like of the image processing apparatus 10. The information indicating the kind of apparatus of the image processing apparatus 10 may be stored in the information storing unit 504 or the like.

Here, it is assumed that the image processing apparatus 10 is of the apparatus kind B. Thus, the updating control unit 501 selects the second preference information non-specific to applications 628*b* for apparatus kind B, the second preference information for copying function 631*b* for apparatus kind B, the preference information for scanner function 632, the preference information for printer function 633, and the preference information for facsimile function 634.

In step S1007, the updating control unit 501 sends a request for obtaining the part of the set of preference information 626 to the data processing apparatus 40 via the communication control unit 502. The request includes the authenticated ID obtained in step S1105, and a request for obtaining the second preference information non-specific to applications 628*b* for apparatus kind B, the second preference information for copying function 631*b* for apparatus kind B, the preference information for scanner function 632, the preference information for printer function 633, and the preference information for facsimile function 634.

In step S1008, when the data processing apparatus 40 receives the request for obtaining the part of the set of preference information 626, the information managing unit 603 reads the respective part of the set of preference information 626 from the information storing unit 604 and sends them to the image processing apparatus 10. Therefore, in this case, the image processing apparatus 10 obtains (downloads) the second preference information non-specific to applications 628*b* for apparatus kind B, the second preference information for copying function 631*b* for apparatus kind B, the preference information for scanner function 632, the preference information for printer function 633, and the preference information for facsimile function 634.

Steps S1009 and S1010 shown in FIG. 19 are the same as steps S309 and S310 shown in FIG. 10, respectively, and the explanation is not repeated.

In step S1011, the updating control unit 501 updates the preference information stored in the information storing unit 504 by the obtained part of the set of preference information 626.

With this structure, by constituting the set of preference information 626 to include the plural kinds of data sets for the differentiated preference information for which setting items (or setting values) are different, the set of preference information 626 can be applicable to plural kinds of apparatuses in updating the preference information. For example, the set of preference information 626 may be configured to include a data set for the kind of apparatus which is released three years ago, and a data set for the kind of apparatus which is released this year, for the differentiated preference information for which setting items (or setting values) are different. In such a case, the data processing apparatus 40 can be applicable to the two kinds of apparatuses in updating the preference information.

Further, alternatively, instead of receiving the list from the data processing apparatus 40, the image processing apparatus 10 may send the information indicating the kind of apparatus of the image processing apparatus 10 to the data processing apparatus 40. Then, the data processing apparatus 40 may select the appropriate second kind of differentiated preference information based on the received information and send them to the image processing apparatus 10.

(Operation of Updating Preference Information (3))

Figure 25:
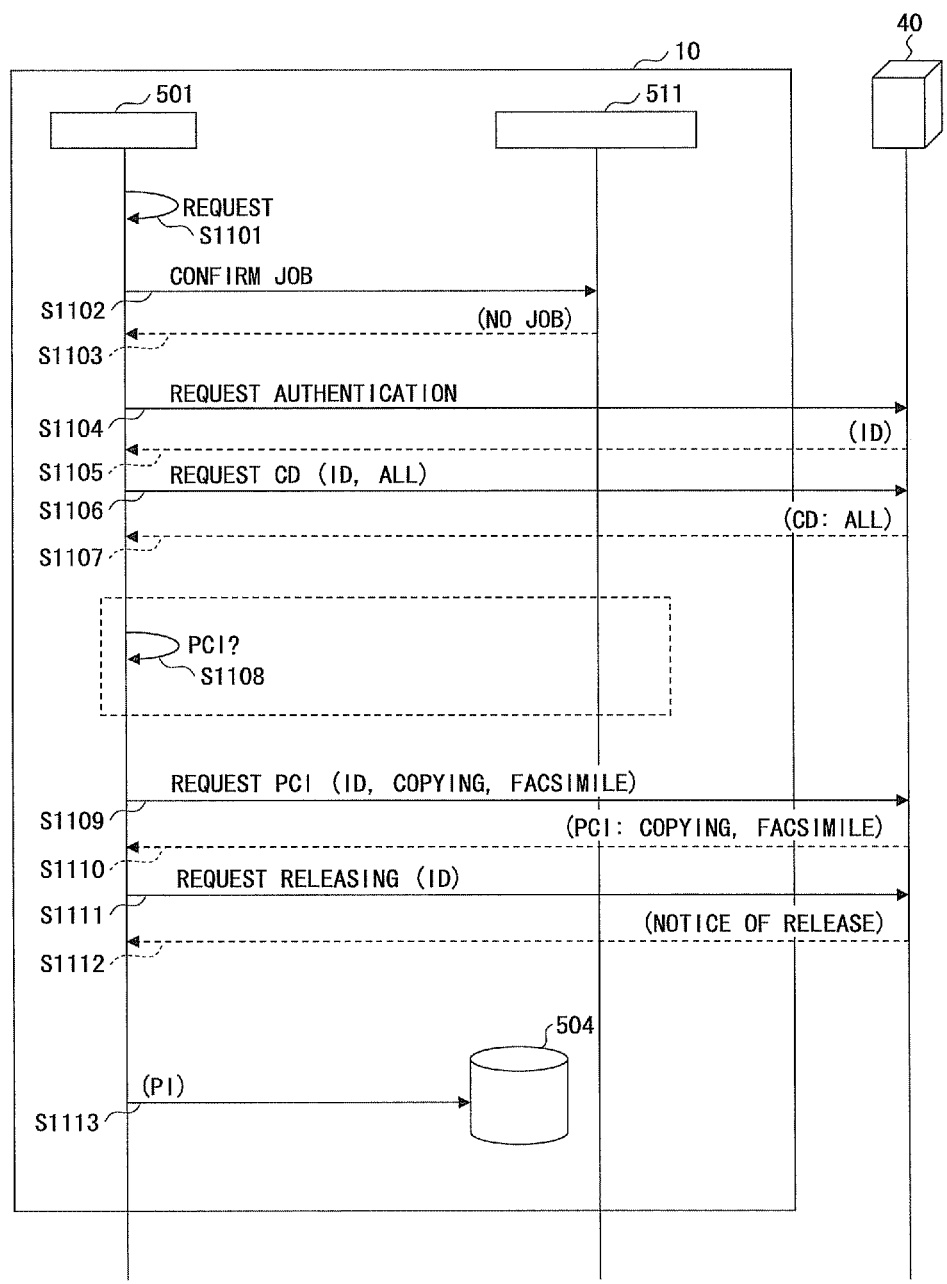
FIG. 25 is a sequence diagram showing another example of the operation of updating the preference information of an embodiment.

FIG. 25 is a sequence diagram showing another example of the operation of updating the preference information of the embodiment. In this example, the set of preference information 626 is further differentiated into the confirmation data and the preference content information as explained in the first embodiment, for each of the second kind of differentiated preference information.

Steps S1101 and step S1102 shown in FIG. 23 are the same as steps S801 and S802 shown in FIG. 18, respectively, and the explanation is not repeated.

In step S1103, it is assumed that no jobs of the applications are being performed. Then, the job status monitoring unit 511 notifies the fact to the updating control unit 501.

Steps S1104 and S1105 shown in FIG. 23 are the same as steps S302 and 303 shown in FIG. 10, respectively, and the explanation is not repeated.

In step S1106, when the updating control unit 501 receives the authenticated ID from the data processing apparatus 40, the updating control unit 501 sends a request for obtaining the confirmation data via the communication control unit 502 to the data processing apparatus 40. The request includes the authenticated ID obtained in step S1105, and a request for obtaining the confirmation data of all of the second kind of differentiated preference information.

In step S1107, when the data processing apparatus 40 receives the request for obtaining the confirmation data, the information managing unit 603 reads the confirmation data of all of the second kind of differentiated preference information from the information storing unit 604 and sends them to the image processing apparatus 10 via the communication control unit 601. Thus, the image processing apparatus 10 obtains (downloads) the confirmation data of all of the second kind of differentiated preference information.

In step S1108, the updating control unit 501 determines whether it is necessary to update the preference information based on the confirmation data. This process is the same as that explained with reference to FIG. 11. The operation of step S1108 is repeated for each of the applications.

It is assumed that the updating control unit 501 determines that it is necessary to update the preference information for copying function and the preference information for facsimile function based on the confirmation data, for the example shown in FIG. 25.

In such a case, in step S1109, the updating control unit 501 sends the request for obtaining the preference content information for the necessary applications to the data processing apparatus 40 via the communication control unit 502. At this time, the request includes the authenticated ID and a request for obtaining the preference content information for copying function and facsimile function.

In step S1110, when the data processing apparatus 40 receives the request for obtaining the preference content information, the information managing unit 603 reads the respective kinds of preference content information from the information storing unit 604, and sends them to the image processing apparatus 10 via the communication control unit 601. Thus, the image processing apparatus 10 obtains (downloads) the preference content information for the copying function and the facsimile function.

Steps S1111 and S1112 shown in FIG. 25 are the same as steps S309 and S310 shown in FIG. 10, respectively, and the explanation is not repeated.

In step S1113, the updating control unit 501 updates the preference information stored in the information storing unit 504 by the obtained part of the set of preference information 626. Here, the obtained part of the set of preference information 626 are the second kind of differentiated preference information for copying function and facsimile function.

With this structure, only the preference information of necessary applications are downloaded so that a period required for updating can be shortened.

Third Embodiment

The information setting system 1 of the third embodiment is explained. In this embodiment, the setting items of the set of preference information are stored in the data processing apparatus 40 in a differentiated manner in accordance with a third predetermined differentiating criterion. The third predetermined differentiating criterion is to differentiate the setting items of the set of preference information in accordance with security policies.

The set of preference information is differentiated into preference information related to security policies and preference information unrelated to security policies, based on whether being related to security policies. Further, the preference information related to security policies is further differentiated into plural data sets for each of the security policies.
(Hardware Structure)

The system structure of the information setting system 1 and the hardware structures of each of the apparatuses 10 and 40 (20 and 30) are the same as those explained in the first embodiment. Thus, the same numerals are provided and the explanation is not repeated.
(Functional Structure)

The functional structures of each of the apparatuses 10 and 40 (20 and 30) are the same as those explained in the first embodiment. Thus, the same numerals are provided and the explanation is not repeated.

The information storing unit 604 of the data processing apparatus 40 stores the setting items of the set of preference information in a differentiated manner. In this embodiment, as described above, the set of preference information is differentiated into the preference information related to security policies and the preference information unrelated to security policies.

FIG. 26 is a view showing an example of a set of preference information 640 stored in the information storing unit 604 of the embodiment.

The set of preference information 640 is differentiated into preference information related to security policies 641 and preference information unrelated to security policies 652.

In this example, the preference information related to security policies 641 is further differentiated into plural data sets of preference information related to security policies for each of the security policies. Thus, the set of preference information 641 is further differentiated into preference information for operational restriction 642, preference information for encryption 644, preference information for passwords 646, preference information for logs 648, and preference information for authentication 650.

The preference information for operational restriction 642 includes setting values for setting items which related to the security policy of operational restriction such as sender utilize restriction or the like.

The preference information for encryption 644 includes setting values for setting items which related to the security policy of encryption such as a cryptographic key for driver or the like.

The preference information related to the security policy of passwords 646 includes setting values for setting items which related to the security policy of passwords such as a complexity of a password or the like.

The preference information for logs 648 includes setting values for setting items which related to the security policy of logs such as job logs or the like.

The preference information for authentication 650 includes setting values for setting items which related to the security policy of authentication such as user authentication or the like.

The preference information unrelated to security policies 652 includes preference information of functions except security policies.

As the preference information 640 is differentiated into the preference information related to security policies 641 and the preference information unrelated to security policies 652, the preference information may be updated with giving a priority to the preference information related to security policies 641. Further, by further categorizing the preference information related to security policies 641 as shown in FIG. 26, the user may select only desired preference information related to security policies to be updated.
(Operation)

The operation of the information setting system 1 of the embodiment is explained.
(Operation of Updating Preference Information (1))

Figure 27:
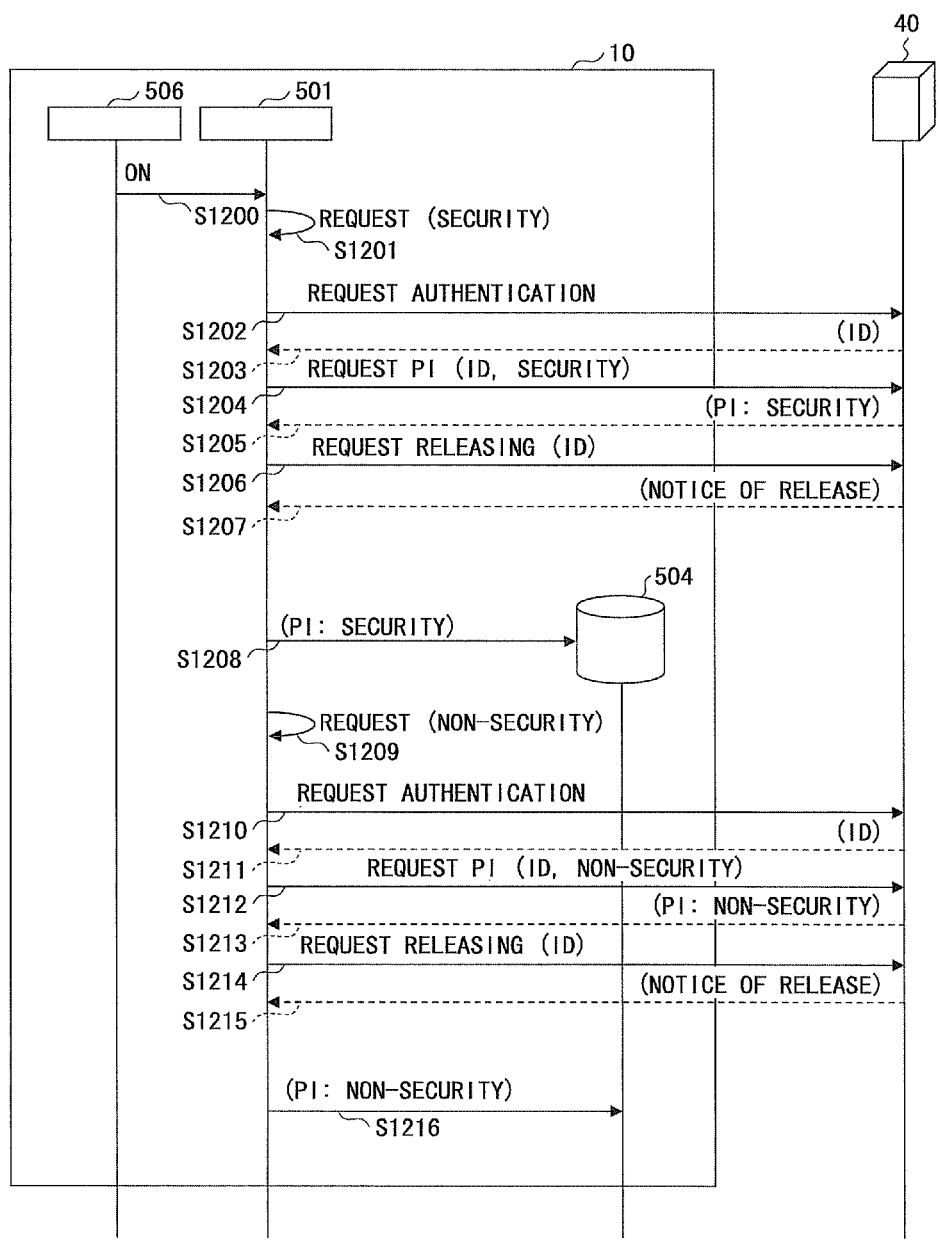
FIG. 27 is a sequence diagram showing an example of an operation of updating the preference information of an embodiment.

FIG. 27 is a sequence diagram showing an example of the operation of updating the preference information of the embodiment. In the operation shown in FIG. 27, the preference information related to security policies is given a priority. Here, the preference information related to security policies is updated prior to the preference information unrelated to security policies.

In step S1200, when the power source control unit 506 detects that a power source of the image processing apparatus 10 is switched on, the power source control unit 506 notifies the fact to the updating control unit 501. In this embodiment, the updating control unit 501 may be configured to detect a request for obtaining a certain part of the set of preference information 640, the preference information related to security policies 641 in this example, when the power source is switched on.

Steps S1201 to S1203 shown in FIG. 27 are the same as steps S301 to S303 shown in FIG. 10, respectively, and the explanation is not repeated.

In step S1204, the updating control unit 501 sends the request for obtaining the part of the set of preference information 640 to the data processing apparatus 40 via the communication control unit 502. The request includes the authenticated ID obtained in step S1203, and a request for obtaining the preference information related to security policies 641.

In step S1205, when the data processing apparatus 40 receives the request for obtaining the part of the set of preference information 640, the information managing unit 603 reads the respective part of the set of preference information 640 from the information storing unit 604 and sends them to the image processing apparatus 10. In this case, the image processing apparatus 10 obtains (downloads) the preference information related to security policies 641.

Steps S1206 and S1207 shown in FIG. 27 are the same as steps S309 and S310 shown in FIG. 10, respectively, and the explanation is not repeated.

In step S1208, the updating control unit 501 updates the preference information stored in the information storing unit 504 by the obtained part of the set of preference information 640. Thus, the preference information related to security policies is updated.

In step S1209, after updating the preference information related to security policies, the updating control unit 501 detect a request for obtaining a certain part of the set of preference information 640, preference information unrelated to security policies 652 in this example.

Steps S1210 and S1211 shown in FIG. 27 are the same as steps S302 and S303 shown in FIG. 10, respectively, and the explanation is not repeated.

In step S1212, the updating control unit 501 sends the request for obtaining the part of the set of preference information 640 to the data processing apparatus 40 via the communication control unit 502. The request includes the authenticated ID obtained in step S1211, and a request for obtaining the preference information unrelated to security policies 652 (non-security).

In step S1213, when the data processing apparatus 40 receives the request for obtaining the part of the set of preference information 640, the information managing unit 603 reads the respective part of the set of preference information 640 from the information storing unit 604 and sends them to the image processing apparatus 10. In this case, the image processing apparatus 10 obtains (downloads) the preference information unrelated to security policies 652.

Steps S1214 and S1215 shown in FIG. 27 are the same as steps S309 and S310 shown in FIG. 10, respectively, and the explanation is not repeated.

In step S1216, the updating control unit 501 updates the preference information stored in the information storing unit 504 by the obtained part of the set of preference information 640. Thus, the preference information unrelated to security policies is updated.

With this structure, when updating the preference information, the preference information related to security policies and the preference information unrelated to security policies can be updated in this order.

(Operation for Case Where Job is Being Performed When Updating)

Figure 28:
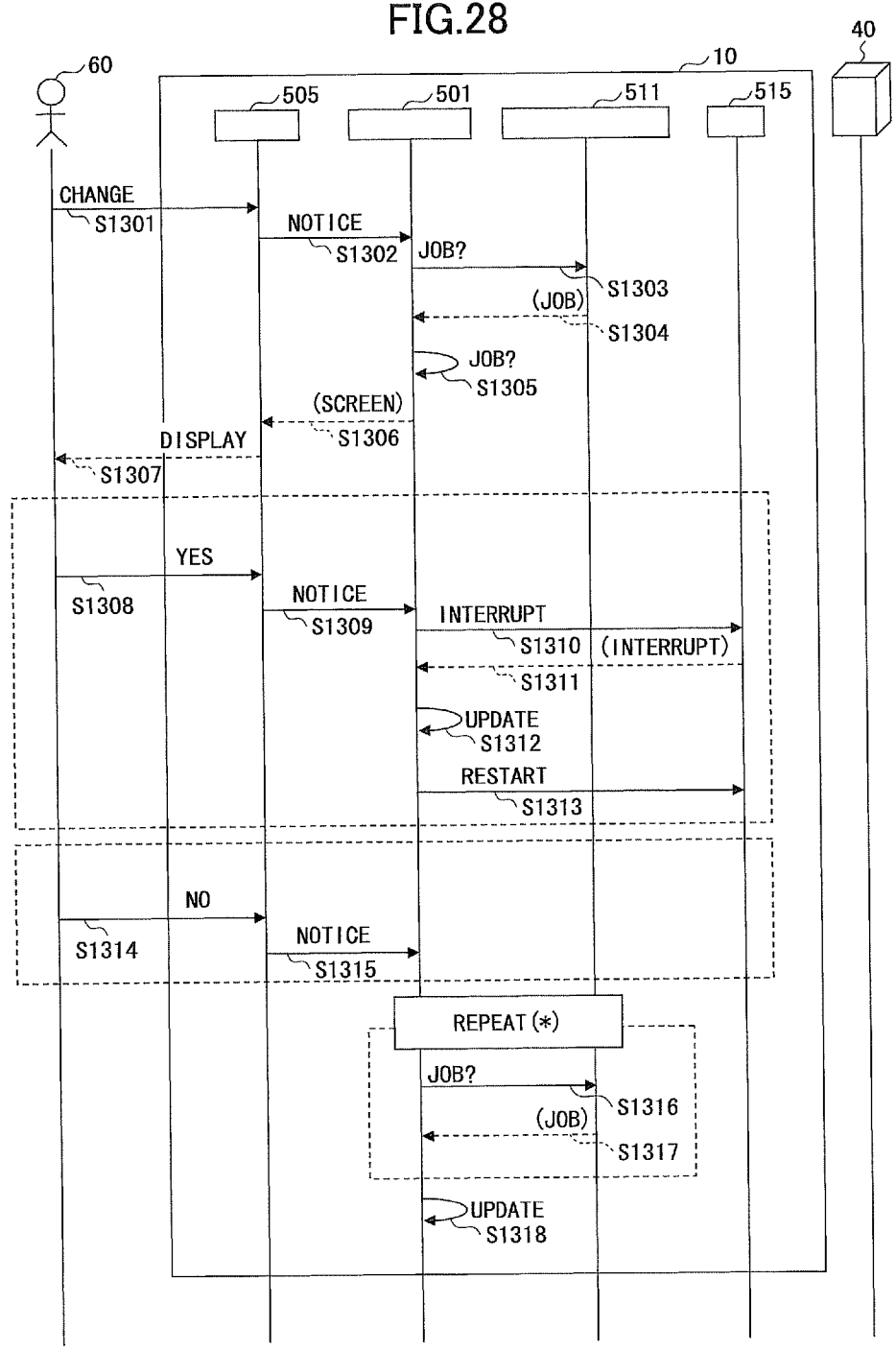
FIG. 28 is a sequence diagram showing an example of an operation of updating the preference information of an embodiment for a case where a job is being performed when updating.

FIG. 28 is a sequence diagram showing an example of the operation of updating the preference information of the embodiment for a case where a job is being performed when updating.

In step S1301, the operation unit 505 accepts an operation by the administrator 60 for requesting the operation of updating the preference information. At this time, the administrator 60 selects the kinds of preference information to be updated.

In step S1302, after accepting the operation by the administrator 60, the operation unit 505 notifies the fact to the updating control unit 501.

In step S1303, the updating control unit 501 confirms to the job status monitoring unit 511 whether a job of each of the applications (which is simply shown as an "application 515" in FIG. 28) is being performed.

In step S1304, it is assumed that the job status monitoring unit 511 detects a job of the application 515 is being performed. Then, the job status monitoring unit 511 notifies the fact to the updating control unit 501.

In step S1305, the updating control unit 501 determines whether the preference information related to security policies 641 is included in the preference information appointed in step S1301 by the administrator 60. Here, it is assumed that the preference information related to security policies 641 is included in the preference information appointed by the administrator 60.

When the fact that the job of the application 515 is being performed is notified in step S1304 and it is determined that the preference information related to security policies 641 is included, in step S1306, the updating control unit 501 requests the operation unit 505 to display an updating confirmation screen.

Figure 29:
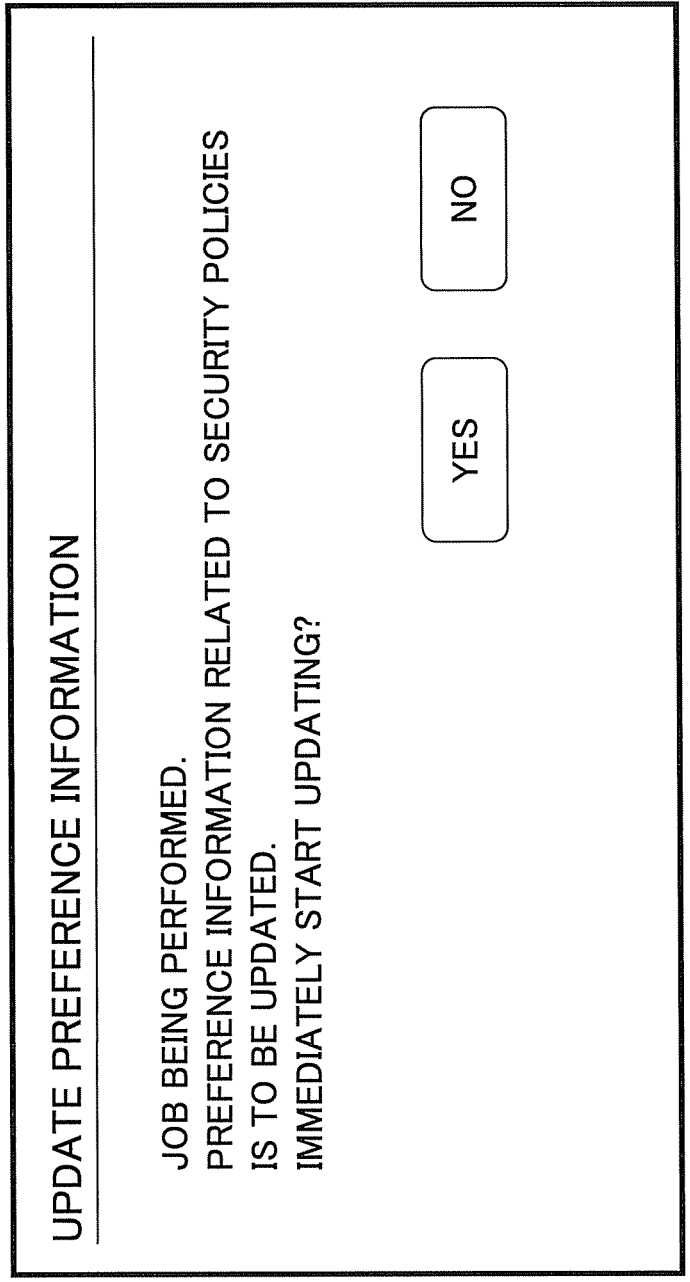
FIG. 29 is a view showing an example of an updating confirmation screen.

In step S1307, the operation unit 505 displays the updating confirmation screen. FIG. 29 is a view showing an example of the updating confirmation screen. As shown in FIG. 29, buttons for selecting whether to immediately start the operation of updating the preference information are displayed.

When a button "YES" is selected in the screen shown in FIG. 29 by the administrator 60 (S1308), the operation unit 505 notifies the fact to the updating control unit 501 (S1309).

At this time, the updating control unit 501 determines to start the operation of updating the preference information.

In step S1310, the updating control unit 501 controls the application 515 to interrupt the job.

In step S1311, the application 515 notifies that the job is interrupted to the updating control unit 501.

In step S1312, the updating control unit 501 performs the operation of updating the preference information of steps S1202 to S1208 shown in FIG. 27 and only the preference information related to security policies 641 is updated.

In step S1313, after the operation of updating the preference information is completed, the updating control unit 501 controls the application 515 to restart the job.

When a button "NO" is selected in the screen shown in FIG. 29 by the administrator 60 (S1314), the operation unit 505 notifies the fact to the updating control unit 501 (S1315).

At this time, the updating control unit 501 determines to delay starting the operation of updating the preference information until the job of the application 515 is completed.

In step S1316, the updating control unit 501 confirms to the job status monitoring unit 511 whether the job of the application 515 is completed.

In step S1317, the job status monitoring unit 511 notifies whether the job is finished to the updating control unit 501. The operation steps S1316 to S1317 is performed until the job is completed.

When the job is completed, in step S1318, the updating control unit 501 performs the operation of updating the preference information of steps S1202 to S1216 shown in FIG. 27.

Further, for the case when the button "YES" is selected in the screen shown in FIG. 29 by the administrator 60 in step S1308 and the operation of steps S1309 to S1313 is performed, the operation of steps S1316 to S1318 is performed after the operation of step S1313. At this time, in step S1318, the updating control unit 501 performs the operation of updating the preference information of steps S1209 to S1216 shown in FIG. 27.

With this structure, even when the job of the application 515 is being performed, the preference information related to security policies 641 can be updated with a priority. Thus, the preference information related to security policies 641 can be immediately reflected to the image processing apparatus 10.

Further, as shown in FIG. 29, whether to immediately update the preference information related to security policies may be selected by the administrator 60.

(Operation of Updating Preference Information (2))

Figure 30:
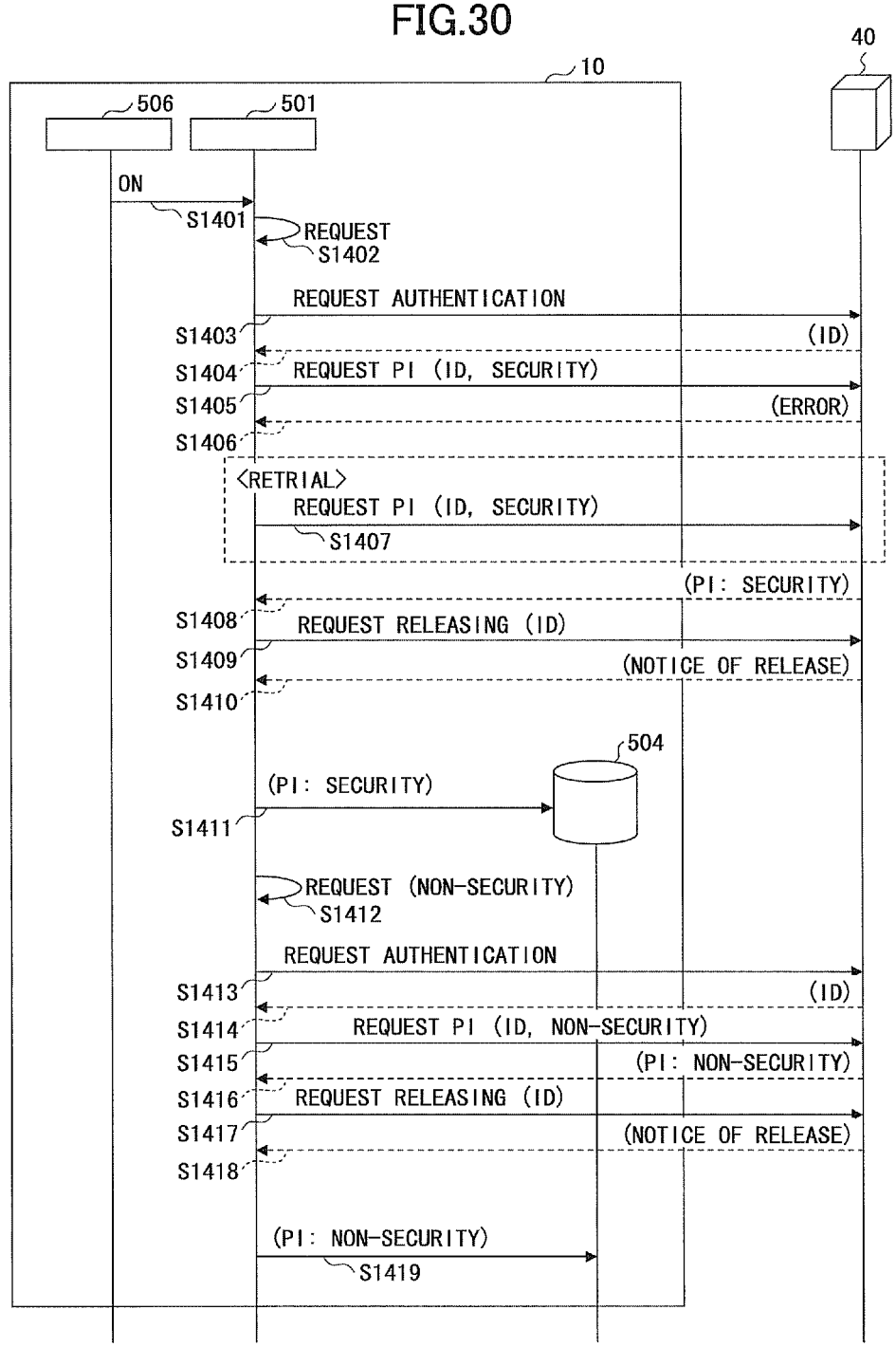
FIG. 30 is a sequence diagram showing another example of the operation of updating the preference information of an embodiment.

FIG. 30 is a sequence diagram showing another example of the operation of updating the preference information of the embodiment. In the operation shown in FIG. 30, when the preference information related to security policies 641 is not downloaded, retrial is performed.

Steps S1401 to S1405 shown in FIG. 30 are the same as steps S1200 to S1204 shown in FIG. 27, respectively, and the explanation is not repeated.

In step S1406, when the preference information related to security policies 641 is not downloaded because of a communication error or the like, error information is sent to the image processing apparatus 10.

In step S1407, the updating control unit 501 re-sends the request for obtaining the preference information related to security policies 641. The image processing apparatus 10 is configured to retry the operation of sending the request for obtaining the preference information related to security policies 641 because the preference information related to security policies 641 has high-priority. When the preference information related to security policies 641 cannot be obtained, the retry may be performed for a predetermined time or within a predetermined period.

When the preference information related to security policies 641 is not obtained by the retry, a notice of error may be displayed by the operation unit 505 and/or may be sent by the mail control unit 507 as described above.

In step S1408, it is assumed that the preference information related to security policies 641 is downloaded by the trial to the image processing apparatus 10.

Steps S1409 to S1419 shown in FIG. 30 are the same as steps S1206 to S1216 shown in FIG. 27, respectively, and the explanation is not repeated.

As the preference information related to security policies 641 has high-priority, by setting to automatically retry the operation of sending the request for obtaining the preference information related to security policies 641, it is unnecessary for the operator to manually obtain the preference information related to security policies 641 or the like.

(Operation When Error Occurs)

Figure 31:
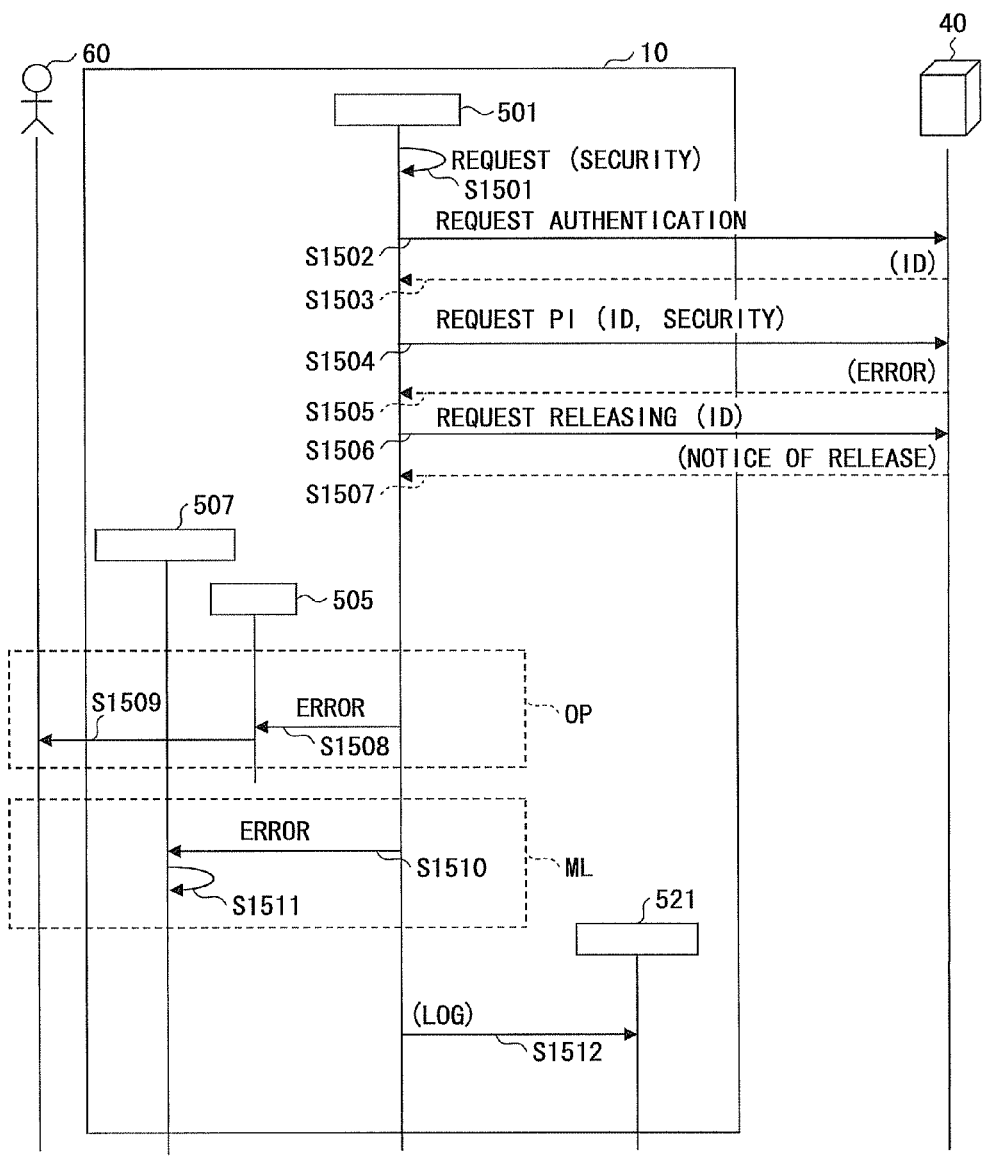
FIG. 31 is a sequence diagram showing an example of an error operation of an embodiment when an error occurs in updating the preference information.

FIG. 31 is a sequence diagram showing an example of the operation of the embodiment when an error occurs in updating the preference information.

Steps S1501 to S1504 shown in FIG. 31 are the same as steps S1201 to S1204 shown in FIG. 27, respectively, and the explanation is not repeated.

In step S1505, the data processing apparatus 40 sends the error information to the image processing apparatus 10 when it is impossible to send the preference information because of a reason that the preference information related to security policies 641 is not stored in the information storing unit 604 or the like, for example.

Steps S1506 and S1507 shown in FIG. 31 are the same as steps S309 and S310 shown in FIG. 10, respectively, and the explanation is not repeated.

Steps S1508 to S1511 shown in FIG. 31 are the same as steps S606 to S609 shown in FIG. 14, respectively, and the explanation is not repeated.

However, the screen indicating that the error occurs in updating shown in step S1509 is different from that shown in FIG. 15.

FIG. 32 is a view showing an example of the screen indicating that the error occurs in updating. As shown in FIG. 32, in the screen, a fact that the operation of updating the preference information related to security policies is not successful and the reason of the error are displayed, for example.

Referring back to FIG. 31, the image processing apparatus 10 may further include a log control unit 521 (although not shown in FIG. 4). In step S1512, the updating control unit 501 requires the log control unit 521 to store logs. The log control unit 521 stores the error information of the preference information related to security policies 641 as logs.

Further, when the preference information related to security policies 641 cannot be updated, the operation to the image processing apparatus 10 may be restricted because of a violation of a security policy. The restriction of the operation to the image processing apparatus 10 may be restricting operational functions of the image processing apparatus 10 such that the image processing apparatus 10 cannot be used at all, or only the applications of the image processing apparatus 10 related to the security policy which is not updated cannot be used.

With the above structure, the error operation can be performed when an error occurs in updating the preference information related to security policies.

Fourth Embodiment

The information setting system 1 of the fourth embodiment is explained. In this embodiment, the setting items of the set of preference information are stored in the data processing apparatus 40 in a differentiated manner in accordance with a fourth predetermined differentiating criterion. The fourth predetermined differentiating criterion is to differentiate the setting items of the set of preference information in accordance with whether it is necessary to reboot the image processing apparatus 10 after updating the preference information. The set of preference information is differentiated into preference information requiring a reboot for which it is necessary to reboot the image processing apparatus 10 and preference information not requiring a reboot for which it is unnecessary to reboot the image processing apparatus 10, after updating the preference information.

(Hardware Structure)

The system structure of the information setting system 1 and the hardware structures of each of the apparatuses 10 and 40 (20 and 30) are the same as those explained in the first embodiment. Thus, the same numerals are provided and the explanation is not repeated.

(Functional Structure)

The functional structures of each of the apparatuses 10 and 40 (20 and 30) are the same as those explained in the first embodiment. Thus, the same numerals are provided and the explanation is not repeated.

The information storing unit 604 of the data processing apparatus 40 stores the setting items of the set of preference information in a differentiated manner. In this embodiment, as described above, the set of preference information is differentiated into the preference information requiring reboot and the preference information not requiring reboot.

FIG. 33 is a view showing an example of a set of preference information 660 stored in the information storing unit 604 of the embodiment.

The set of preference information 660 is differentiated into preference information requiring reboot 662 and preference information not requiring reboot 664.

The preference information requiring reboot 662 includes setting values for setting items which requires reboot of the image processing apparatus 10 such as time setting, log setting or the like.

With this structure, the image processing apparatus 10 can download the preference information requiring reboot at once.

(Operation)

The operation of the information setting system 1 of the embodiment is explained.

(Operation of Updating Preference Information)

Figure 34:
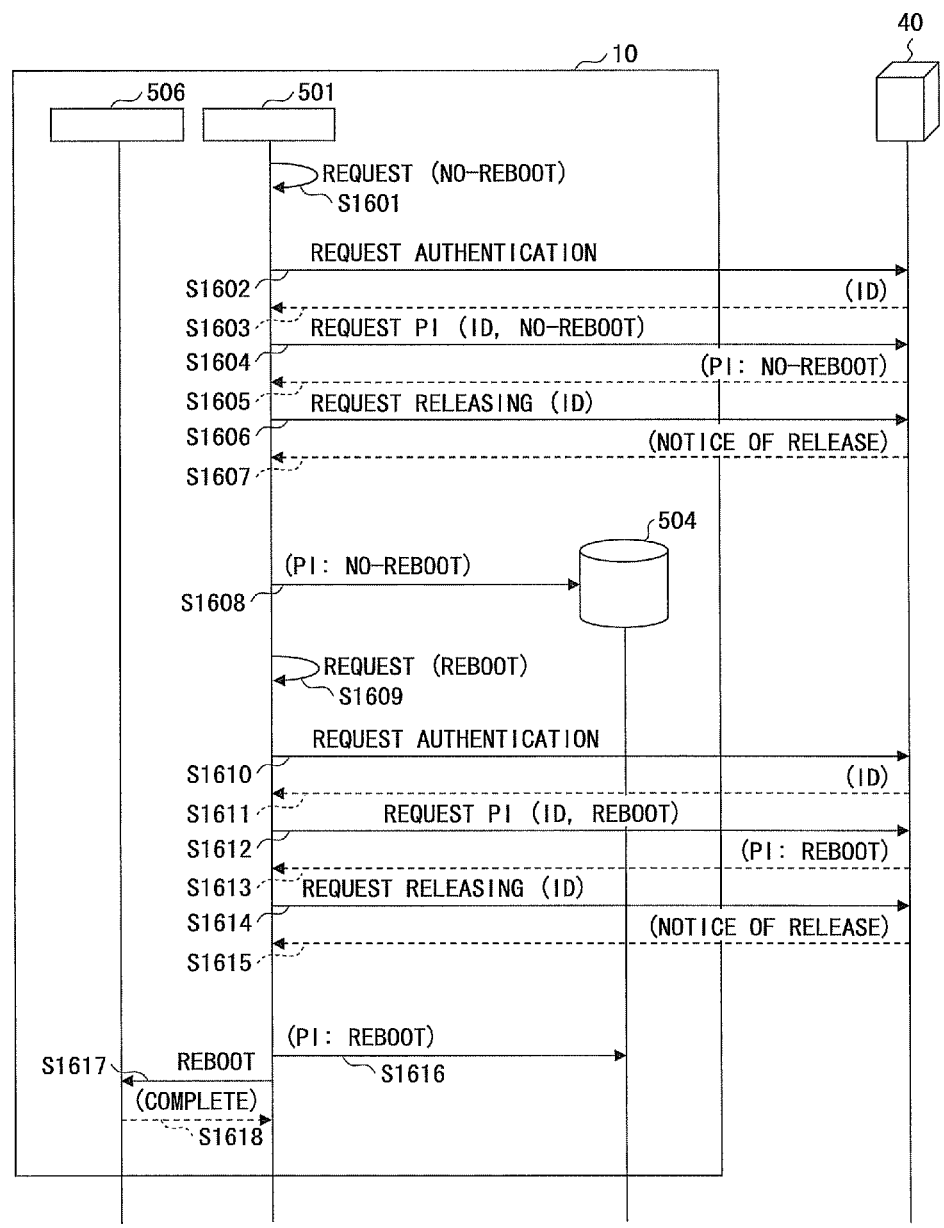
FIG. 34 is a sequence diagram showing an example of an operation of updating the preference information of an embodiment.

FIG. 34 is a sequence diagram showing an example of the operation of updating the preference information of the embodiment. In the operation shown in FIG. 34, the preference information requiring reboot is updated after the preference information not requiring reboot is updated.

Steps S1601 to S1603 shown in FIG. 34 are the same as steps S301 to S303 shown in FIG. 10, respectively, and the explanation is not repeated.

In step S1604, the updating control unit 501 sends the request for obtaining a certain part of the set of preference information 660 to the data processing apparatus 40 via the communication control unit 502. The request includes the authenticated ID obtained in step S1603, and a request for obtaining the preference information not requiring reboot 664.

In step S1605, when the data processing apparatus 40 receives the request for obtaining the part of the set of preference information 660, the information managing unit 603 reads the respective part of the set of preference information 660 from the information storing unit 604 and sends it to the image processing apparatus 10. In this case, the image processing apparatus 10 obtains (downloads) the preference information not requiring reboot 664.

Steps S1606 and S1607 shown in FIG. 34 are the same as steps S309 and S310 shown in FIG. 10, respectively, and the explanation is not repeated.

In step S1608, the updating control unit 501 updates the preference information stored in the information storing unit 504 by the obtained part of the set of preference information 660. Thus, the preference information not requiring reboot is updated.

In step S1609, after updating the preference information not requiring reboot, the updating control unit 501 detects a request for obtaining a certain part of the set of preference information 660, the preference information requiring reboot 662 in this example.

Steps S1610 and S1611 shown in FIG. 34 are the same as steps S302 and S303 shown in FIG. 10, respectively, and the explanation is not repeated.

In step S1612, the updating control unit 501 sends the request for obtaining the part of the set of preference information 660 to the data processing apparatus 40 via the communication control unit 502. The request includes the authenticated ID obtained in step S1611, and a request for obtaining the preference information requiring reboot 662.

In step S1613, when the data processing apparatus 40 receives the request for obtaining the part of the set of preference information 660, the information managing unit 603 reads the respective part of the set of preference information 660 from the information storing unit 604 and sends it to the image processing apparatus 10. In this case, the image processing apparatus 10 obtains (downloads) the preference information requiring reboot 662.

Steps S1614 and S1615 shown in FIG. 34 are the same as steps S309 and S310 shown in FIG. 10, respectively, and the explanation is not repeated.

In step S1616, the updating control unit 501 updates the preference information stored in the information storing unit 504 by the obtained part of the set of preference information 660. Thus, the preference information requiring reboot is updated.

In step S1617, the updating control unit 501 requests the power source control unit 506 to reboot the image processing apparatus 10.

In step S1618, the power source control unit 506 reboots the image processing apparatus 10, and notifies that the reboot is completed to the updating control unit 501.

With this structure, by updating the preference information requiring reboot at once, the reboot of the image processing apparatus 10 for updating the preference information can also be performed at once. Thus, a down time, during which the image processing apparatus 10 cannot be used, can be shortened.

Further, as the preference information not requiring reboot 664 can be downloaded and updated separately from the preference information requiring reboot 662, even when the reboot of the image processing apparatus 10 cannot be performed, updating of only the preference information not requiring reboot can occur.

Further, the preference information not requiring reboot and the preference information requiring reboot may be downloaded in the opposite order. At this time, the reboot of the image processing apparatus 10 may be performed after both the preference information requiring reboot and the preference information not requiring reboot are downloaded.

(Operation for Case Where Job is Being Performed When Updating (1))

Figure 35:
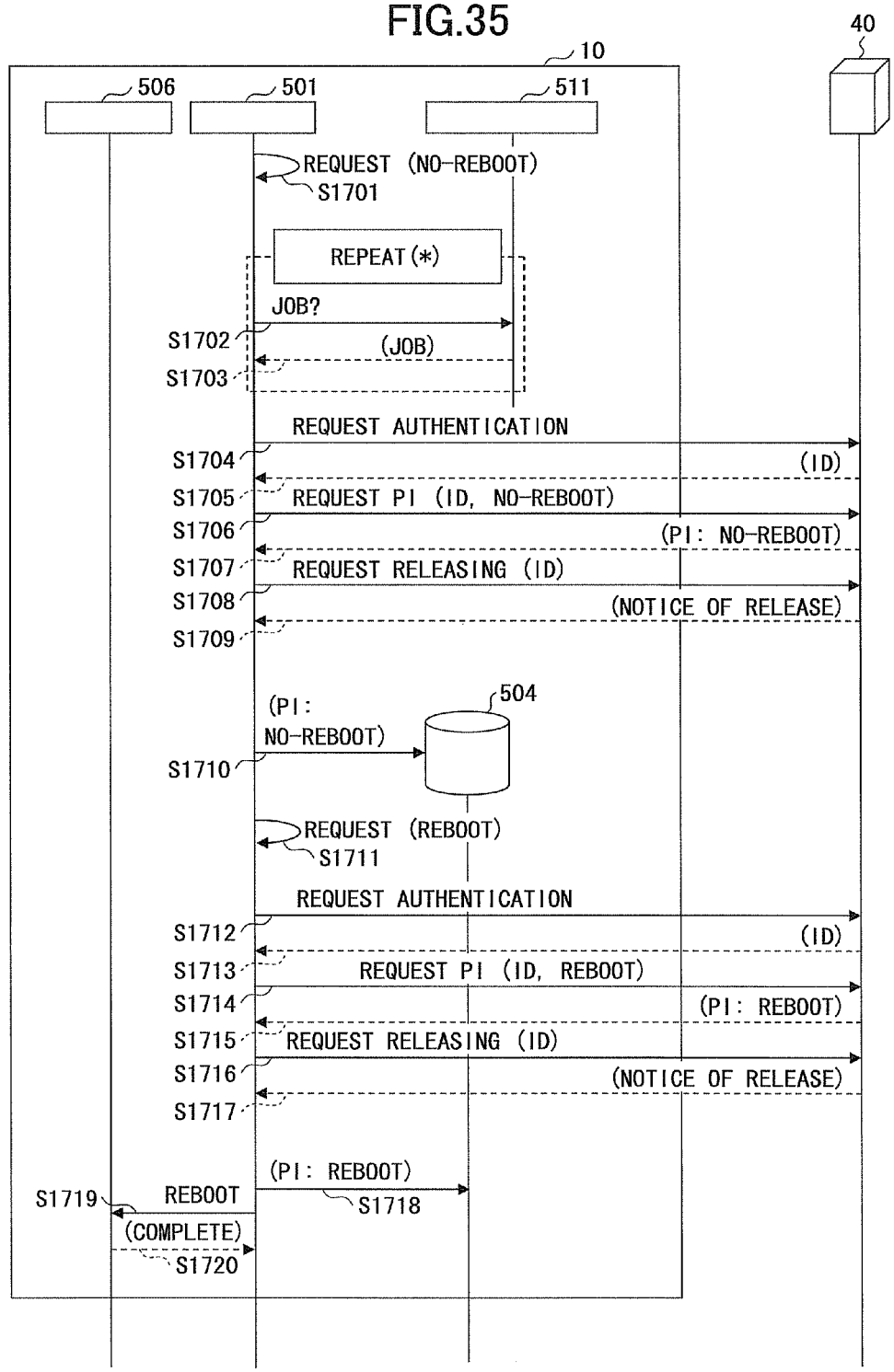
FIG. 35 is a sequence diagram showing an example of an operation of updating the preference information of an embodiment for a case where a job is being performed when updating.

FIG. 35 is a sequence diagram showing an example of the operation of updating the preference information of the embodiment for a case where a job is being performed when updating. In the operation shown in FIG. 35, the image processing apparatus 10 is rebooted after the job is completed.

In step S1701, the updating control unit 501 detects a request for obtaining the preference information by a predetermined trigger.

In step S1702, the updating control unit 501 confirms to the job status monitoring unit 511 whether a job is being performed. It is assumed that a job is being performed.

In such a case, in step S1703, the job status monitoring unit 511 detects the job which is being performed and notifies the fact to the updating control unit 501. The job status monitoring unit 511 continues monitoring whether the job is completed until the job is completed (S1702, S1703).

Steps after step S1704 shown in FIG. 35 are the same as steps after step S1602 shown in FIG. 34, respectively, and the explanation is not repeated.

With this structure, as the preference information is not downloaded and updated until the job being performed is completed. Therefore, a user using the job being performed can continue using the job without being interrupted by the operation of updating the preference information.

(Operation for Case Where Job is Being Performed When Updating (2))

Figure 36:
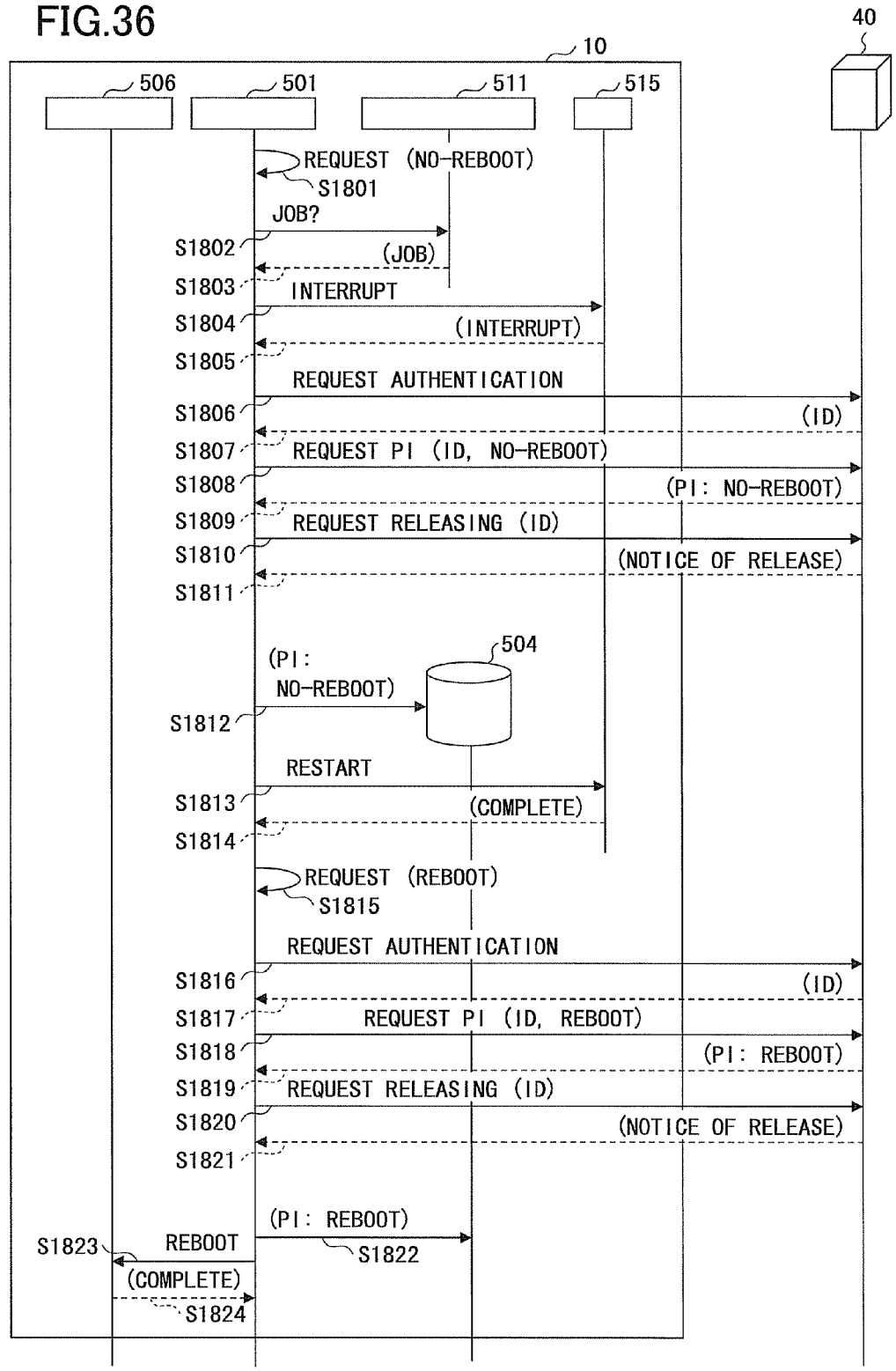
FIG. 36 is a sequence diagram showing another example of setting the preference information of an embodiment for a case where a job is being performed when updating.

FIG. 36 is a sequence diagram showing another example of the operation of updating the preference information of the embodiment for a case where a job is being performed when updating. In the operation shown in FIG. 36, the preference information not requiring reboot is updated while interrupting the job.

In step S1801, the updating control unit 501 detects a request for obtaining the preference information by a predetermined trigger.

In step S1802, the updating control unit 501 confirms to the job status monitoring unit 511 whether a job of the application is being performed. It is assumed that the job of the application 515 is being performed.

In such a case, in step S1803, the job status monitoring unit 511 detects the job of the application 515 is being performed and notifies the fact to the updating control unit 501.

In step S1804, the updating control unit 501 controls the application 515 to interrupt the job.

In step S1805, the application 515 notifies that the job is interrupted to the updating control unit 501.

Steps S1806 to S1812 shown in FIG. 36 are the same as steps S1602 to S1608 shown in FIG. 34, respectively, and the explanation is not repeated.

In step S1813, the updating control unit 501 controls the application 515 to restart the job.

In step S1814, when the job of the application 515 is completed, the application 515 notifies the fact to the updating control unit 501.

Steps after step S1815 shown in FIG. 36 are the same as steps after step S1609 shown in FIG. 34, respectively, and the explanation is not repeated.

Thus, in the operation shown in FIG. 36, when the job of the application 515 is being performed, the operation of updating the preference information not requiring reboot 664, the operation of completing the job, the operation of updating the preference information requiring reboot 662, and the operation of rebooting the image processing apparatus 10 are performed in this order. With this structure, there is no influence of the reboot of the image processing apparatus 10 on the job of the application 515, and the preference information not requiring reboot 664 can be updated while interrupting the job of the application 515.

(Operation When Error Occurs (1))

Figure 37:
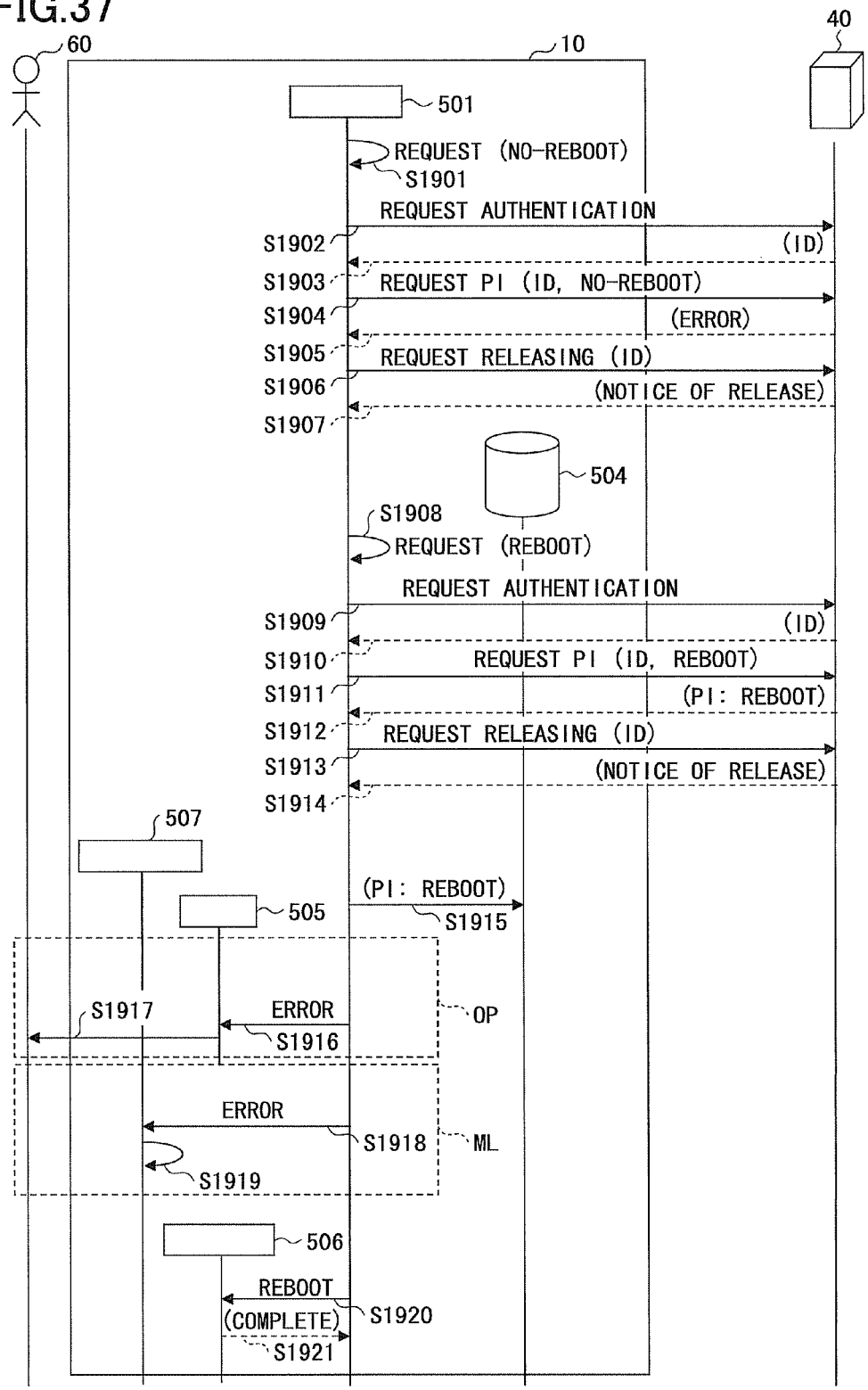
FIG. 37 is a sequence diagram showing an example of the operation of an embodiment when an error occurs in updating the preference information.

FIG. 37 is a sequence diagram showing an example of the operation of the embodiment when an error occurs in updating the preference information. In the operation shown in FIG. 37, it is assumed that downloading the preference information not requiring reboot is not successful.

Steps S1901 to S1904 shown in FIG. 37 are the same as steps S1601 to S1604 shown in FIG. 34, respectively, and the explanation is not repeated.

In step S1905, the data processing apparatus 40 sends error information to the image processing apparatus 10.

Steps S1906 and S1907 shown in FIG. 37 are the same as steps S309 and S310 shown in FIG. 10, respectively, and the explanation is not repeated.

Steps S1908 to S1915 shown in FIG. 37 are the same as steps S1609 to S1615 shown in FIG. 34, respectively, and the explanation is not repeated.

Steps S1916 to S1919 shown in FIG. 37 are the same as steps S606 to S609 shown in FIG. 14, respectively, and the explanation is not repeated.

However, the screen indicating that the error occurs in updating shown in step S1917 is different from that shown in FIG. 15.

FIG. 38 is a view showing an example of the screen indicating that the error occurs in updating. As shown in FIG. 38, in the screen, a fact that the operation of updating the preference information not requiring reboot is not successful and the reason of the error are displayed, for example.

Steps S1920 and S1921 shown in FIG. 37 are the same as steps S1617 and S1618 shown in FIG. 34, respectively, and the explanation is not repeated.

With this structure, even when a part of the preference information 660 cannot be downloaded, if the preference information requiring reboot 662 is downloaded, by rebooting the image processing apparatus 10, the preference information requiring reboot can be updated.

(Operation When Error Occurs (2))

Figure 39:
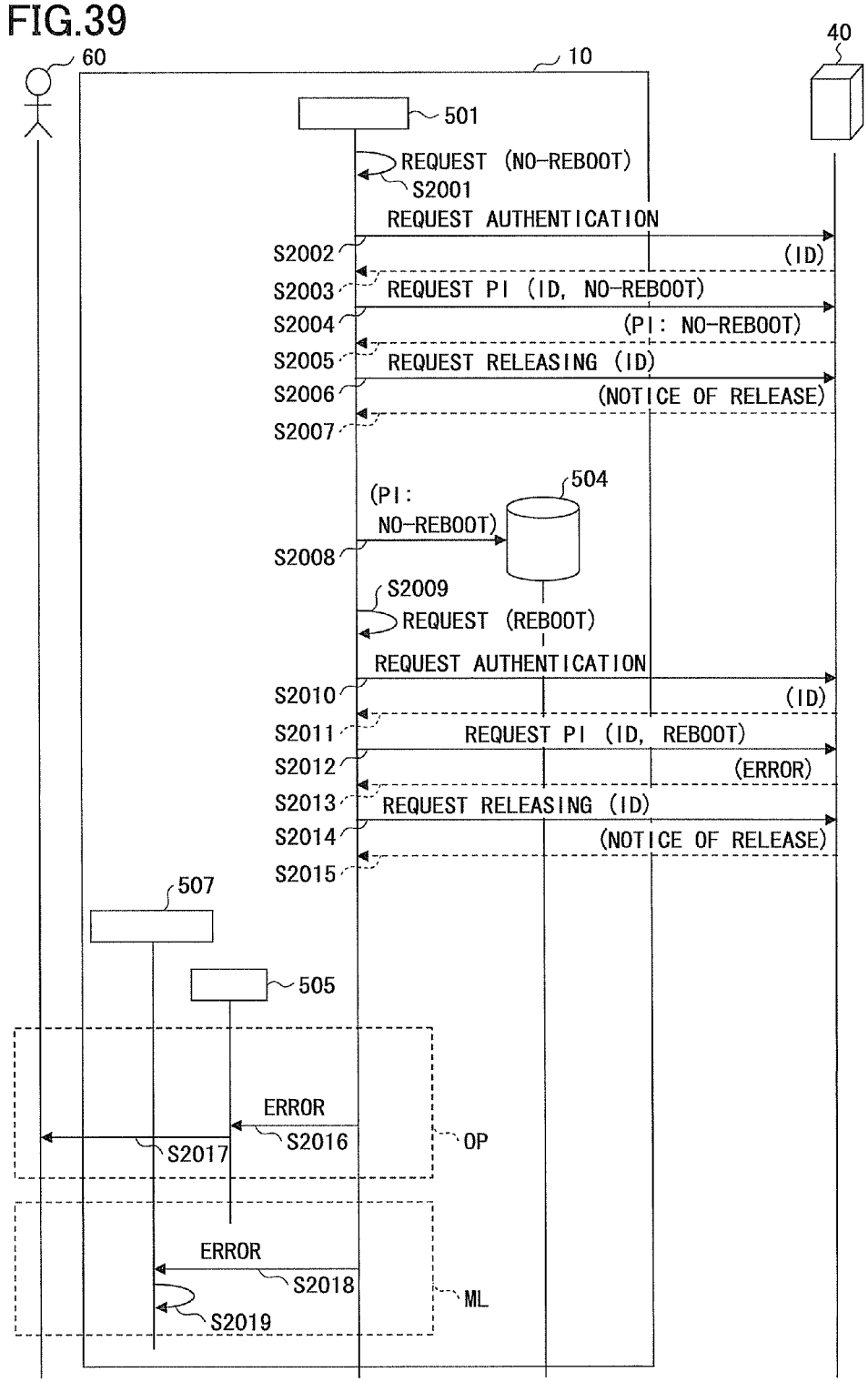
FIG. 39 is a sequence diagram showing another example when an error occurs in updating the preference information of an embodiment.

FIG. 39 is a sequence diagram showing another example of the operation of the embodiment when an error occurs in updating the preference information. In the operation shown in FIG. 39, it is assumed that downloading the preference information requiring reboot is not successful.

Steps S2001 to S2012 shown in FIG. 39 are the same as steps S1601 to S1612 shown in FIG. 34, respectively, and the explanation is not repeated.

In step S2013, the data processing apparatus 40 sends error information to the image processing apparatus 10.

Steps S2014 and S2015 shown in FIG. 39 are the same as steps S309 and S310 shown in FIG. 10, respectively, and the explanation is not repeated.

Steps S2016 to S2019 shown in FIG. 39 are the same as steps S606 to S609 shown in FIG. 14, respectively, and the explanation is not repeated.

However, the screen indicating that the error occurs in updating shown in step S2017 is different from that shown in FIG. 15.

FIG. 40 is a view showing an example of the screen indicating that the error occurs in updating. As shown in FIG. 40, in the screen, a fact that updating the preference information requiring reboot is not successful and the reason of the error are displayed.

With this structure, even when a part of the preference information 660 cannot be downloaded, if the preference information not requiring reboot 664 is downloaded, the preference information not requiring reboot can be updated.

(Operation When Error Occurs (3))

Figure 41:
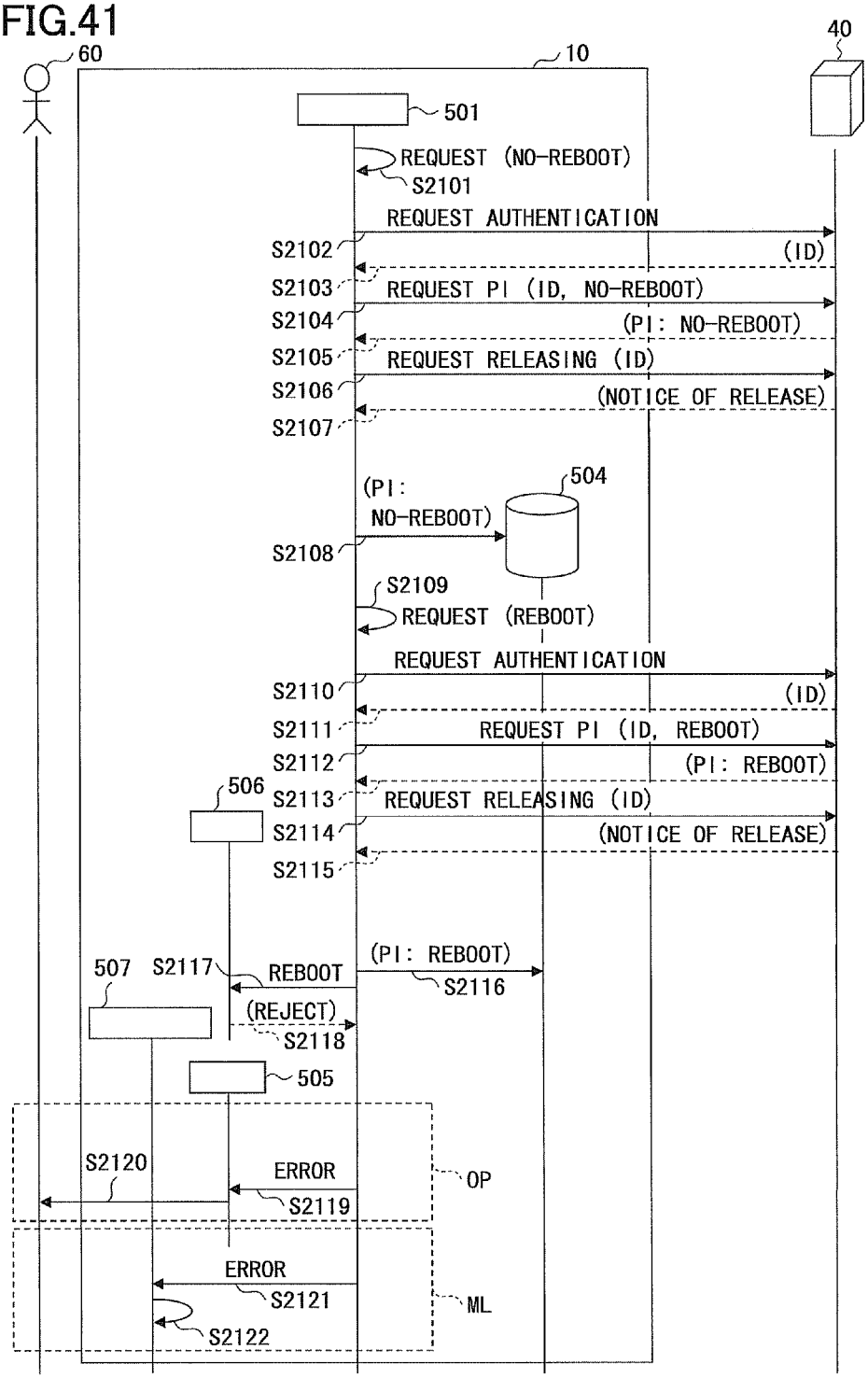
FIG. 41 is a sequence diagram showing another example of the operation of an embodiment when an error occurs in updating the preference information.

FIG. 41 is a sequence diagram showing another example of the operation of the embodiment when an error occurs in updating the preference information. In the operation shown in FIG. 41, it is assumed that the reboot of the image processing apparatus 10 is rejected.

Steps S2101 to S2117 shown in FIG. 41 are the same as steps S1601 to S1617 shown in FIG. 34, respectively, and the explanation is not repeated.

In step S2118, it is assumed that the power source control unit 506 rejects rebooting the image processing apparatus 10 and notifies the fact to the updating control unit 501.

Steps S2119 to S2122 shown in FIG. 41 are the same as steps S606 to S609 shown in FIG. 14, respectively, and the explanation is not repeated.

However, the screen indicating that the error occurs in updating shown in step S2120 is different from that shown in FIG. 15.

FIG. 42 is a view showing an example of the screen indicating that the error occurs in updating. As shown in FIG. 42, in the screen, a fact that updating the preference information requiring reboot is not successful, and the reason of the error such that the reboot is rejected are displayed. Further, a message to manually reboot the image processing apparatus 10 may be displayed or sent by a mail.

With this structure, even when a part of the preference information 660 cannot be downloaded, if the preference information not requiring reboot 664 is downloaded, the preference information not requiring reboot can be updated. Further, all of the settings can be reflected by manually rebooting the image processing apparatus 10.

Fifth Embodiment

The information setting system 1 of the fifth embodiment is explained. In this embodiment, the setting items of the set of preference information is stored in the data processing apparatus 40 in a differentiated manner in accordance with fifth predetermined differentiating criterion. The fifth predetermined differentiating criterion is to differentiate the setting items of the set of preference information in accordance with a level of access rights to update the preference information. The set of preference information is differentiated into preference information for administrator for which only an administrator can update and preference information for ordinary user for which an ordinary user can also update.

(Hardware Structure)

The system structure of the information setting system 1 and the hardware structures of each of the apparatuses 10 and 40 (20 and 30) are the same as those explained in the first embodiment. Thus, the same numerals are provided and the explanation is not repeated.

(Functional Structure)

The functional structures of each of the apparatuses 10 and 40 (20 and 30) are the same as those explained in the first embodiment. Thus, the same numerals are provided and the explanation is not repeated.

The information storing unit 604 of the data processing apparatus 40 stores the setting items of the set of preference information in a differentiated manner. In this embodiment, as described above, the set of preference information is differentiated into the preference information for administrator, and the preference information for ordinary user. Here, the administrator may be of a provider of the image processing apparatus 10 so that the highest access rights are given.

The setting value only the administrator is allowed to update is referred to as an "SP setting value" and the setting value the ordinary user is also allowed to update is referred to as an "UP setting value", hereinafter. The SP setting value is an important setting value handled only by the administrator having proper access rights. The UP setting value is a setting value capable of being updated by the ordinary user as well.

FIG. 43 is a view showing an example of a set of preference information 670 stored in the information storing unit 604 of the embodiment.

The set of preference information 670 is differentiated into preference information for administrator SP and preference information for ordinary user UP.

The preference information for ordinary user UP includes setting values for setting items capable of being updated by the ordinary user such as auto-log out, a buzzer sound or the like.

The preference information for administrator SP includes setting values for setting items only the administrator can update such as an IP address display setting, user authentication setting or the like.

With this structure, by differentiating the preference information into the preference information for administrator and the preference information for ordinary user, it is possible to re-update the setting values of the preference information for administrator when the setting values are wrongly updated by the ordinary user, for example.

(Operation)

The operation of the information setting system of the fifth embodiment is explained.

(Operation of Updating Preference Information (1))

Figure 44:
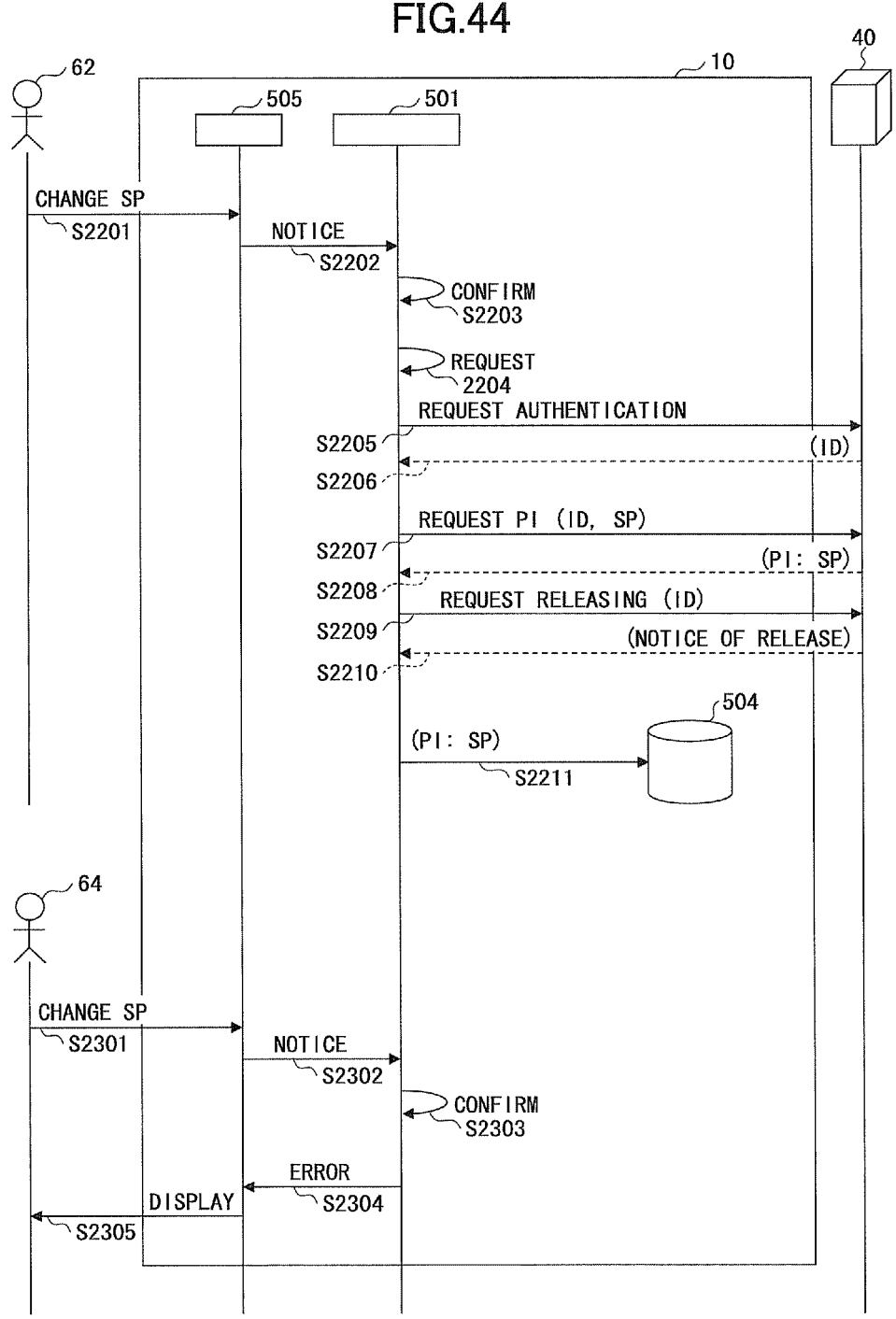
FIG. 44 is a sequence diagram showing an example of an operation of updating the preference information of an embodiment.

FIG. 44 is a sequence diagram showing an example of the operation of updating the preference information of the embodiment. In the operation shown in FIG. 44, both cases where an administrator 62 and an ordinary user 64 perform a process of updating the preference information are shown.

In step S2201, the operation unit 505 accepts a process of updating the preference information for administrator SP by the administrator 62.

Figure 45:
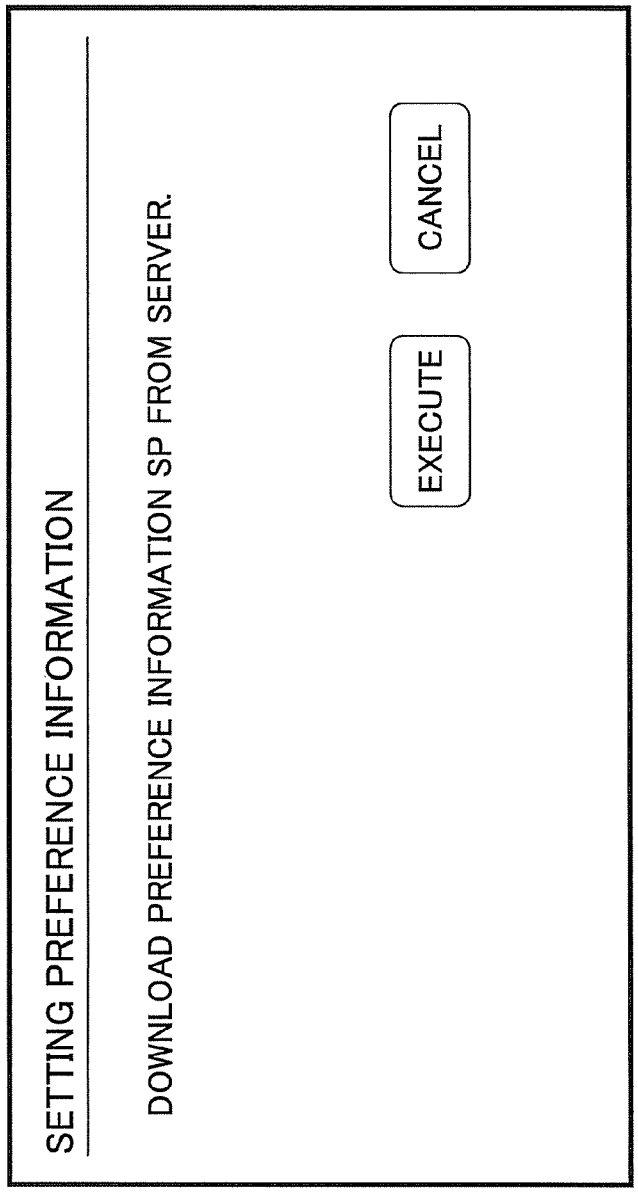
FIG. 45 is a view showing an example of an operational screen displayed by an operation unit.

FIG. 45 is a view showing an example of an operational screen displayed by the operation unit 505. As shown in FIG. 45, the operational screen includes buttons indicating "execute" or "cancel" downloading the preference information. It is assumed that the administrator selects the button indicating "execute".

Referring back to FIG. 44, in step S2202, the operation unit 505 notifies a request of updating the preference information for administrator SP to the updating control unit 501.

In step S2203, the updating control unit 501 confirms the access rights of the operator. The updating control unit 501 determines whether the operator is the administrator or the ordinary user using login ID input in the image processing apparatus 10 or the like, for example. As described above, it is determined that the operator is the administrator 62.

Steps S2204 to S2206 shown in FIG. 44 are the same as steps S301 to S303 shown in FIG. 10, respectively, and the explanation is not repeated.

In step S2207, the updating control unit 501 sends the request for obtaining a certain part of the set of preference information 670 to the data processing apparatus 40 via the communication control unit 502. The request includes the authenticated ID obtained in step S2206, and a request for obtaining the preference information for administrator SP. The request for obtaining the preference information for administrator SP may include identification data of the preference information for administrator SP or the like.

In step S2208, when the data processing apparatus 40 receives the request for obtaining the part of the set of preference information 670, the information managing unit 603 reads the respective part of the set of preference information 670 from the information storing unit 604 and sends them to the image processing apparatus 10. In this case, the image processing apparatus 10 obtains (downloads) the preference information for administrator SP.

Steps S2209 and S2210 shown in FIG. 44 are the same as steps S309 and S310 shown in FIG. 10, respectively, and the explanation is not repeated.

In step S2211, the updating control unit 501 updates the preference information stored in the information storing unit 504 by the obtained part of the set of preference information 670, the preference information for administrator SP in this case.

Next, a case where the ordinary user 64 performs a process of updating the preference information for administrator SP is explained.

In step S2301, the operation unit 505 accepts a process of updating the preference information for administrator SP by the ordinary user 64.

In step S2302, the operation unit 505 notifies a request of updating the preference information for administrator SP to the updating control unit 501.

In step S2303, the updating control unit 501 confirms the access rights of the operator. As described above, the updating control unit 501 determines that the operator is the ordinary user 64 so that the proper access rights are not given.

In step S2304, the updating control unit 501 notifies an access rights error to the operation unit 505.

Figure 46:
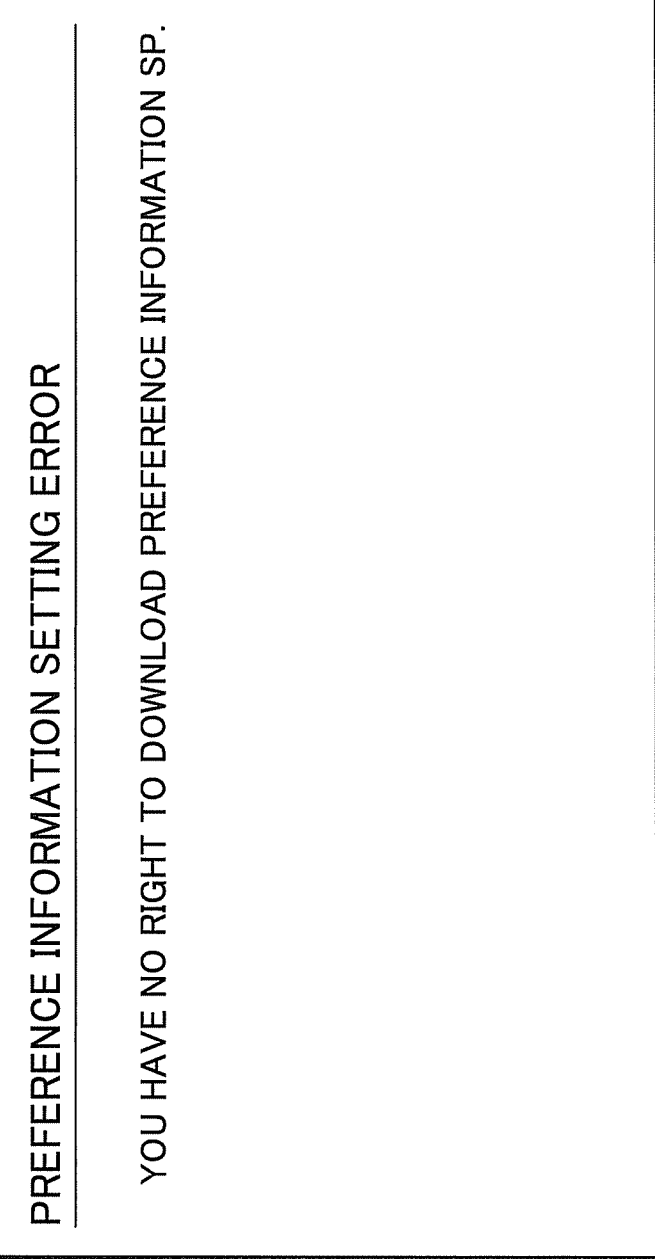
FIG. 46 is a view showing an example of a screen indicating that an error occurs in updating.

In step S2305, the operation unit 505 displays a notice of error screen on the operation panel 102. FIG. 46 is a view showing an example of the notice of error screen of the embodiment.

With this structure, the ordinary user 64 can immediately recognize that he or she has no proper access rights to update the preference information, for which he or she has requested to update, by seeing the notice of error.

(Operation of Updating Preference Information (2))

The image processing apparatus 10 may be configured to automatically update the preference information for administrator SP when the setting values of the preference information for administrator SP stored in the information storing unit 504 is changed by a user without the proper access rights such as the ordinary user 64 in order to re-change the preference information for administrator SP.

Figure 8:
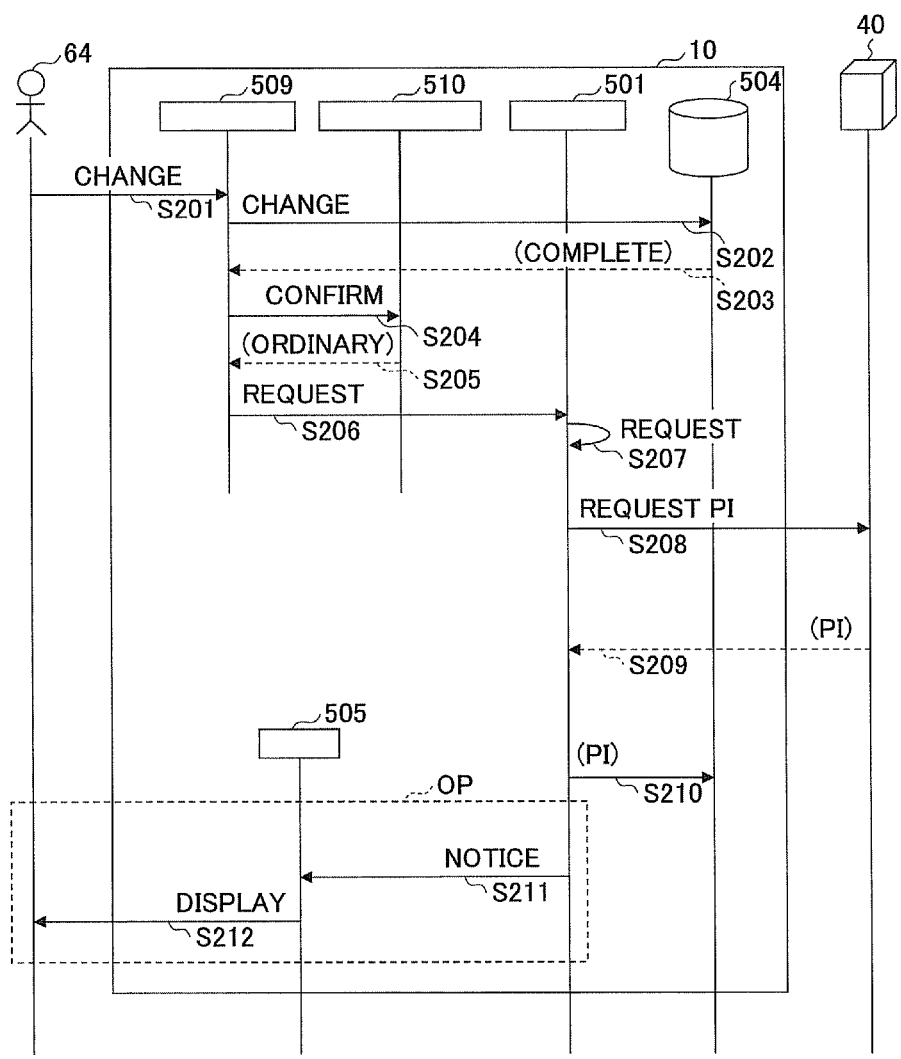
FIG. 8 is a sequence diagram showing an example of an operation of updating the preference information of an embodiment.

FIG. 8 is a sequence diagram showing an example of the operation of updating the preference information of the embodiment.

In step S201, the setting value managing unit 509 accepts changing of a setting value of the preference information for administrator stored in the information storing unit 504 via the operation unit 505 by the ordinary user 64. At this time, the ordinary user 64 may also input the user ID or the like. This operation is performed when the ordinary user 64, who has no proper access right, wrongly changes the preference information for administrator.

In step S202, the setting value managing unit 509 updates the respective setting value stored in the information storing unit 504 by the accepted setting value.

In step S203, completion of updating the setting value is output to the setting value managing unit 509 from the information storing unit 504.

In step S204, the setting value managing unit 509 inquires the access rights of the operator (ordinary user 64) based on the input user ID to the access rights managing unit 510.

In step S205, the access rights managing unit 510 notifies the setting value managing unit 509 that the operator identified by the user ID is "ordinary user".

In step S206, as the operator is not the administrator, the setting value managing unit 509 notifies a request of updating the preference information for administrator SP to the updating control unit 501.

In step S207, upon receiving the request from the setting value managing unit 509, the updating control unit 501 detects a request for obtaining a certain part of the set of preference information 670, the preference information for administrator SP in this case.

Then, the updating control unit 501 sends the request for obtaining the part of the set of preference information 670 to the data processing apparatus 40 via the communication control unit 502 in step S208.

In step S209, when the data processing apparatus 40 receives the request for obtaining the part of the set of preference information 670 from the image processing apparatus 10, the data processing apparatus 40 reads out the corresponding part of the set of preference information 670 and sends it to the image processing apparatus 10.

In step S210, the updating control unit 501 updates the preference information stored in the information storing unit 504 by the obtained part of the set of preference information 670.

In step S211, the updating control unit 501 notifies a fact that the preference information, the preference information for administrator in this case, is updated, to the operation unit 505.

In step S212, the operation unit 505 displays a screen indicating that the setting value is updated again.

FIG. 9 is a view showing an example of a screen indicating that the setting value is updated again. As shown in FIG. 9, a fact that the setting value of the preference information for administrator is re-updated as the preference information for administrator is changed by the operator without the proper access rights is displayed.

With this structure, by detecting the change of the preference information and re-updating the preference information, setting of the apparatus based on the preference information can be maintained.

Figure 47:
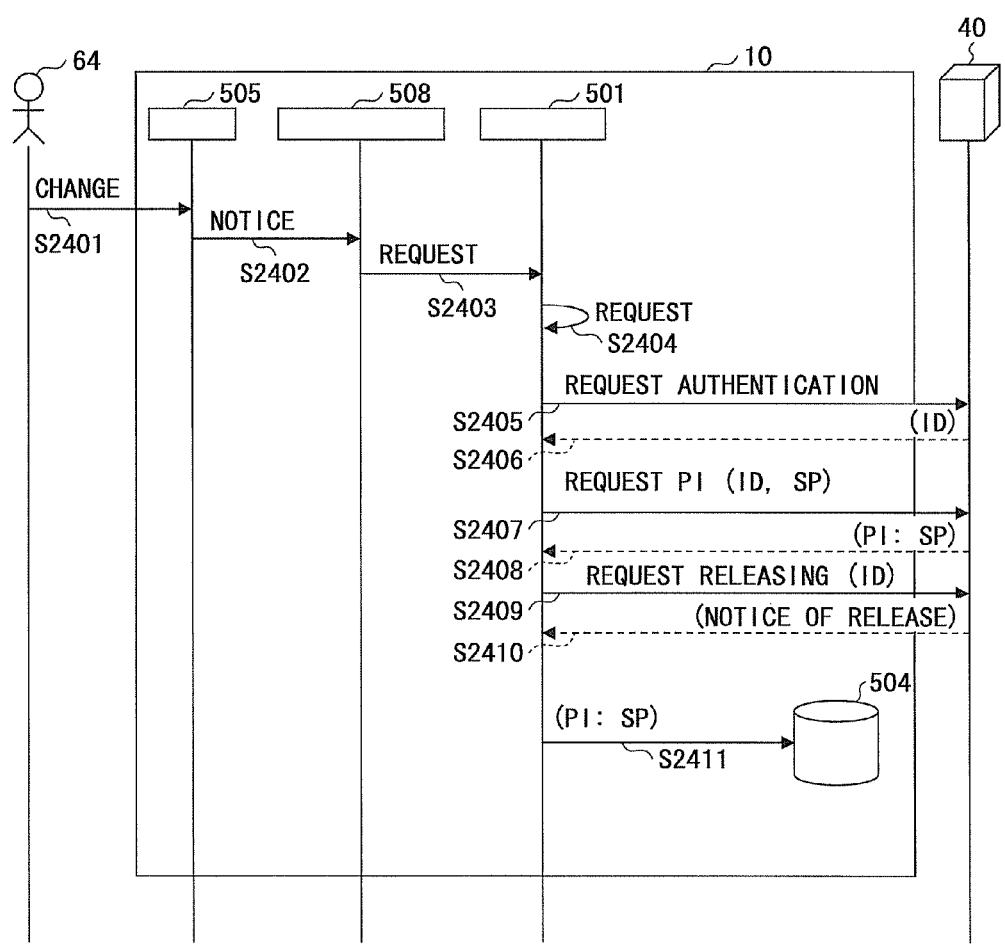
FIG. 47 is a sequence diagram showing another example of the operation of updating the preference information of an embodiment.

FIG. 47 is a sequence diagram showing another example of the operation of updating the preference information of the embodiment. In the operation shown in FIG. 47, the preference information for administrator is changed by the ordinary user 64 accidentally or the like.

In step S2401, the operation unit 505 accepts a SP setting value of the preference information for administrator by the ordinary user 64. Then, although not shown in FIG. 47, the SP setting value of the preference information for administrator stored in the information storing unit 504 is changed by the accepted SP setting value.

In step S2402, the operation unit 505 notifies the fact that the SP setting value is changed to the apparatus status managing unit 508.

In step S2403, the apparatus status managing unit 508 notifies the fact that the SP setting value is changed to the updating control unit 501.

Steps S2404 to S2411 shown in FIG. 47 are the same as steps S2204 to S2211 shown in FIG. 44, respectively, and the explanation is not repeated.

With this structure, even when the ordinary user 64 without the proper access rights accidentally or the like changes the SP setting value, the SP setting value can be automatically updated to the original value. Thus, even when the SP setting value is accidentally changed by the ordinary user 64, it can be prevented that the image processing apparatus 10 is used with the unexpected SP setting value.

Further, in addition to the above operation, when the UP setting value is changed by the ordinary user 64, the UP setting value can be automatically updated to the original value by downloading the preference information for ordinary user UP after a predetermined period, or at a predetermined timing. With this structure, the more important the preference information is, the faster the preference information is re-updated when the preference information is changed by the ordinary user 64 or the like.

(Operation of Updating Preference Information (3))

FIG. 48 is a sequence diagram showing another example of the operation of updating the preference information of the embodiment. In the operation shown in FIG. 48, a process of retrial is performed when the preference information for administrator SP cannot be downloaded.

Steps S2501 to S2504 shown in FIG. 48 are the same as steps S2404 to S2407 shown in FIG. 47, respectively, and the explanation is not repeated.

In step S2505, error information is sent to the image processing apparatus 10 when a certain part of the set of preference information 670, the preference information for administrator SP in this example, cannot be downloaded by a communication error or the like.

In step S2506, the updating control unit 501 retries sending the request for obtaining the part of the set of preference information 670. This operation may be performed only for the preference information for administrator SP with a higher priority. The retrial may be performed for a predetermined time or within a predetermined period.

When the preference information for administrator SP is not obtained by the retrial, a notice of error may be displayed by the operation unit 505 and/or may be sent by the mail control unit 507 as described above.

In step S2507, it is assumed that the preference information for administrator SP is downloaded by the trial to the image processing apparatus 10.

Steps S2508 to S2510 shown in FIG. 48 are the same as steps S2409 to S2411 shown in FIG. 47, respectively, and the explanation is not repeated.

In step S2511, after updating the preference information for administrator SP, the updating control unit 501 detects a request for obtaining a certain part of the set of preference information 670, the preference information for ordinary user UP in this example.

Steps S2512 and S2513 shown in FIG. 48 are the same as steps S302 and S303 shown in FIG. 10, respectively, and the explanation is not repeated.

In step S2514, the updating control unit 501 sends the request for obtaining the part of the set of preference information 670 to the data processing apparatus 40 via the communication control unit 502. The request includes the authenticated ID obtained in step S2513, and a request for obtaining the preference information for ordinary user UP. The request for obtaining the preference information for ordinary user UP may include identification data of the preference information for ordinary user UP or the like.

In step S2515, when the data processing apparatus 40 receives the request for obtaining the part of the set of preference information 670, the information managing unit 603 reads the respective part of the set of preference information 670 from the information storing unit 604 and sends them to the image processing apparatus 10. In this case, the image processing apparatus 10 obtains (downloads) the preference information for ordinary user UP.

Steps S2516 and S2517 shown in FIG. 48 are the same as steps S309 and S310 shown in FIG. 10, respectively, and the explanation is not repeated.

In step S2518, the updating control unit 501 updates the preference information stored in the information storing unit 504 by the obtained part of the set of preference information 670.

With this structure, as the preference information for administrator SP has a higher priority compared with the preference information for ordinary user UP, the retrial is automatically performed when an error occurs in updating so that an operation by the operator such as the administrator can be simplified.

When the preference information is not obtained by the retrial, a notice of error may be displayed by the operation unit 505 and/or may be sent by the mail control unit 507 as described above. Further, when the preference information for administrator SP cannot be set or updated, the operation to the image processing apparatus 10 may be restricted because of a violation of the SP setting value.

As for the above embodiments, the differentiated preference information of the set of preference information may be stored in the information sorting unit 640 of the data processing apparatus 40 in forms of files, respectively. Alternatively, the differentiated preference information of the set of preference information may not be stored as separated files, but may be distinguishably stored as a single file. In such a case, the setting items for each of the differentiated preference information may be denoted with different codes or the like.

Programs executed by the image processing apparatus 10 and the data processing apparatus 40 of the embodiment may be provided by a computer readable medium such as a CD-ROM, a flexible disk (FD), a CD-R, a Digital Versatile Disk (DVD) or the like in a form of files in an installable and executable manner.

Further, the programs executed by the image processing apparatus 10 and the data processing apparatus 40 of the embodiment may be provided on a computer connected to a network such as INTERNET or the like and may be installed by downloading the programs via the network. Further, the programs executed by the image processing apparatus 10 and the data processing apparatus 40 of the embodiment may be delivered by a network such as INTERNET or the like.

Further, the programs executed by the image processing apparatus 10 and the data processing apparatus 40 of the embodiment may be provided in an embedded manner in a ROM or the like.

The programs executed by the image processing apparatus 10 and the data processing apparatus 40 of the embodiment may be in module structures including the above described units. Specifically, the above described one or more units may be formed on the main storage unit when the CPU (processor) reads the corresponding program from the auxiliary storage unit to load the one or more units on the main storage unit.

According to the embodiments, when setting or updating the setting information of the image processing apparatus, the setting information can be appropriately and flexibly obtained from the data processing apparatus.

The individual constituents of the information setting system 1 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although a preferred embodiment of the information setting system 1 has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

The present application is based on Japanese Priority Application No. 2011-198376 filed on Sep. 12, 2011, the entire contents of which are hereby incorporated by reference.

What is claimed is:
1. An image processing apparatus comprising:
a storing unit that stores setting information for operating the image processing apparatus; and
an updating control unit that
sends a request for obtaining predetermined differentiated setting information, which is a part of a set of setting information stored in a data processing apparatus in a differentiated manner in accordance with a predetermined differentiating criterion, to the data processing apparatus via a network, and
obtains the predetermined differentiated setting information from the data processing apparatus via the network and controls to update the setting information stored in the storing unit by the obtained predetermined differentiated setting information,
wherein in the data processing apparatus, the set of setting information is differentiated into confirmation data including data for confirming up-to-date of the set of setting information and setting content information which is the rest of the set of preference information, and the updating control unit sends a request for obtaining only the confirmation data among the set of the setting information to the data processing apparatus, obtains only the confirmation data, and determines whether to obtain the setting content information from the data processing apparatus based on the obtained confirmation data.

2. The image processing apparatus according to claim 1, wherein in the data processing apparatus, the set of setting information is differentiated in accordance with functions of image processing apparatuses, and
the updating control unit sends a request for obtaining the differentiated setting information corresponding to the function of the respective image processing apparatus.

3. The image processing apparatus according to claim 2, wherein when the respective image processing apparatus has plural functions, the updating control unit determines order of obtaining the differentiated setting information corresponding to the plural functions, respectively based on whether the functions are being performed, or frequency of usage of the functions.

4. The image processing apparatus according to claim 2, wherein in the data processing apparatus, the set of setting information includes plural differentiated setting information for at least one of the functions corresponding to kinds of image processing apparatuses, and
the updating control unit determines to send a request for obtaining the differentiated setting information for the kind of the respective image processing apparatuses.

5. The image processing apparatus according to claim 2, wherein in the data processing apparatus, the set of setting information includes setting information which is not specific to functions of the image processing apparatuses.

6. The image processing apparatus according to claim 1, wherein in the data processing apparatus, the set of setting information is differentiated into setting information related to security policies and setting information unrelated to security policies.

7. The image processing apparatus according to claim 6, wherein when a job of a function of the image processing apparatus is being performed, the updating control unit interrupts the job, obtains the setting information related to security policies, controls to update the setting information stored in the storing unit by the obtained setting information related to security policies, controls to restart the job, and obtains the setting information unrelated to security policies after the job is completed.

8. The image processing apparatus according to claim 6, wherein the updating control unit retries obtaining the setting information related to security policies when there is an error in obtaining the setting information related to security policies.

9. The image processing apparatus according to claim 1, wherein in the data processing apparatus, the set of setting information is differentiated into preference information requiring reboot for which it is necessary to reboot the image processing apparatus and preference information not requiring reboot for which it is unnecessary to reboot the image processing apparatus.

10. The image processing apparatus according to claim 1, wherein in the data processing apparatus, the set of setting information is differentiated in accordance with a level of access rights to update the preference information, and
the updating control unit determines whether to send a request for obtaining the differentiated setting information based on whether an operator of the image processing apparatus has proper access rights to update the differentiated setting information.

11. The image processing apparatus according to claim 10, wherein the updating control unit controls to update the setting information stored in the storing unit when the setting information is changed by the operator who has no access rights to update the setting information by sending a request for obtaining the respective differentiated setting information to the data processing apparatus.

12. The image processing apparatus according to claim 1, wherein the updating control unit controls to output a notice of error indicating the differentiated setting information for which the operation of updating is not successful.

13. An information setting system comprising:
an image processing apparatus; and
a data processing apparatus connected to the image processing apparatus via a network,
wherein the data processing apparatus includes
a first storing unit that stores a set of setting information in a differentiated manner in accordance with a predetermined differentiating criterion, and
the image processing apparatus includes
a second storing unit that stores setting information for operating the image processing apparatus; and
an updating control unit that
sends a request for obtaining predetermined differentiated setting information, which is a part of the set of setting information stored in the data processing apparatus to the data processing apparatus via the network, and
obtains the predetermined differentiated setting information from the data processing apparatus via the network and controls to update the setting information stored in the storing unit by the obtained predetermined differentiated setting information,
wherein in the data processing apparatus, the set of setting information is differentiated into confirmation data including data for confirming up-to-date of the set of setting information and setting content information which is the rest of the set of preference information, and
the updating control unit sends a request for obtaining only the confirmation data among the set of the setting information to the data processing apparatus, obtains only the confirmation data, and determines whether to obtain the setting content information from the data processing apparatus based on the obtained confirmation data.

14. A non-transitory computer-readable recording medium having recorded thereon a program that causes a computer including a storing unit that stores setting information for operating an image processing apparatus to execute an image processing method and an updating control unit for updating the setting information stored in the storing unit, said method comprising:
sending, by the updating control unit, a request for obtaining predetermined differentiated setting information, which is a part of a set of setting information stored in a data processing apparatus in a differentiated manner in accordance with a predetermined differentiating criterion, to the data processing apparatus via a network;
obtaining, by the updating control unit, the predetermined differentiated setting information from the data processing apparatus via the network; and controlling, by the updating control unit, to update the setting information stored in the storing unit by the obtained predetermined differentiated setting information, wherein in the data processing apparatus, the set of setting information is differentiated into confirmation data including data for confirming up-to-date of the set of setting information and setting content information which is the rest of the set of preference information, and the updating control unit sends a request for obtaining only the confirmation data among the set of the setting information to the data processing apparatus, obtains only the confirmation data, and determines whether to obtain the setting content information from the data processing apparatus based on the obtained confirmation data.

15. The image processing apparatus according to claim 1, wherein the confirmation data includes an updated date which indicates when the set of setting information is last updated and setting information version.

* * * * *